United States Patent
Miao et al.

(10) Patent No.: US 10,524,177 B2
(45) Date of Patent: Dec. 31, 2019

(54) METHODS AND APPARATUS TO MANAGE DATA CONNECTIONS FOR MULTIPLE SUBSCRIBER IDENTITIES IN A WIRELESS COMMUNICATION DEVICE

(71) Applicant: Apple Inc., Cupertino, CA (US)

(72) Inventors: Qiang Miao, Beijing (CN); Jianxiong Shi, Pleasanton, CA (US); Li Su, San Jose, CA (US); Wenping Lou, Beijing (CN)

(73) Assignee: Apple Inc., Cupertino, CA (US)

( * ) Notice: Subject to any disclaimer, the term of this patent is extended or adjusted under 35 U.S.C. 154(b) by 223 days.

(21) Appl. No.: 15/306,479

(22) PCT Filed: May 30, 2014

(86) PCT No.: PCT/CN2014/078915
§ 371 (c)(1),
(2) Date: Oct. 24, 2016

(87) PCT Pub. No.: WO2015/180129
PCT Pub. Date: Dec. 3, 2015

(65) Prior Publication Data
US 2017/0048773 A1    Feb. 16, 2017

(51) Int. Cl.
*H04W 36/14* (2009.01)
*H04W 76/16* (2018.01)
(Continued)

(52) U.S. Cl.
CPC .......... *H04W 36/14* (2013.01); *H04B 1/3816* (2013.01); *H04W 8/183* (2013.01);
(Continued)

(58) Field of Classification Search
CPC ... H04W 76/026; H04W 88/06; H04W 8/183; H04W 36/14; H04W 76/16; H04W 48/18; H04W 84/12; H04B 1/3816
See application file for complete search history.

(56) References Cited

U.S. PATENT DOCUMENTS

| | | | |
|---|---|---|---|
| 9,628,359 B1* | 4/2017 | Jain | ..................... H04L 43/0811 |
| 2007/0032225 A1* | 2/2007 | Konicek | ........... H04M 1/72513 |
| | | | 455/417 |

(Continued)

FOREIGN PATENT DOCUMENTS

| | | |
|---|---|---|
| EP | 1962540 A1 | 8/2008 |
| EP | 2094057 A2 | 8/2009 |
| WO | 2010145612 A1 | 12/2010 |

OTHER PUBLICATIONS

PCT International Search Report and Written Opinion, PCT/CN2014/0078915 dated Mar. 6, 2015 (10 pages).

(Continued)

Primary Examiner — Peter P Chau
(74) Attorney, Agent, or Firm — Dickinson Wright RLLP

(57) ABSTRACT

Apparatus and methods to manage data connections to multiple wireless networks in a wireless communication device supporting multiple subscriber identities via multiple subscriber identity modules (SIMs) are disclosed. A representative method includes detecting an application request to establish a data connection; obtaining a preference for prioritization of data connections for the multiple SIMs; and based on the preference, establishing the data connection with a wireless network associated with one of the multiple SIMs. In representative embodiments, the preference is based on a user specified or default prioritization of the multiple SIMs, an order of radio access technologies (Continued)

(RATs), one or more quality metrics, data rates supported, and/or availability of wireless local area networks for the data connections.

15 Claims, 22 Drawing Sheets

(51) Int. Cl.
  *H04W 48/18*   (2009.01)
  *H04W 8/18*   (2009.01)
  *H04B 1/3816*   (2015.01)
  *H04W 88/06*   (2009.01)
  *H04W 84/12*   (2009.01)

(52) U.S. Cl.
  CPC ........... *H04W 48/18* (2013.01); *H04W 76/16* (2018.02); *H04W 84/12* (2013.01); *H04W 88/06* (2013.01)

(56) References Cited

U.S. PATENT DOCUMENTS

| | | | | |
|---|---|---|---|---|
| 2008/0275992 | A1* | 11/2008 | Basty | H04W 76/10 709/227 |
| 2009/0082011 | A1* | 3/2009 | Zhang | H04M 1/72572 455/426.1 |
| 2010/0302968 | A1* | 12/2010 | Lu | H04W 24/08 370/252 |
| 2015/0092611 | A1* | 4/2015 | Ponukumati | H04W 4/16 370/259 |
| 2015/0341825 | A1* | 11/2015 | Soriaga | H04W 28/0215 455/450 |

OTHER PUBLICATIONS

Taiwanese Patent Application No. 104116711—Office Action dated Aug. 1, 2016.

\* cited by examiner

METHODS AND APPARATUS TO MANAGE DATA CONNECTIONS FOR MULTIPLE SUBSCRIBER IDENTITIES IN A WIRELESS COMMUNICATION DEVICE

CROSS-REFERENCE TO RELATED APPLICATIONS

This Application is a national stage entry under 35 U.S.C. 371(c) of and claims priority to International Application No. PCT/CN2014/078915 filed May 30, 2014, entitled "METHODS AND APPARATUS TO MANAGE DATA CONNECTIONS FOR MULTIPLE SUBSCRIBER IDENTITIES IN A WIRELESS COMMUNICATION DEVICE," and published as International Publication No. WO2015/180129A1 on Dec. 3, 2015, which is incorporated by reference herein in its entirety for all purposes.

FIELD

The described embodiments generally relate to wireless communications, and more particularly, to methods and apparatus to manage data connections for multiple subscriber identities in a wireless communication device.

BACKGROUND

Fourth generation (4G) cellular networks employing newer radio access technology systems that implement the $3^{rd}$ Generation Partnership Project (3GPP) Long Term Evolution (LTE) and LTE Advanced (LTE-A) standards are rapidly being developed and deployed by network operators worldwide in parallel with legacy second generation (2G) and third generation (3G) wireless networks. Wireless communication devices can include the capability to connect with different types of wireless networks, e.g., based on what wireless networks are available in a particular location, based capabilities of available wireless networks, based on capabilities of the wireless communication device, based on properties of particular services provided by a wireless network, and/or based on service subscriptions with which the wireless communication device is associated. A removable universal integrated circuit card (UICC) including a subscriber identity module (SIM) that includes authentication credentials to permit a user of the wireless communication device to connect with a wireless network and to access particular services can be replaced by another UICC/SIM combination in an "unlocked" wireless communication device to provide access to a different set of services associated with a different subscriber identity. Wireless communication devices that accommodate multiple UICCs/SIMs provide for multiple subscriber identities to be used by the same wireless communication device to connect to two or more different wireless networks (and/or to the same wireless network) and to access different services associated with the multiple subscriber identities. While these wireless communication devices provide for flexible access to different services and to multiple wireless networks, an internal architecture of such wireless communication devices that support the multiple UICCs/SIMs usually includes parallel hardware and parallel software such that each UICC/SIM acts independently with no interaction or interface between them. Although this internal architecture is simple, independent operation of the parallel UICCs/SIMs (and associated hardware/software) in the wireless communication device can result in inefficiencies, as each parallel internal system can duplicate various functions used for network connection management. As such, there exists a need for solutions that enable cooperation and synergy between hardware and software that support multiple subscriber identities in a wireless communication device.

SUMMARY

Apparatus and methods to manage data connections for multiple subscriber identities in a wireless communication device are disclosed. A representative method includes the wireless communication device including multiple subscriber identity modules (SIMs), such as multiple SIMs on a single universal integrated circuit card (UICC), multiple SIMs on multiple UICCs, and/or multiple electronic SIMs (eSIMs) on an embedded UICC (eUICC). The wireless communication device includes a user configurable prioritization and/or a default prioritization for establishing data connections to one or more wireless networks associated with the multiple SIMs/eSIMs. The wireless communication device detects an application request (or other software and/or hardware based resource request) to establish a data connection, and obtains a preference for the prioritization of data connections for the multiple SIMs/eSIMs. The preference can be stored in the wireless communication device. Based on the obtained preference, the wireless communication device establishes the data connection with a wireless network associated with one of the multiple SIMs/eSIMs. The preference includes a prioritized order in which wireless networks and/or SIMs/eSIMs are used.

In a representative embodiment, the preference includes a prioritization based on one or more of a wireless radio access technology (RAT) used by the one or more wireless networks (e.g., later generation 4G LTE preferred over earlier generation 2G/3G or a wireless local area network (WLAN) preferred over a cellular wireless network), a specific ordering of the SIMs, a preference for particular wireless network capabilities (e.g., higher data rates preferred over lower data rates), a measurable characteristic of the wireless networks (e.g., signal strength/quality), and service profiles (e.g., home networks preferred over roaming networks). The wireless communication device can use the preference to determine an order of wireless networks with which to establish a data connection. The wireless communication device can also switch an established data connection from a cellular wireless network to a WLAN when the WLAN is detected and available. The wireless communication device can monitor signal strength/quality conditions for the data connection and can switch among different wireless networks accordingly, e.g., based on a signal quality threshold and/or detection of an out-of-service condition. In an embodiment, the wireless communication device establishes a data connection (or switches an established data connection) to a wireless network that supports simultaneous circuit-switched voice connections and packet-switched data connections in response to detecting the establishment of a circuit-switched voice connection.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood with reference to the following description taken in conjunction with the accompanying drawings. These drawings are not necessarily drawn to scale, and they are in no way intended to limit or exclude foreseeable modifications thereto in form and detail that may be made by one having ordinary skill in the art at the time of this disclosure.

DETAILED DESCRIPTION

Figure 1:
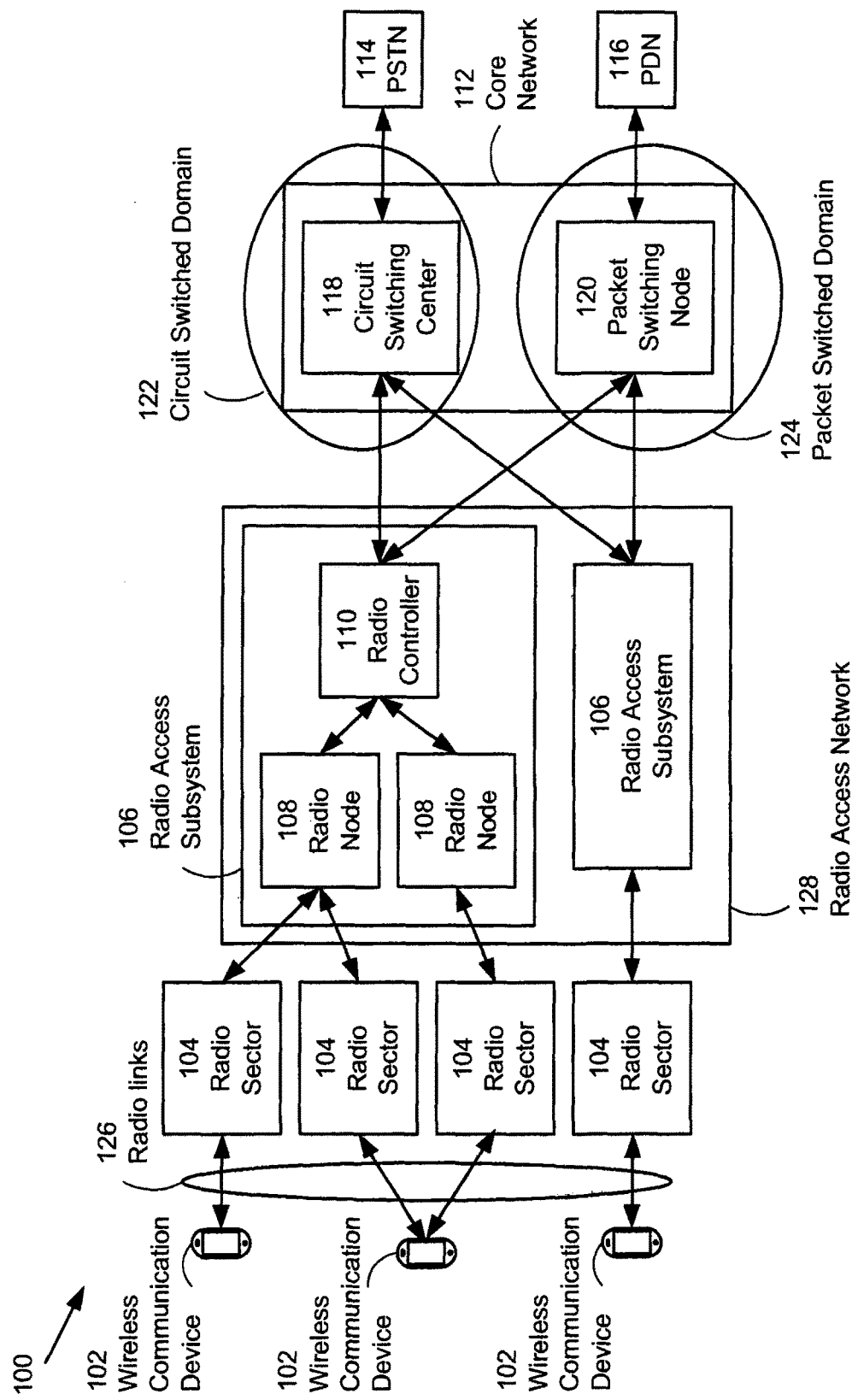
FIG. 1 illustrates components of a generic wireless communication network, in accordance with some embodiments.

Representative examples for managing subscriptions, accessing services, enabling cooperation, and realizing synergy for multiple subscriber identities in a wireless device are provided herein. These examples are provided to add context to, and to aid in the understanding of, the subject matter of this disclosure. It should be apparent that the present disclosure may be practiced with or without some of the specific details described herein. Further, various modifications and/or alterations can be made to the subject matter described herein, and illustrated in the corresponding figures, to achieve similar advantages and results, without departing from the spirit and scope of the disclosure.

References are made in this section to the accompanying drawings, which form a part of the disclosure and in which are shown, by way of illustration, various implementations corresponding to the described embodiments herein. Although the embodiments of this disclosure are described in sufficient detail to enable one having ordinary skill in the art to practice the described implementations, it should be understood that these examples are not to be construed as being overly-limiting or all-inclusive.

In accordance with various embodiments described herein, the terms "wireless communication device," "wireless device," "mobile device," "mobile station," and "user equipment" (UE) may be used interchangeably herein to describe one, or any number of, common consumer electronic device(s) that may be capable of performing procedures associated various embodiments the disclosure. In accordance with various implementations, any one of these consumer electronic devices may relate to: a cellular phone or a smart phone, a tablet computer, a laptop computer or a netbook computer, a media player device, an electronic book device, a MiFi® device, as well as any other type of electronic computing device having fourth generation (4G) LTE and LTE Advanced (LTE-A) communication capabilities. In various embodiments, these capabilities may allow a respective UE to communicate within various 4G wireless network cells that can employ any type of LTE-based radio access technology (RAT).

Additionally, it should be understood that the UEs described herein may be configured as multi-mode wireless communication devices that are also capable of communicating via legacy third generation (3G) and/or second generation (2G) RATs in addition to communicating with 4G wireless networks. In some scenarios, a multi-mode UE can be configured to prefer attachment to LTE or LTE-A networks offering faster data rate throughput, as compared to legacy 2G/3G wireless networks that offer lower data rate throughputs. In some embodiments, a 4G compliant UE may be configured to fall back to a legacy 2G/3G wireless network, e.g., an Evolved High Speed Packet Access (HSPA+) network or a Code Division Multiple Access (CDMA) 2000 Evolution-Data Only (EV-DO) network, when LTE and LTE-A networks are otherwise unavailable and/or are unable to provide particular services, such as circuit-switched voice connections. Multi-mode UEs can include support for communication in accordance with one or more different wireless communication protocols developed by standards bodies, e.g., 3GPP's Global System for Mobile Communications (GSM), Universal Mobile Telecommunications System (UMTS), LTE, and LTE-A standards or 3GPP2's CDMA2000 (1×RTT, 2×EV-DO, HRPD, eHRPD) standards. Multi-mode UEs can also support communication using wireless local area networking protocols, e.g., IEEE 802.11 (Wi-Fi), IEEE 802.16 (WiMAX), and wireless personal area networking protocols, e.g., Bluetooth®. Multiple wireless communication protocols can provide complementary functions and/or different services for a multi-mode UE.

In some embodiments, the multi-mode UE can support multiple subscriber identities, with each subscriber identity being associated with a set of wireless networks, e.g., a home network and one or more preferred roaming networks, and with a set of services provided through one or more of the wireless networks. The multi-mode UE can be configured to connect to one or more of the wireless networks individually or in parallel based on the different subscriber identities. In some embodiments, each wireless network can provide different services in accordance with the multiple subscriber identities. In some embodiments, subscriber identities are embodied as part of one or more subscriber identity modules (SIMs) installed on and/or associated with one or more removable universal integrated circuit cards (UICCs) or as part of one or more electronic SIMs (eSIMs) on one or more embedded UICCs (eUICCs). (The "electronic" SIM can also be referred to as an "embedded" SIM or an "enhanced" SIM, in some embodiments.) In some embodiments, the multi-mode UE can connect with a first wireless network using information (e.g., authorization certificates) associated with a first SIM and with a second wireless network using information associated with a second SIM. The multi-mode UE can be configured to prefer connections to particular wireless networks based on subscriber identity information, based on wireless network type (e.g., home vs. roaming), based on services provided via the wireless network, based on radio access technology, based on access network conditions (e.g., signal strength and/or signal quality), and/or based on user preferences. In some embodiments, the multi-mode UE can connect to a first wireless network for voice services and/or for circuit-switched services and to a second wireless network for data services and/or for packet-switched services. In some embodiments, a first SIM can be associated with a personal/home account for a user of the multi-mode UE, while a second SIM can be associated with a business/work account for the user of the multi-mode UE.

When two (or more) SIMs of the wireless communication device are associated with the same wireless service provider (or carrier or wireless network operator or mobile network operator or mobile virtual network operator), the wireless communication device can be configured to force both (or all) wireless cellular protocol software stacks to be associated with and/or connect to the same wireless network. In some embodiments, the wireless communication device forces the wireless cellular protocol software stacks to use the same radio access technology (RAT) and/or to connect via the same cell of the same radio access network portion of the same wireless network. The wireless communication device can force common use/connections when both (or all) SIMs/eSIMs are from the same wireless service provider or from different wireless service providers but associated with the same physical wireless network, e.g., as part of a roaming agreement. Mobility management tasks, e.g., serving cell measurement, neighbor cell measurement, cell reselection, network handover, etc., can be shared between the wireless cellular protocol software stacks, and one wireless cellular protocol software stack can follow the other wireless cellular protocol software stack to maintain connections to the same (or a common target) cell of the same (or a common target) wireless network during reselection/handover. Duplication of mobility management tasks between the wireless cellular protocol software stacks can be reduced by sharing tasks among the wireless cellular protocol software stacks and/or by sharing information gathered and/or determined by each wireless cellular protocol software stack with other wireless cellular protocol software stacks.

When the two (or more) SIMs/eSIMs of the wireless communication device are associated with the same wireless service provider, the wireless communication device can be configured to enforce cooperation and synergistic operation of two (or more) wireless cellular protocol software stacks operating on the wireless communication device. (In some embodiments, when the SIMs of the wireless communication device are associated with different wireless service providers, the wireless communication device can also be configured to enforce cooperation and/or synergy between multiple wireless cellular protocol software stacks.) The wireless cellular protocol software stacks can divide mobility management tasks among themselves, execute the divided mobility management tasks in parallel, and exchange and share information between the multiple wireless cellular protocol software stacks. Each wireless cellular protocol software stack can use associated radio frequency wireless circuitry to perform mobility management tasks, such as searching for a public land mobile network (PLMN). Mobility management tasks can be divided among the multiple wireless cellular protocol software stacks based on radio access technology and/or based on radio frequency bands to balance the PLMN search effort among the multiple wireless cellular protocol software stacks. Each wireless cellular protocol software stack can also perform cell measurements of its own serving cell and can share cell measurement information with other wireless cellular protocol software stacks operating in the same wireless communication device. Similarly, each wireless cellular protocol software stack can measure a set of neighbor cells and share the measurement information with other wireless cellular protocol software stacks, thereby avoiding duplication of measurements of the same cells by multiple wireless cellular protocol software stacks operating in the same wireless communication device. When two SIMs/eSIMs are associated with the same PLMN (e.g., via the same serving carrier)

or with "equivalent" PLMNs (e.g., as a serving carrier for one SIM/eSIM and as a roaming carrier with another SIM/eSIM), the two wireless cellular protocol software stacks can share mobility management information, such as lists of network lists, cell lists, white lists, black lists, broadcast system information, cell-specific information, physical layer communication information, synchronization information, wireless circuitry settings, etc. The multiple wireless cellular protocol software stacks can also share and coordinate information for cell reselection, cell handover, fallback procedures, and/or virtual circuit connection management. Cooperation and synergistic operation among multiple wireless cellular protocol software stacks operating in a wireless communication device can reduce task duplication, reduce power consumption, accelerate information gathering, reduce service interruption, and improve connection stability by executing mobility management tasks in parallel and sharing information gathered thereby among the multiple wireless cellular protocol software stacks.

The wireless communication device, in some embodiments, can be configured to reuse radio frequency wireless circuitry to communicate with multiple wireless networks to support multiple subscriber identities. The wireless communication device, while connected to a first wireless network for a first subscriber identity, can receive signaling messages, such as paging messages or paging indications, from a second wireless network for a second subscriber identity. A portion of radio frequency wireless circuitry of the wireless communication device can be reconfigured to communicate with the second wireless network, e.g., to establish a signaling channel with the second wireless network and to respond to signaling messages received from the second wireless network using the established signaling channel. The portion of radio frequency wireless circuitry of the wireless communication device can be reconfigured back and forth between the first wireless network and the second wireless network to maintain a connection with the first wireless network, e.g., a voice connection, a data connection, and/or a signaling connection, while also receiving from the second wireless network limited information that can be provided to a user of the wireless communication device. Representative information that can be received from the second wireless network includes an indication of an originator of a mobile terminated connection request and short message service data. Parallel wireless cellular protocol software stacks running on one or more baseband processors of the wireless communication device can communicate with the first wireless network and the second wireless network via radio frequency wireless circuitry that is shared between the wireless cellular protocol software stacks. The radio frequency wireless circuitry of the wireless communication device can also include dedicated parallel radio frequency receivers to enable parallel reception for two different subscriber identities from one or more wireless networks. When one wireless cellular protocol software stack is connected to the first wireless network via a first radio frequency receiver, paging requests (and/or other signaling messages) can be received for another cellular protocol software stack via a second radio frequency receiver. Processing circuitry of the wireless communication device, e.g., one or more baseband processors, can be configured to switch the single radio frequency transmitter between the two cellular protocol software stacks to support limited communication with the second wireless network while also maintaining communication with the first wireless network. The wireless communication device can respond to paging requests, establish a signaling channel, and receive information from the second wireless network, e.g., indications of an originator of a mobile terminated connection request and/or short message service (SMS) data. In some embodiments, the wireless communication device can reject a mobile terminated connection request received from the second wireless network and can provide an indication of the missed connection request to a user thereof without dropping the connection to the first wireless network. Similarly, in some embodiments, the wireless communication device can receive SMS data from the second wireless network, while also remaining connected to the first wireless network, without requiring multiple parallel radio frequency transmitters in the radio frequency wireless circuitry of the wireless communication device.

The wireless communication device, in some embodiments, can be configured to manage data connections using multiple SIMs/eSIMs and multiple associated wireless networks. The wireless communication device can be able to connect to different wireless networks and can prioritize an order in which the wireless networks are used by the wireless communication device when establishing a new data connection and/or to which networks to maintain and/or switch an existing data connection. The wireless communication device can access multiple wireless networks that are associated with the multiple SIMs/eSIMs, and at least two of the SIMs/eSIMs and/or two of the wireless networks can each support a data connection. The wireless communication device can determine an order in which to select the wireless networks for attempting to establish and/or to maintain and/or to switch a data connection. The prioritized order can be based on a user preference and/or a default software configuration setting. The wireless communication device can prioritize the wireless networks with which to attempt to establish a data connection based on one or more of: a wireless radio access technology (RAT) used by the one or more wireless networks (e.g., a later generation 4G LTE RAT can be preferred over an earlier generation legacy 2G/3G RAT, or, alternatively and/or in addition, a wireless local area network (WLAN) can be preferred over a cellular wireless network), a specific ordering of the SIMs/eSIMs, a preference for particular wireless network capabilities (e.g., higher data rates can be preferred over lower data rates), a measurable characteristic of the wireless networks (e.g., signal strength/quality), and service profiles (e.g., home networks can be preferred over roaming networks). The wireless communication device can switch data connections between wireless networks and/or SIMs/eSIMs based on communication channel conditions and/or service capabilities provided by the wireless networks.

The wireless communication device, in some embodiments, includes radio frequency circuitry that includes at least one antenna and at least one radio frequency block coupled to the at least one antenna, and at least one baseband processor configured to transmit and receive radio frequency signals by means of the radio frequency wireless circuitry. The at least one baseband processor is configured to establish connections with one or more wireless networks, such as using a first wireless cellular protocol software stack for a first subscriber identity associated with a first SIM/eSIM to communicate with a first wireless network and a second wireless cellular protocol software stack for a second subscriber identity associated with a second SIM/eSIM to communicate with a second wireless network. The wireless communication device includes multiple SIMs/eSIMs, such as multiple SIMs on a single universal integrated circuit card (UICC), multiple SIMs on multiple UICCs, and/or multiple eSIMs on an embedded UICC (eUICC). The wireless communication device can receive signals from the second wireless network while in parallel communicate with the first wireless network, such as by using two parallel radio frequency receivers and sharing a single radio frequency transmitter between a first wireless cellular protocol stack and a second cellular protocol software stack. Each wireless network can operate in accordance with a different radio access technology, use a different radio frequency band, and/or use a different radio frequency channel. The wireless communication device can maintain an active connection with one wireless network, while also receiving page messages, paging indications, broadcast messages, and/or reference signals from another wireless network. The wireless communication device can include a single baseband processor on which the wireless cellular protocol software stacks reside in parallel interconnected by a software interface and/or on separate baseband processors interconnected by a hardware interface over which a software interface between the wireless cellular protocol software stacks can exchange information. In some embodiments, the baseband processor(s) divide mobility management tasks between the parallel wireless cellular protocol software stacks to permit cooperation and/or operational synergy between the parallel wireless cellular protocol software stacks.

In some embodiments, a set of one or more SIMs/eSIMs for the wireless communication device can reside internally in the wireless communication device, e.g., on one or more removable UICCs and/or as eSIMs on an eUICC in the wireless communication device, and/or reside externally in a wireless accessory device. The wireless accessory device can be coupled to the wireless communication device through a wired interface and/or through a wireless interface. A second SIM/eSIM in the wireless accessory device can provide for extending the capability of the wireless communication device to connect to wireless networks, e.g., to a particular wireless network for which a first SIM/eSIM in the wireless communication device is not authorized to provide a connection, e.g., the first SIM/eSIM may be not activated for the particular wireless network. Alternatively, the second SIM/eSIM in the wireless accessory device can enable the wireless communication device to connect to a wireless network using a different subscriber identity than available in a first SIM/eSIM in the wireless communication device, such as when using two different subscriber identities from two different SIMs/eSIMs to access the same wireless network for different services and/or subscriptions. A wireless cellular protocol software stack in the wireless communication device can communicate with the wireless accessory device, e.g., to access the second SIM/eSIM over the wired/wireless interface and to exchange information, such as to obtain credentials, by which the wireless communication device can register with and/or connect to the wireless network using the information/credentials from the second SIM/eSIM via the cellular protocol software stack. In a representative embodiment, the interface between the wireless communication device and the wireless accessory device uses a low power, wireless protocol, e.g., a Bluetooth® Low Energy wireless communication protocol, a radio frequency identification (RFID) protocol, or a near field communication (NFC) protocol. The wireless accessory device can provide for accessing the second SIM/eSIM when the wireless communication device is not designed to include multiple SIMs/eSIMs on multiple UICCs and/or on an eUICC, e.g., the wireless communication device includes a bay for only a single removable UICC and/or uses internal eSIMs on an eUICC without support for another SIM on a removable UICC. The wireless accessory device, in general, permits access to SIMs/eSIMs for connections to wireless networks through the wireless communication device, where the activated SIM/eSIM is not resident in the wireless communication device. The second SIM/eSIM resident in the wireless accessory device can support all the same functions as a first SIM/eSIM resident in the wireless communication device, in some embodiments. Multiple external SIMs/eSIMs can be resident in the wireless accessory device. The first "internal" SIM/eSIM resident in the wireless communication device can operate independently of the second "external" SIM/eSIM resident in the wireless accessory device.

FIG. 1 illustrates a representative "generic" wireless network 100 that can include a wireless communication device 102 connected by one or more radio links 126 to one or more radio sectors 104 provided by a radio access network 128. Each radio sector 104 can represent a geographic area of radio coverage emanating from an associated radio node 108 using a radio frequency channel operating at a selected frequency. Each radio node 108 can generate one or more radio sectors 104 to which the wireless communication device 102 can connect by one or more radio links 126. In some wireless networks 100, the wireless communication device 102 can be connected to more than one radio sector 104 simultaneously. The multiple radio sectors 104, to which the wireless communication device 102 can be connected, can emanate from a single radio node 108 or from separate radio nodes 108 that can share a common radio controller 110. A group of radio nodes 108 together with the associated radio controller 110 can be referred to as a radio access subsystem 106. Typically each radio node 108 in a radio access subsystem 106 can include a set of radio frequency transmitting and receiving equipment mounted on an antenna tower, and the radio controller 110 connected to the radio nodes 108 can include electronic equipment for controlling and processing transmitted and received radio frequency signals. The radio controller 110 can manage the establishment, maintenance and release of the radio links 126 that connect the wireless communication device 102 to the radio access network 128.

Radio resources that form the radio links 126 in the radio sectors 104 can be shared among multiple wireless communication devices 102 using a number of different multiplexing techniques, including time division, frequency division, code division, space division and combinations thereof. A radio resource control (RRC) signaling connection can be used to communicate between the wireless communication device 102 and the radio controller 110 in the radio access subsystem 106 of the radio access network 128 including requests for and dynamic allocations of radio resources to multiple wireless communication devices 102. The wireless communication device 102 can be connected to the radio access network 128 through one or more radio sectors 104 simultaneously. In some embodiments, the wireless communication device 102 and the wireless network 100 support diversity communication and/or multiple input multiple output (MIMO) communication, in which radio frequency signals are sent through two or more separate wireless communication paths (also referred to as channels), e.g., to provide redundant data through the multiple paths to improve signal reception and decoding which can in turn improve downlink performance, or to provide additional data through the multiple paths to increase the downlink data rates.

The radio access network 128, which provides radio frequency air link connections to the wireless communication device 102, connects also to a core network 112 that can include a circuit switched domain 122, usually used for voice traffic, and a packet switched domain 124, usually used for data traffic. Radio controllers 110 in the radio access subsystems 106 of the radio access network 128 can connect to both a circuit switching center 118 in the circuit switched domain 122 and a packet switching node 120 in the packet switched domain of the core network 112. The circuit-switching center 118 can route circuit switched traffic, such as a voice call, to a public switched telephone network (PSTN) 114. The packet switching node 120 can route packet switched traffic, such as a "connectionless" set of data packets, to a public data network (PDN) 116.

Figure 2:
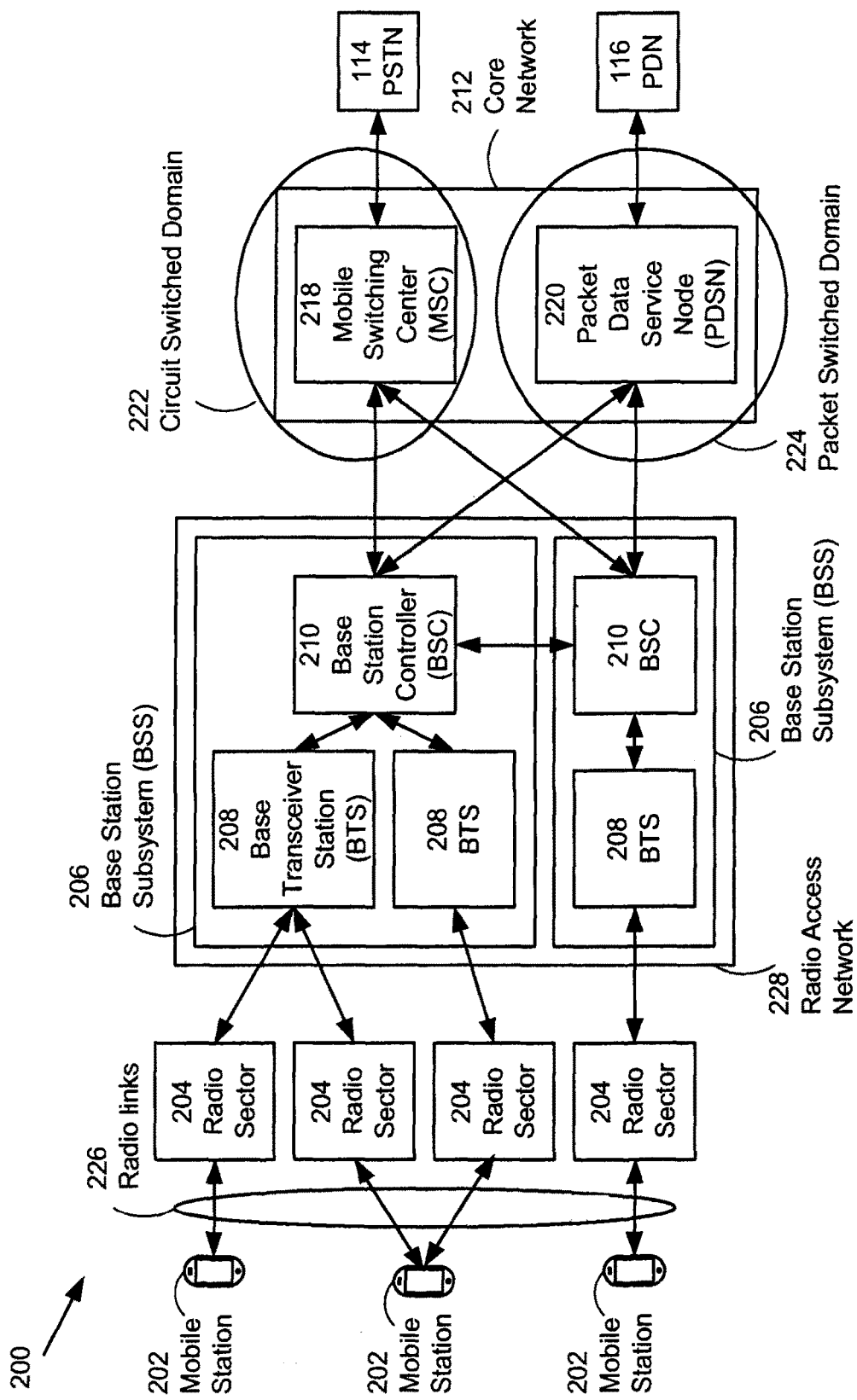
FIG. 2 illustrates components of a legacy 2G/3G wireless communication network, in accordance with some embodiments.

FIG. 2 illustrates a representative legacy 2G/3G wireless network 200 that can include elements comparable to those described for the "generic" wireless network 100 shown in FIG. 1. (For example, the legacy 2G/3G wireless network 200 can be a CDMA 2000 1× wireless network, a GSM wireless network, a UMTS wireless network, or a CDMA EV-DO wireless network.) Multiple mobile stations 202 can connect to one or more radio sectors 204 through one or more radio frequency links 226. Each radio sector 204 can radiate outward from a base transceiver station (BTS) 208 that can connect to a base station controller (BSC) 210, together forming a base station subsystem (BSS) 206. Multiple base station subsystems 206 can be aggregated to form a radio access network 228. Base station controllers 210 in different base station subsystems 206 can be interconnected. The base station controllers 210 can connect to both a circuit switched domain 222 that use multiple mobile switching centers (MSC) 218 and a packet switched domain 224 formed with packet data service nodes (PDSN) 220, which together can form a core network 212 for the wireless network 200. As with the generic wireless network 100 described above, the circuit switched domain 222 of the core network 212 can interconnect to the PSTN 114, while the packet switched domain 224 of the core network 212 can interconnect to the PDN 116. Legacy wireless networks 200 can provide services for wireless communication devices, e.g., mobile stations 202, that can be unable to be provided by a 4G wireless network, e.g., a circuit switched voice connection via the legacy wireless network 200. Legacy wireless networks 200 can be used in parallel with 4G wireless networks to provide a range of advanced services, e.g., through the 4G wireless network, and a range of legacy services, e.g., through the legacy 2G/3G wireless network 200, for the same wireless communication device. In some embodiments, the legacy 2G/3G wireless network 200 provides voice services and/or circuit switched services, while the 4G wireless network provides data/internet and/or packet switched services. In some embodiments, the legacy 2G/3G wireless network 200 is used for a first subscriber identity, while the 4G wireless network is used for a second subscriber identity. In some embodiments, each wireless network, e.g., the legacy 2G/3G wireless network 200 and the 4G wireless network, can be used by one or more subscriber identities (e.g., as part of a fallback procedure or a roaming agreement).

Figure 3:
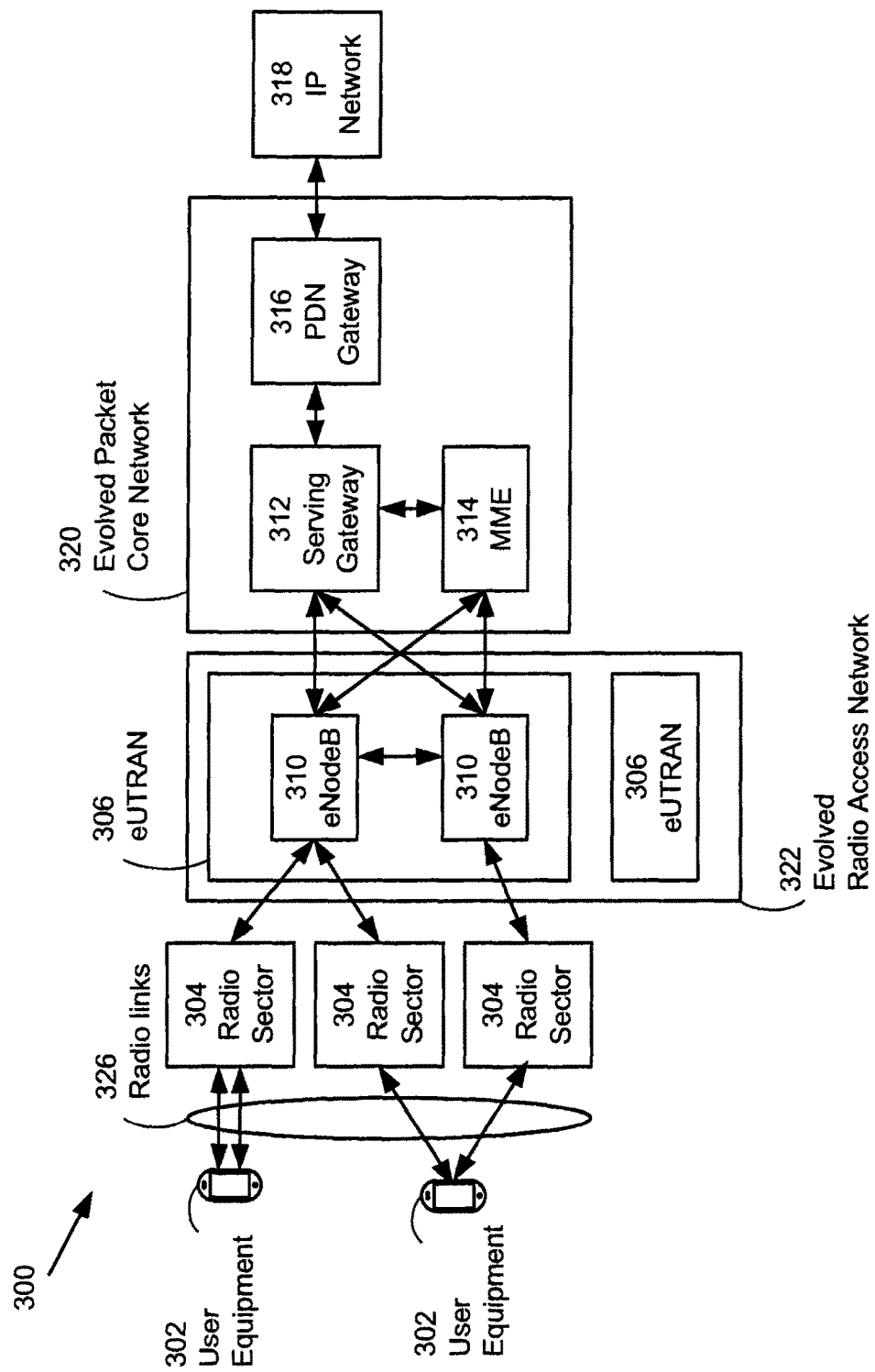
FIG. 3 illustrates components of a 4G Long Term Evolution (LTE) or LTE-Advanced (LTE-A) wireless communication network, in accordance with some embodiments.

FIG. 3 illustrates a representative architecture for a 4G Long Term Evolution (LTE) or LTE-Advanced wireless network 300, which is designed as a packet switched network exclusively. A user equipment (UE) 302 can connect to an evolved radio access network 322 through radio links 326 associated with radio sectors 304 that emanate from evolved Node B's (eNodeB) 310. The eNodeB 310 can include the functions of both transmitting and receiving base stations (such as the BTS 208 in the legacy wireless network 200) as well as base station radio controllers (such as the BSC 210 in the legacy wireless network 200). The equivalent core network of the LTE wireless network 300 is an evolved packet core network 320 including serving gateways 312 that interconnect the evolved radio access network 322 to public data network (PDN) gateways 316 that connect to external internet protocol (IP) networks 318. Multiple eNodeB 310 can be grouped together to form an eUTRAN 306. The eNodeB 310 can also be connected to a mobility management entity (MME) 314 that can provide control over connections for the user equipment 302. The eNodeB 310 can control allocation of radio resources for the radio links 326 to the user equipment 302. The eNodeB 310 can communicate paging messages to the user equipment 302, including paging messages to establish an RRC connection with the user equipment 302.

Figure 4:
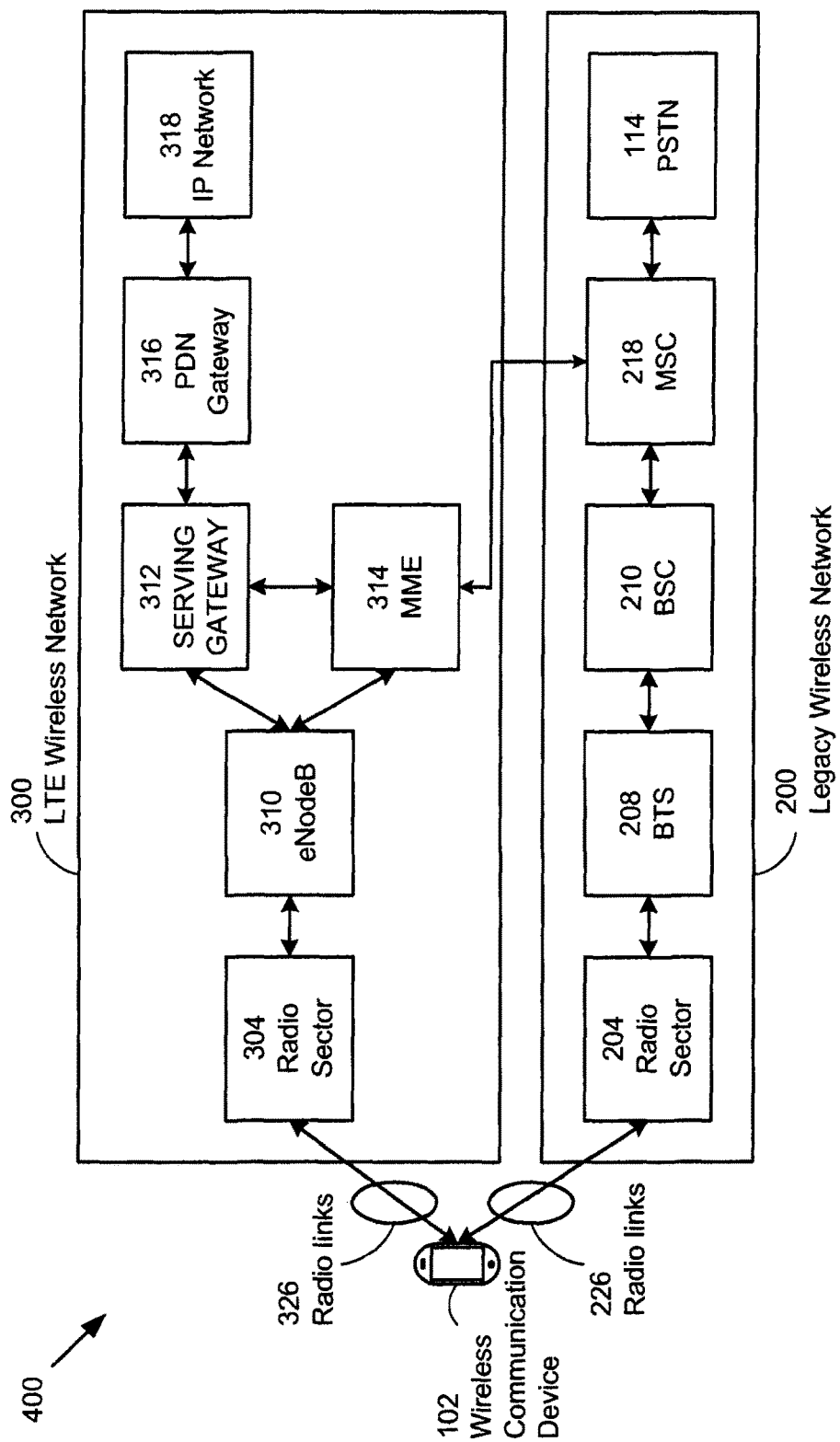
FIG. 4 illustrates a wireless communication device connected in parallel with the legacy 2G/3G wireless communication network of FIG. 2 and with the 4G LTE or LTE-A wireless communication network of FIG. 3, in accordance with some embodiments.

FIG. 4 illustrates a diagram 400 of a wireless communication device 102 in communication with both the 4G LTE/LTE-A wireless network 300 and with the legacy 2G/3G wireless network 200. (The generic term "wireless communication device" 102 shall be used hereinafter to denote a mobile terminal, a mobile station, a user equipment, or other comparable recognized term for a mobile wireless device that can connect through one or more wireless access networks to one or more wireless networks.) The legacy 2G/3G wireless network 200 can connect to the circuit-switched based public switched telephone network (PSTN) 114 through a mobile switching center (MSC) 218. The legacy 2G/3G wireless network 200 can provide circuit-switched services, e.g., circuit-switched voice connections for the wireless communication device 102, such as used in a circuit-switched fallback (CSFB) procedure. The MSC 218 of the legacy 2G/3G wireless network 200 can be interconnected to the MME 314 of the 4G LTE/LTE-A wireless network 300 to coordinate call signaling for the wireless communication device 102, in some embodiments. FIG. 4 illustrates a representative interconnection between the legacy 2G/3G wireless network 200 and the 4G wireless network 300 that can provide for coordination of wireless services between them, in some embodiments. In some embodiments, two or more parallel wireless networks can be interconnected to support subscriber mobility, e.g., based on roaming agreements between wireless network providers. In some embodiments, multiple wireless networks can provide separate services to the wireless communication device 102, e.g., when the wireless communication device 102 supports multiple subscriber identities, with each subscriber identity being associated with one of the multiple wireless networks (or more generally with a wireless network operator and/or service provider that offers services via one of the wireless networks).

Figure 5A:
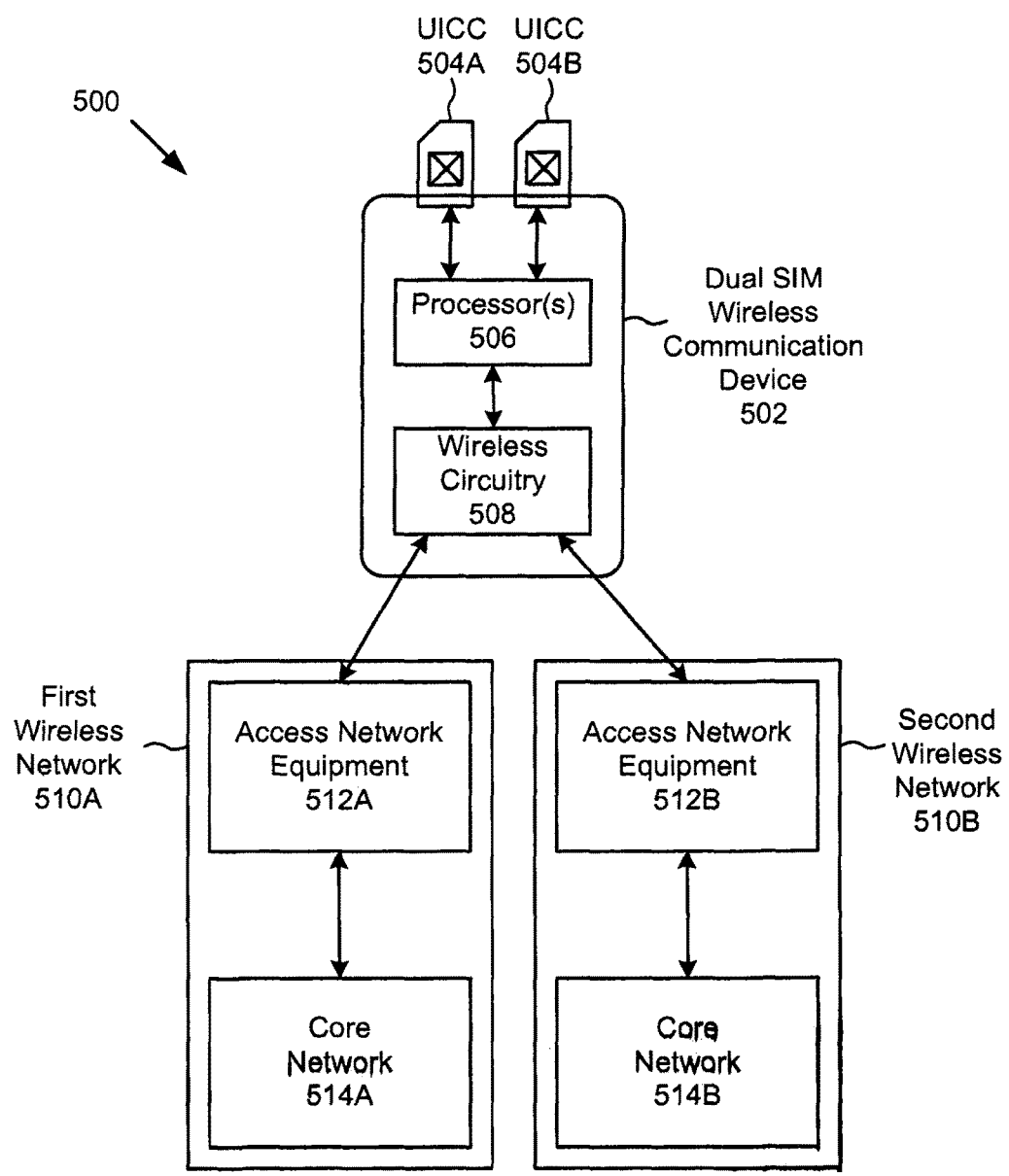
FIG. 5A illustrates a diagram of a dual subscriber identity module (SIM) wireless communication device connected in parallel with two wireless networks, in accordance with some embodiments.

FIG. 5A illustrates a diagram 500 of components of a dual SIM wireless communication device 502 including one or more processor(s) 506 and wireless circuitry 508 that provides for wireless radio frequency (RF) connections between the dual SIM wireless communication device 502 and a first wireless network 510A and a second wireless network 510B. In some embodiments, the wireless circuitry 508 includes one or more baseband processor(s), and a set of RF analog front-end circuitry. In some embodiments, the wireless circuitry 508 and/or a portion thereof can include or be referred to as a wireless transmitter/receiver or a transceiver or a radio. The terms circuit, circuitry, component, and component block may be used interchangeably herein, in some embodiments, to refer to one or more operational units of a wireless communication device that process and/or operate on digital signals, analog signals, or digital data units used for wireless communication. For example, representative circuits can perform various functions that convert digital data units to transmitted radio frequency analog waveforms and/or convert received analog waveforms into digital data units including intermediate analog forms and intermediate digital forms. The wireless circuitry 508 can include components of RF analog front-end circuitry, e.g. a set of one or more antennas, which can be interconnected with additional supporting RF circuitry that can include filters and other analog components that can be "configured" for transmission and/or reception of analog signals via one or more corresponding antennas to one or more of the first and second wireless networks 510A/B.

The processor(s) 506 and the wireless circuitry 508 can be configured to perform and/or control performance of one or more functionalities of the dual SIM wireless communication device 502, in accordance with various implementations. The processor(s) 506 and the wireless circuitry 508 can provide functionality for coordinating hardware/software resources in the dual SIM wireless communication device 502 to improve performance and reduce power consumption for mobility management of connections to one or more of the wireless networks 510A/B. The processor(s) 506 may include multiple processors of different types that can provide for both wireless communication management and/or higher layer functions, e.g., one or more of the processor(s) 506 may be configured to perform data processing, application execution, and/or other device functions according to one or more embodiments of the disclosure. The dual SIM wireless communication device 502, or portions or components thereof, such as processor(s) 506, can include one or more chipsets, which can respectively include any number of coupled microchips thereon.

In some embodiments, the processor(s) 506 may be configured in a variety of different forms. For example, the processor(s) 506 may be associated with any number of microprocessors, co-processors, controllers, or various other computing or processing implements, including integrated circuits such as, for example, an application specific integrated circuit (ASIC), a field programmable gate array (FPGA), or any combination thereof. In various scenarios, multiple processors 506 of the dual SIM wireless communication device 502 can be coupled to and/or configured in operative communication with each other, and these components may be collectively configured to perform mobility management functions associated with multiple subscriber identities associated with wireless services provided via multiple wireless networks. In some implementations, the processor(s) 506 can be configured to execute instructions that may be stored in memory, or that can otherwise be accessible to the processor(s) 506 in some other device memory. As such, whether configured as, or in conjunction with, hardware or a combination of hardware and software, the processor(s) 506 may be capable of performing operations according to various implementations described herein, when configured accordingly. In various embodiments, memory in the dual SIM wireless communication device 502 may include multiple memory devices that can be associated with any common volatile or non-volatile memory type. In some scenarios, the memory may be associated with a non-transitory computer-readable storage medium that can store various computer program instructions, which may be executed by the processor(s) 506 during normal program executions. In this regard, the memory can be configured to store information, data, applications, instructions, or the like, for enabling the wireless communication device to carry out various functions in accordance with one or more embodiments of the disclosure. In some implementations, the memory may be in communication with, and/or otherwise coupled to, the processor(s) 506, as well as one or more system buses for passing information between and amongst the different device components of the dual SIM wireless communication device 502.

The dual SIM wireless communication device 502 illustrated in FIG. 5A includes two removable UICCs 504A/B, which can be inserted and removed from the dual SIM wireless communication device 502 together or independently. Each UICC 504A/B includes at least one software identity module (SIM), which can be embodied as a software/firmware program installed on the UICC 504A/B. Removable UICCs 504A/B can provide a user of the dual SIM wireless communication device 502 the ability to replace a UICC to change services, provided the dual SIM wireless communication device 502 supports such flexibility (e.g., an "unlocked" device that is not "locked" to a particular wireless network operator or service provider). Hardware complexity and/or a size of a wireless communication device can limit the ability to include multiple UICC slots, and thus additional arrangements for wireless communication devices are illustrated further herein to include multiple SIMs on a single UICC and/or electronic SIMs (eSIMs) on an embedded UICC or combinations thereof. The dual SIM wireless communication device 502, in some embodiments, can register with two different wireless networks, e.g., the first and second wireless networks 510A/B, simultaneously. The wireless circuitry 508 of the dual SIM wireless communication device 502 can be configured to register with and/or establish a connection with the first wireless network 510A via access network equipment 512A, which interfaces with a core network 514A. The wireless circuitry 508 of the dual SIM wireless communication device 502 can also be configured to register with and/or establish a connection with the second wireless network 510B via access network equipment 512B, which interfaces with a core network 514B. In some embodiments, the wireless circuitry 508 of the dual SIM wireless communication device 502 supports simultaneous transmission and reception to both the first and second wireless networks 510A/B. In some embodiments, the wireless circuitry 508 of the dual SIM wireless communication device 502 supports transmission and reception to only one of the first and second wireless networks 510A/B at a time. In some embodiments, the wireless circuitry 508 of the dual SIM wireless communication device 502 supports transmission to only one of the first and second wireless networks 510A/B at a time and reception from one or both of the first and second wireless networks 510A/B. As the dual SIM wireless communication device 502 can register with two different wireless networks simultaneously via two different subscriptions, the dual SIM wireless communication device 502 can appear as two distinct devices (each associated with a different number, user, and/or subscription). A dual SIM wireless communication device 502 that can connect to only one wireless network at a time but can monitor and/or receive communication from two wireless networks with which it is registered can be referred to as a "Dual SIM, Dual Standby" (DSDS) wireless communication device. A dual SIM wireless communication device 502 that can connect to two wireless networks simultaneously using two different subscriber identities can be referred to as a "Dual SIM, Dual Active" (DSDA) wireless communication device. In general the dual SIM wireless communication device 502 can be referred to as a "DSDx" wireless communication device, where "x" can indicate either "S" for "standby" or "A" or "active".

The dual SIM wireless communication device 502 can include two wireless cellular protocol software stacks, which can run on the one or more processors 506. Each wireless cellular protocol software stack can be associated with a distinct subscriber identity and can support communication with a wireless network based on the subscriber identity. In some embodiments, each wireless cellular protocol software stack runs on its own processor 506, while in other embodiments, both wireless cellular protocol software stacks run on a common processor 506. Each wireless cellular protocol software stack can support communication using one or more different radio access technologies (RATs), e.g., in accordance with a set of 2G, 3G, and/or 4G wireless communication protocols. In some embodiments a wireless cellular protocol software stack can support communication using a single radio access technology (RAT), e.g., 2G GSM or 3G UMTS. As described further herein, the wireless cellular protocol software stacks can communicate with each other to provide synergy and cooperation in mobility management for the dual SIM wireless communication device 502. In a representative embodiment, the SIMs contained on the two UICCs 504A/B can be associated with the same wireless service provider, in which case the SIMs may support connections for the dual SIM wireless communication device 502 via the same wireless network. Alternatively, the SIMs contained on the two UICCs 504A/B can be associated with different wireless service providers that offer service via the same wireless network, e.g., one as a "home" wireless network and the other as a "roaming" wireless network, or one as a "home" wireless network for a first mobile network operator (also referred to as a wireless carrier or a wireless service provider) and another as a "home" wireless network for a second mobile virtual network operator (MVNO). Thus, in many circumstances, the dual SIM wireless communication device 502 can connect to the same physical wireless network using two different subscriber identities. When the dual SIMs support connections for the same wireless network operator or for different wireless network operators via the same wireless network, information used to support wireless connections and mobility of the dual SIM wireless communication device 502 can be shared between the two wireless cellular protocol software stacks. Sharing information between the wireless cellular protocol software stacks can reduce radio frequency interference and/or reduce conflict between the wireless cellular protocol software stacks. Sharing information between the wireless cellular protocol software stacks can also reduce power consumption of the dual SIM wireless communication device 502, as duplicate operations can be reduced or eliminated.

In some embodiments, the dual SIM wireless communication device 502 can be configured to force connections for each subscriber identity to use the same physical wireless network, the same access network equipment, and/or the same cell/radio sector using the same radio access technology for the same wireless network when supported. In some embodiments, the first and second wireless networks 510A/B can be the same wireless network, and the wireless circuitry 508 can be connected to the same cell using the same RAT via the same access network equipment 512A/B. The same cell/RAT/access network/wireless network can be used when both SIMs of the dual SIM wireless communication device 502 are associated with the same wireless service provider via a subscription agreement or via a roaming agreement. Mobility management information, such as neighbor cell lists, neighbor cell measurements, cell reselection measurements, handover processes, etc., can be shared between the wireless cellular protocol software stacks to reduce wasted duplication of mobility management tasks performed by the dual SIM wireless communication device 502 and to coordinate resources available in the dual SIM wireless communication device 502 for mobility management.

It should be appreciated that not all of the components, device elements, and hardware illustrated in and described with respect to the dual SIM wireless communication device 502 of FIG. 5A may be essential to this disclosure, and thus, some of these items may be omitted, consolidated, or otherwise modified within reason. Additionally, in some implementations, the subject matter associated with the dual SIM wireless communication device 502 can be configured to include additional or substitute components, device elements, or hardware, beyond those depicted within the illustrations of FIG. 5A.

Figure 5B:
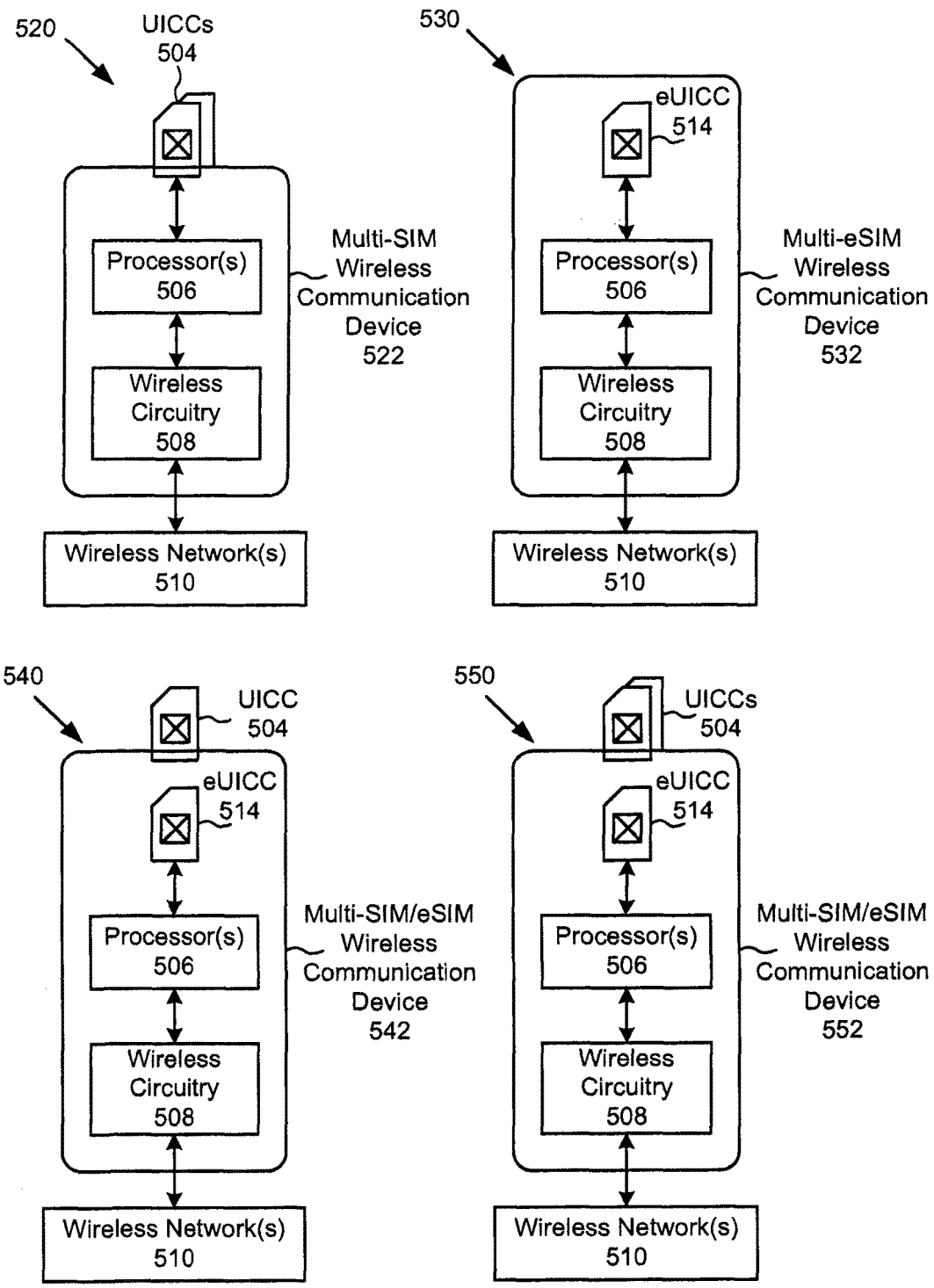
FIG. 5B illustrates diagrams for wireless communication devices that support multiple subscriber identities, in accordance with some embodiments.

FIG. 5B illustrates diagrams for additional wireless communication devices that support multiple subscriber identities using removable UICCs and/or embedded UICCs with subscriber identity modules implemented thereon. As illustrated in diagram 520, a multi-SIM wireless communication device 522 includes multiple UICCs 504, which can be inserted and removed individually or together, and communicate with one or more processors 506 that connect to wireless circuitry 508 that provides for wireless communication with one or more wireless networks 510. As the physical size and design of the multi-SIM wireless communication device 522 can limit the number of UICCs 504 that can be supported, alternatively as shown by diagram 530, a multi-eSIM wireless communication device 532 can include an embedded UICC (eUICC) 514 connected with the processor(s) 506 and to the wireless network(s) 510 via the wireless circuitry 508. The eUICC 514 can be built into the multi-eSIM wireless communication device 532 and can be not removable from the multi-eSIM wireless communication device 523, e.g., permanently affixed to a circuit board in the multi-eSIM wireless communication device 523. The eUICC 514 can be programmed such that one or more electronic SIMs (eSIMs) can be implemented on the eUICC. Each eSIM can be associated with a distinct subscriber identity and/or provide distinct services or subscriptions for a user of the multi-eSIM wireless communication device 532. Diagram 540 illustrates a multi-eSIM/SIM wireless communication device 542 that includes a removable UICC 504, on which can be installed one or more SIMs, and an eUICC 514 on which one or more eSIMs can be installed. The combination of SIMs on the UICC 504 and/or eSIMs on the eUICC 514 can provide for connections to one or more wireless networks 510 using the wireless circuitry 508 under the control of the processor(s) 506 of the multi-SIM/eSIM wireless communication device 542. In some embodiments, the multi-SIM/eSIM wireless communication device 542 can generate an eSIM on the eUICC 514 based on information and/or applications installed on the removable UICC 504. Diagram 550 illustrates another multi-eSIM/SIM wireless communication device 552 that includes multiple UICCs 504, on which one or more SIMs can be installed, and an eUICC 514, on which one or more eSIMs can be installed. The combination of SIMs on the UICC 504 and/or eSIMs on the eUICC 514 can provide for connections to one or more wireless networks 510 using the wireless circuitry 508 under the control of the processor(s) 506 of the multi-SIM/eSIM wireless communication device 552. In some embodiments, the multi-SIM/eSIM wireless communication device 552 can generate an eSIM on the eUICC 514 based on information and/or applications installed on one or more of the removable UICCs 504. In general, a wireless communication device 102 that supports multiple subscriber identities can include (i) at least one UICC 504 or at least one eUICC 514 and (ii) one or more additional UICCs 504. Each UICC 504 can support one or more SIMs, and each eUICC 514 can support one or more eSIMs. A wireless communication device 102 that supports multiple subscriber identities, e.g., 502, 522, 532, 542, 552, can include a combination of SIMs and/or eSIMs to support communication with one or more wireless networks 510.

Figure 6:
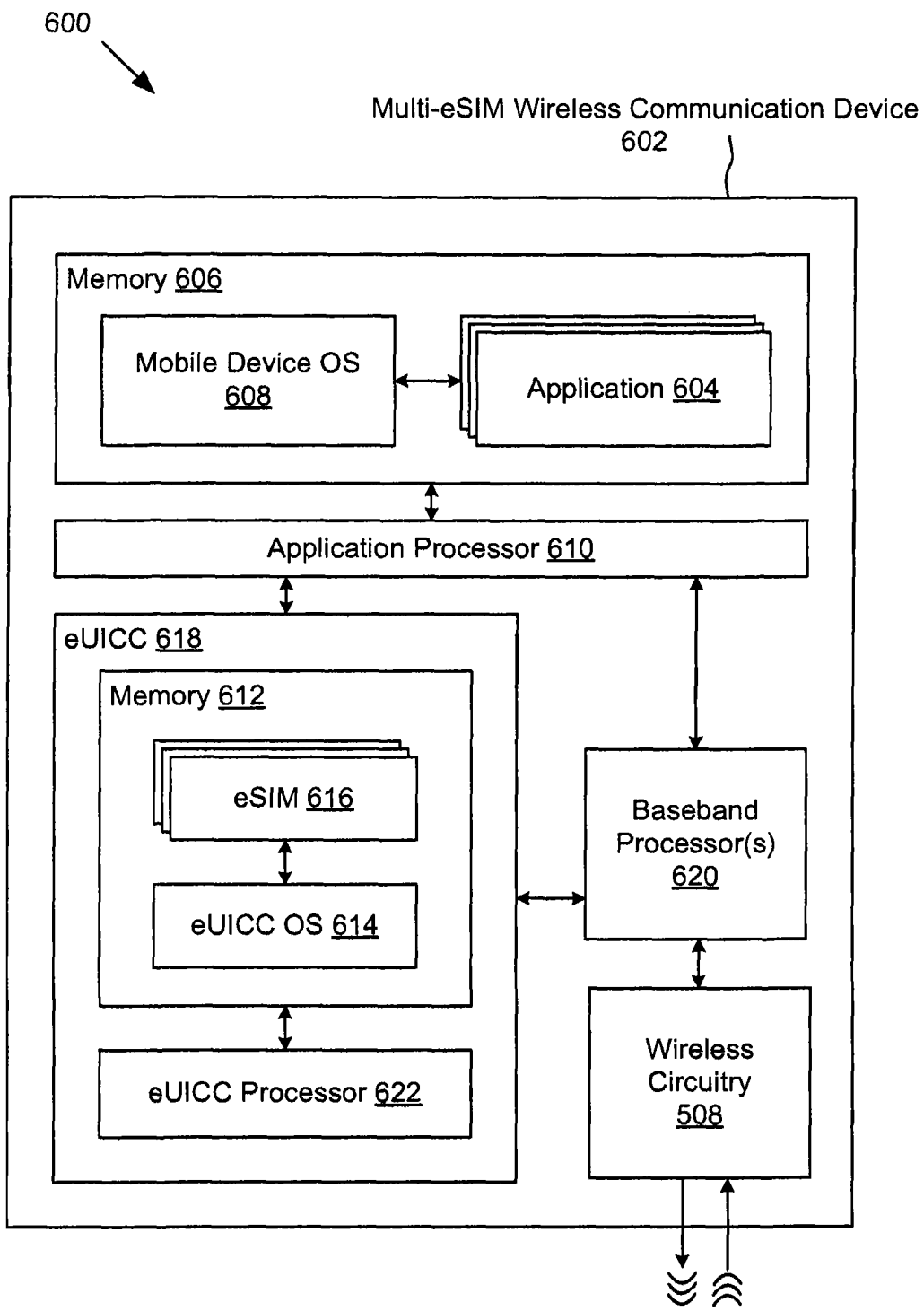
FIG. 6 illustrates a block diagram of components in a multi-eSIM mobile wireless communication device, in accordance with some embodiments.

FIG. 6 illustrates a block diagram 600 of components in a multi-eSIM wireless communication device 602. While described in terms of a multi-eSIM wireless communication device 602, the same or similar blocks and functions can exist in a dual SIM wireless communication device 502, a multi-SIM wireless communication device 522, a multi-eSIM wireless communication device 532, or a multi-SIM/eSIM wireless communication device 542/552. The multi-eSIM wireless communication device 602 includes wireless circuitry 508, with which to transmit and receive radio frequency wireless signals, one or more baseband processors 620, with which to process and convert between radio frequency wireless signals and digital data, and an application processor 610 coupled to memory 606, on which a mobile device operating system (OS) 608 and one or more applications 604 can be stored. The application processor 610 can provide higher layer functional processing (e.g., for an application layer and/or for a transport layer), while the baseband processor 620 can provide lower layer functional processing (e.g., for a physical layer, for a medium access control (MAC) layer, and/or for a network layer). (In some embodiments, the one or more processors 506 of the multiple SIM and/or multiple eSIM wireless communication devices described for FIGS. 5A and 5B can include the application processor 610 and/or the one or more baseband processors 620 as shown for the multi-eSIM wireless communication device 602 of FIG. 6.) An eUICC 618 can include its own memory 612 on which is stored an eUICC OS 614 and one or more eSIMs 616 and also can include an eUICC processor 622. The eUICC memory 612 and the eUICC processor 622 can enable the eUICC OS 622 to execute within the eUICC 618 to manage the one or more eSIMs 616. The application processor 610, eUICC processor 622, and the baseband processors 620 can operate together to enable the multi-eSIM wireless communication device 602 to establish connections with and access services on one or more wireless networks.

Figure 7A:
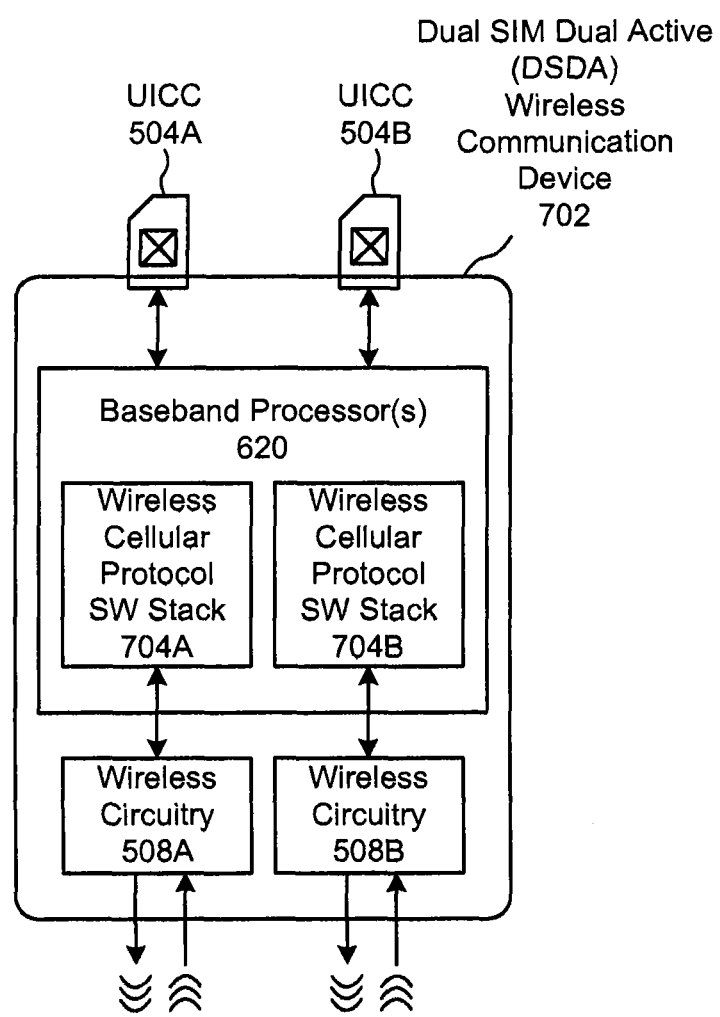
FIG. 7A illustrates a diagram of a dual SIM, dual active (DSDA) wireless communication device, in accordance with some embodiments.

FIG. 7A illustrates a diagram 700 of a dual SIM, dual active (DSDA) wireless communication device 702, which includes two removable UICCs 504A/B, on which at least two SIMs are installed, e.g., one SIM on each of the UICCs 504A/B. Each UICC 504A/B can communicate with one or more baseband processors 620 (e.g., via an application processor 610 and/or directly as illustrated in FIG. 6). A first wireless cellular protocol software (SW) stack 704A on the one or more baseband processors 620 can communicate with a first wireless network via wireless circuitry 508A, while a second wireless cellular protocol SW stack 704B can communicate with a second wireless network via wireless circuitry 508B. With parallel wireless circuitry 508A/B, the DSDA wireless communication device 702 can interact with two wireless networks independently without requiring an interface or interaction between the wireless cellular protocol SW stacks 704A/B. Each of the wireless cellular protocol SW stacks 704A/B can support communication using one or more wireless communication protocols (e.g., a combination of 2G, 3G, and/or 4G) or using a single wireless communication protocol (e.g., 2G GSM, or 3G UMTS, or 2G CDMA 2000 1x, etc.). With sufficient parallel wireless circuitry 508A/B and parallel wireless cellular protocol SW stacks 704A/B, the DSDA wireless communication device 702 can be registered with two different wireless networks and can form connections with the two different wireless networks in parallel and independently. The DSDA wireless communication device 702 can receive notifications (e.g., paging messages and/or paging indications) from a second wireless network while connected to a first wireless network, as the parallel wireless circuitry 508A/B permits parallel communication to two different wireless networks. As described further herein, operational efficiency of the DSDA wireless communication device 702 can be improved by linking the wireless cellular protocol SW stacks 704A/B together and exchanging protocol information and/or wireless network information between them. Cooperation between the two cellular protocol SW stacks 704A/B can provide for sharing tasks used for mobility management of the DSDA wireless communication device 702. In some embodiments, the first and second wireless networks can be the same wireless network, and the DSDA wireless communication device 702 can communicate with the same wireless network via the two different wireless cellular protocol SW stacks 704A/B and the parallel wireless circuitry 508A/B. When the DSDA wireless communication device 702 is associated with the same wireless network for two different subscriber identities, the DSDA wireless communication device 702 can operate more efficiently by sharing tasks and/or information between the wireless cellular protocol SW stacks 704A/B as described further herein.

Figure 7B:
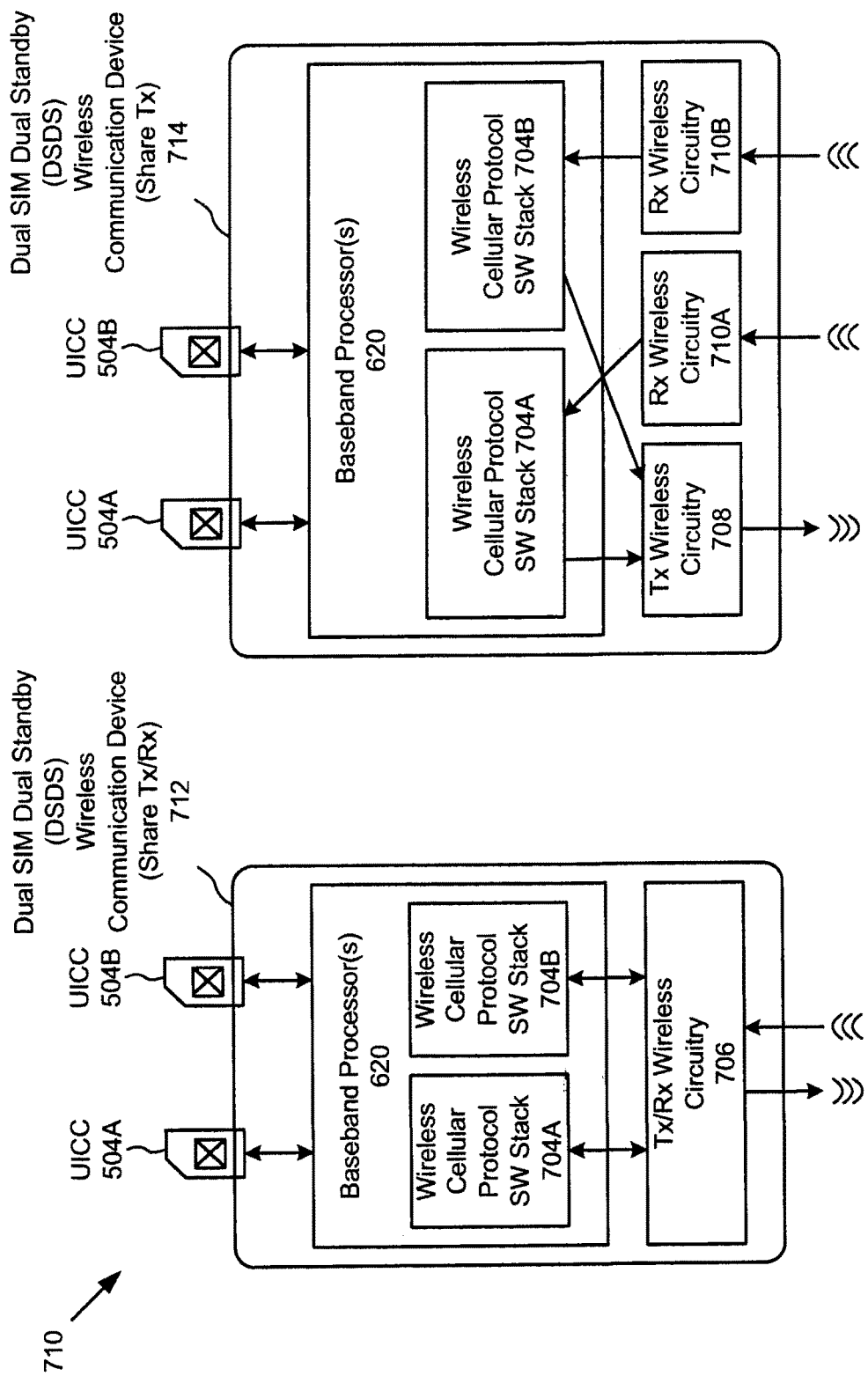
FIG. 7B illustrates a diagram of a dual SIM, dual standby (DSDS) wireless communication device, in accordance with some embodiments.

FIG. 7B illustrates a diagram 710 for two configurations of dual SIM, dual standby (DSDS) wireless communication devices 712/714. A first DSDS wireless communication device 712 includes two removable UICCs 504A/B, on which at least two SIMs are installed, and each UICC 504A/B can communicate with one or more baseband processors 620, on which two wireless cellular protocol software stacks 704A/B operate. Each wireless cellular protocol software stack 704A/B can communicate with a respective wireless network via a set of common transmit/receive (Tx/Rx) wireless circuitry 706. In some embodiments, the set of common Tx/Rx wireless circuitry 706 provides for transmission and/or reception by one wireless cellular protocol SW stack 704A or 704B at a time, and thus the DSDA wireless communication device 712 can be associated with two (or more) wireless networks at the same time but not be able to communicate with both wireless networks simultaneously. For example, the DSDA wireless communication device 712 can be configured to operate in a time division mode that shares the Tx/Rx wireless circuitry 706 among the wireless cellular protocol SW stacks 704A/B. In some embodiments, the wireless cellular protocol SW stacks 704A/B can both operate in an idle mode and listen for paging messages from each of two different wireless networks (e.g., alternate listening for paging messages from each wireless network by reconfiguring if required the Tx/Rx wireless circuitry 706 to receive signals from each wireless network.) When one of the wireless cellular protocol software stacks 704A or 704B operates in a connected state, the other wireless cellular protocol software stack can operate in an idle state with limited access to listen for paging messages. The idle wireless cellular protocol software stack can be unable to connect with a wireless network until the connected wireless cellular protocol software stack transitions from the connected state back to an idle state. Thus, the DSDS wireless communication device 712 can permit connections with two different wireless networks using two different subscriber identities but only one connection at any time.

In a second configuration of a DSDS wireless communication device 714, as illustrated in FIG. 7B, a shared set of wireless circuitry 708/710A/B provides for one transmit path and two parallel receive paths that can be used simultaneously. Each wireless cellular protocol software stack 704A/B can be configured to transmit via a set of transmit (Tx) wireless circuitry 708, but only one wireless cellular protocol software stack 704A/B can communicate at any one time via the Tx wireless circuitry 708. Both wireless cellular protocol software stacks 704A/B can receive radio frequency wireless signals via respective receive (Rx) wireless circuitry 710A/B in parallel. Thus the DSDS wireless communication device 714 can share transmit wireless circuitry 708 between two wireless cellular protocol SW stacks 704A/B, while permitting simultaneous reception via dedicated (and/or configurable) receive wireless circuitry 710A/B. The DSDS wireless communication device 714 can provide for a connection (e.g., bi-directional data and/or signaling communication) with only one wireless network at a time; however, paging messages (or other control signaling) can be received (e.g., in a downlink direction) from two wireless networks at the same time. Similarly, the parallel Rx wireless circuitry 710A/B can provide for reception of broadcast channels, signaling channels, synchronization channels, or other signals from two parallel wireless networks, e.g., for measurements of cells, as part of reselection and/or handover processes, when searching for wireless networks with which to establish connections, to perform downlink (DL) synchronization processes, and/or for associating or registering with wireless networks, etc. The DSDS wireless communication device 714 can be connected to a first wireless network, e.g., in a voice call, data connection, video call, or other bi-directional connection with the first wireless network, and can receive paging messages from a second wireless network at the same time. In some embodiments, the DSDS wireless communication device 714 can be configured to permit sharing of the Tx wireless circuitry 708, so that a first wireless cellular protocol software stack can respond to a paging message from a first wireless network while a second wireless cellular protocol software stack remains in a connected state with a second wireless network, e.g., by time sharing the Tx wireless circuitry 708. The DSDS wireless communication device 714, in some embodiments, can provide for limited communication with two wireless networks, e.g., by sharing the Tx wireless circuitry 708, but not permit two parallel, simultaneous bi-directional (transmit and receive) wireless connections to the two wireless networks. In some embodiments, each Rx wireless receive circuitry 710A/B can be configured to operate in accordance with a particular radio access technology (RAT), which can be the same RAT in some cases or different RATs in other cases. Each Rx wireless receive circuitry 710A/B can also be configured to use the same radio frequency band or different radio frequency bands. Each Rx wireless receive circuitry 710A/B, in some embodiments, can operate independently from the other. In some embodiments, the Rx wireless receive circuitry 710A/B operations are coordinated, e.g., by the wireless cellular protocol software stacks 704A/B or by other software running on the baseband processor(s) 620 (and/or by applications or processes running on an application processor). By adding a communication path between the wireless cellular protocol software stacks 704A/B in the DSDS wireless communication device 712/714, coordination of mobility management tasks can improve operation of the DSDS wireless communication device 712/714, as described further herein.

Figure 7C:
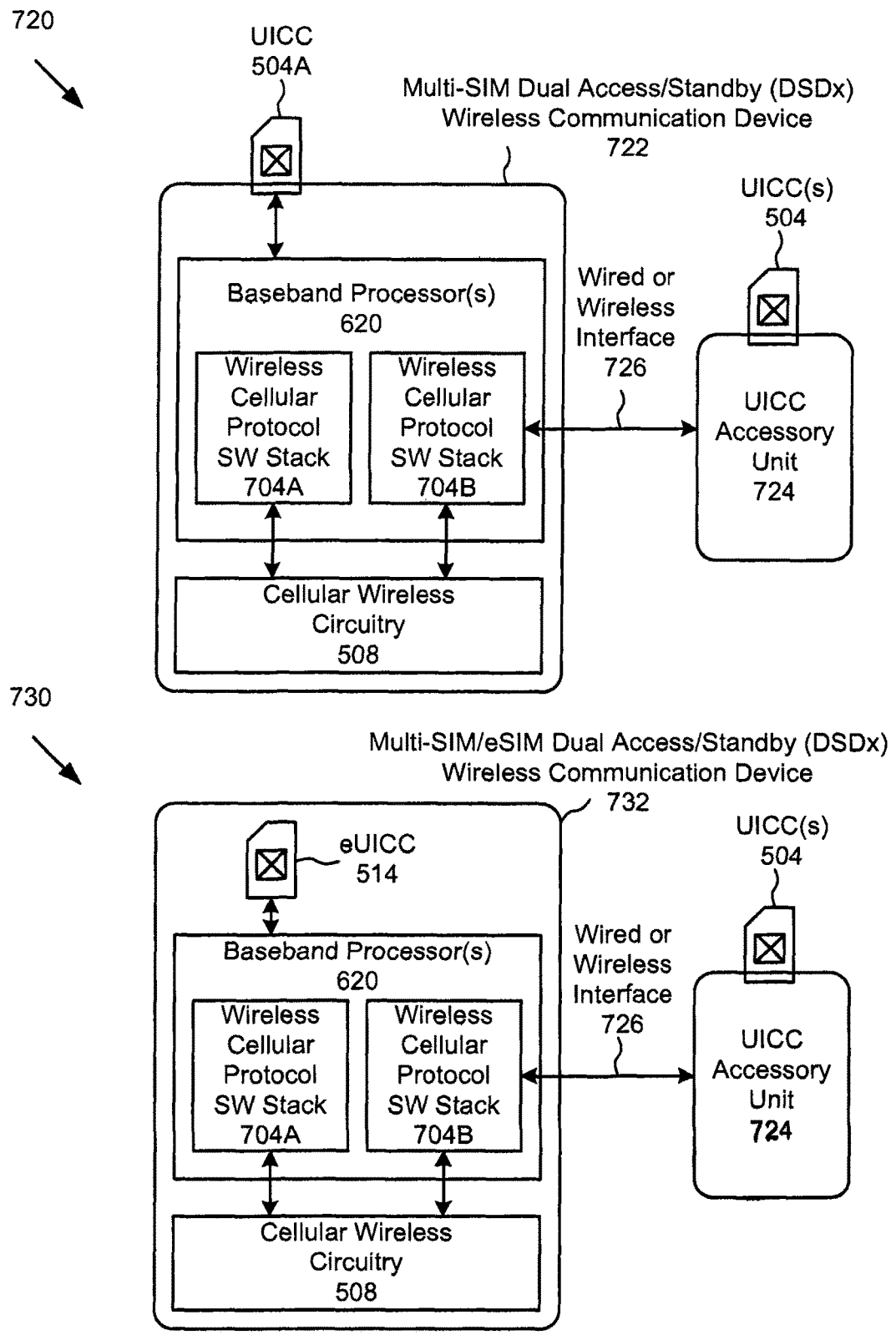
FIG. 7C illustrates representative dual SIM, dual access/standby (DSDx) wireless communication devices, in accordance with some embodiments.

FIG. 7C illustrates diagrams 720/730 for a multi-SIM, dual access/standby (DSDx) wireless communication device 722 and a multi-SIM/eSIM DSDx wireless communication device 732, in accordance with some embodiments. The multi-SIM DSDx wireless communication device 722 includes a first UICC 504A that can be inserted into or removed from a housing/body of the multi-SIM DSDx wireless communication device 722 and can communicate with one or more processors, e.g., baseband processor(s) 620, of the multi-SIM DSDx wireless communication device 722. The first UICC 504A can include one or more SIMs that provide for authorization and access to services on one or more wireless networks via the wireless cellular protocol SW stack 704A. In some embodiments, the UICC 504A provides for only one SIM to be installed and/or active on the UICC 504A at any one time, and the multi-SIM DSDx wireless communication device 722 can be limited to a single slot in which a UICC 504 can be installed. In some embodiments, the multi-SIM DSDx wireless communication device 722 supports communication with a UICC accessory unit 724 in which one or more UICCs 504 can be installed, e.g., as "supplemental" UICCs 504 that support additional subscriber identities via SIMs installed thereon. (The UICC accessory unit 724 can also be referred to more generally as a wireless accessory device that includes slots/bays for UICCs 504 and a wired or wireless interface for communication with a wireless communication device.) The UICC accessory unit 724 can communicate with the multi-SIM DSDx wireless communication device 722 through one or more wireless and/or wired interfaces 726, e.g., via Bluetooth®, Bluetooth® Low Energy, Wi-Fi, or other wireless local area network (WLAN) or wireless personal area network (WPAN) or radio frequency identification (RFID) connections, and/or via a USB, Lightning™ port, Ethernet port, or other wired connection. The UICC(s) 504 in the UICC accessory unit 724 can provide additional SIMs that can enable communication and services with one or more wireless networks, e.g., via the wireless cellular protocol SW stack 704B.

The multi-SIM/eSIM DSDx wireless communication device 732 illustrated in FIG. 7C replaces the removable UICC 504A of the multi-SIM DSDx wireless communication device 722 with an embedded UICC (eUICC) 514, on which one or more eSIMs can reside. The multi-SIM/eSIM DSDx wireless communication device 732 can also utilize a wired or wireless interface 726 to access SIMs provided on UICCs 504 installed in the UICC accessory unit 724. While FIG. 7C illustrates one wireless cellular protocol SW stack 704A associated with the "internal" UICC 504A or the eUICC 514 and a second wireless cellular protocol SW stack 704B associated with the "external" UICCs 504 in the UICC accessory unit 724, a skilled person can recognize that the wireless cellular protocol SW stacks 704A/B can be flexibly assigned under processor control to SIMs and/or to eSIMs on either the internal eUICC 514 of the multi-SIM/eSIM DSDx wireless communication device 732 or the external UICC(s) 504 of the UICC accessory unity 724. The DSDx wireless communication devices 722/732 illustrated in FIG. 7C provide for "remote" access to additional SIMs via wireless and/or wired connections to supplement internal SIMs/eSIMs. A single UICC or eUICC wireless communication device can be extended to include access for services, subscriber identities, and/or additional wireless networks through such an arrangement. The UICC accessory unit 724, in some embodiments, can accommodate UICC(s) 504 having different form factors, e.g., 2FF, 3FF, 4FF, or other form factors. The additional "external" SIMs on the UICC(s) 504 in the UICC accessory unit 724 can operate independently of the "internal" SIMs on the UICC 504A or eUICC 514, in some embodiments, and thus the multi-SIM DSDx wireless communication device 722 and/or the multi-SIM/eSIM DSDx wireless communication device 732 can operate as a "legacy" single-SIM (or eSIM) wireless communication device when only one SIM or eSIM is enabled for the DSDx wireless communication device 722/732.

Figure 8:
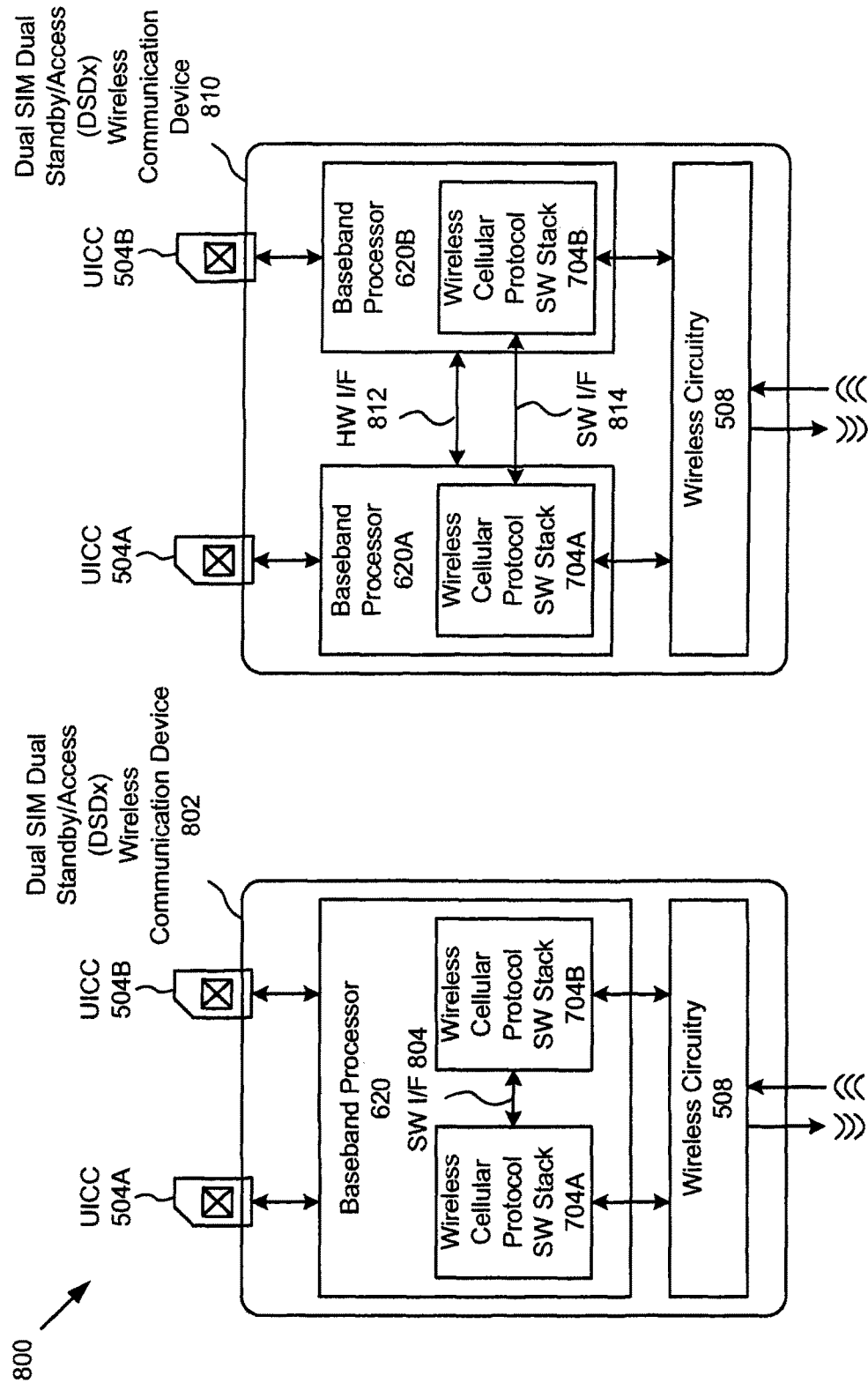
FIG. 8 illustrates representative dual SIM, dual access/standby (DSDx) wireless communication devices that include links between wireless cellular protocol software stacks, in accordance with some embodiments.

FIG. 8 illustrates representative dual SIM, dual access/standby (DSDx) wireless communication devices 802/810 that include links between parallel wireless cellular protocol software stacks 704A/B, e.g., as a software (SW) interface (I/F) connection 804 between the wireless cellular protocol software stacks 704A/B operating on the same baseband processor 620, or as a combination of a hardware (HW) interface connection 812 between two baseband processors 620A/B over which a software interface 814 between the wireless cellular protocol software stacks 704A/B residing on respective baseband processors 620A/B. The interfaces 804/812/814 can provide for communication between the wireless cellular protocol software stacks 704A/B and can enable cooperation and/or synergistic operation of the parallel wireless cellular protocol software stacks 704A/B. Each wireless cellular protocol software stack 704A/B can share all or portions of wireless circuitry 508 for communication with one or more wireless networks. Coordination of operation between the wireless cellular protocol software stacks 704A/B can provide for more efficient use of the wireless circuitry of the dual SIM DSDx wireless communication devices 802/810. The parallel wireless cellular protocol software stacks 704A/B can also exchange information between them. Information sharing and coordination of operation can result in greater efficiency of operation, e.g., for mobility management operations such as when searching for wireless networks, measuring cells of wireless networks, reselecting between cells of wireless networks, handover between cells of wireless networks, determining wireless circuitry settings for communication with cells of wireless networks, gathering and sharing wireless network and/or cell specific parameters, etc. In some embodiments, multiple baseband processors 620A/B are connected directly via the hardware interface 812, while in some embodiments, the multiple baseband processors 620A/B are connected individually via interfaces (and/or buses) to a common processor (not shown), e.g., an application processor. In some embodiments, a "direct" hardware interface 812 can provide a real-time or near real-time interface. In some embodiments, an "indirect" hardware interface (not shown) via another processor can provide a non-real-time interface.

Figure 9:
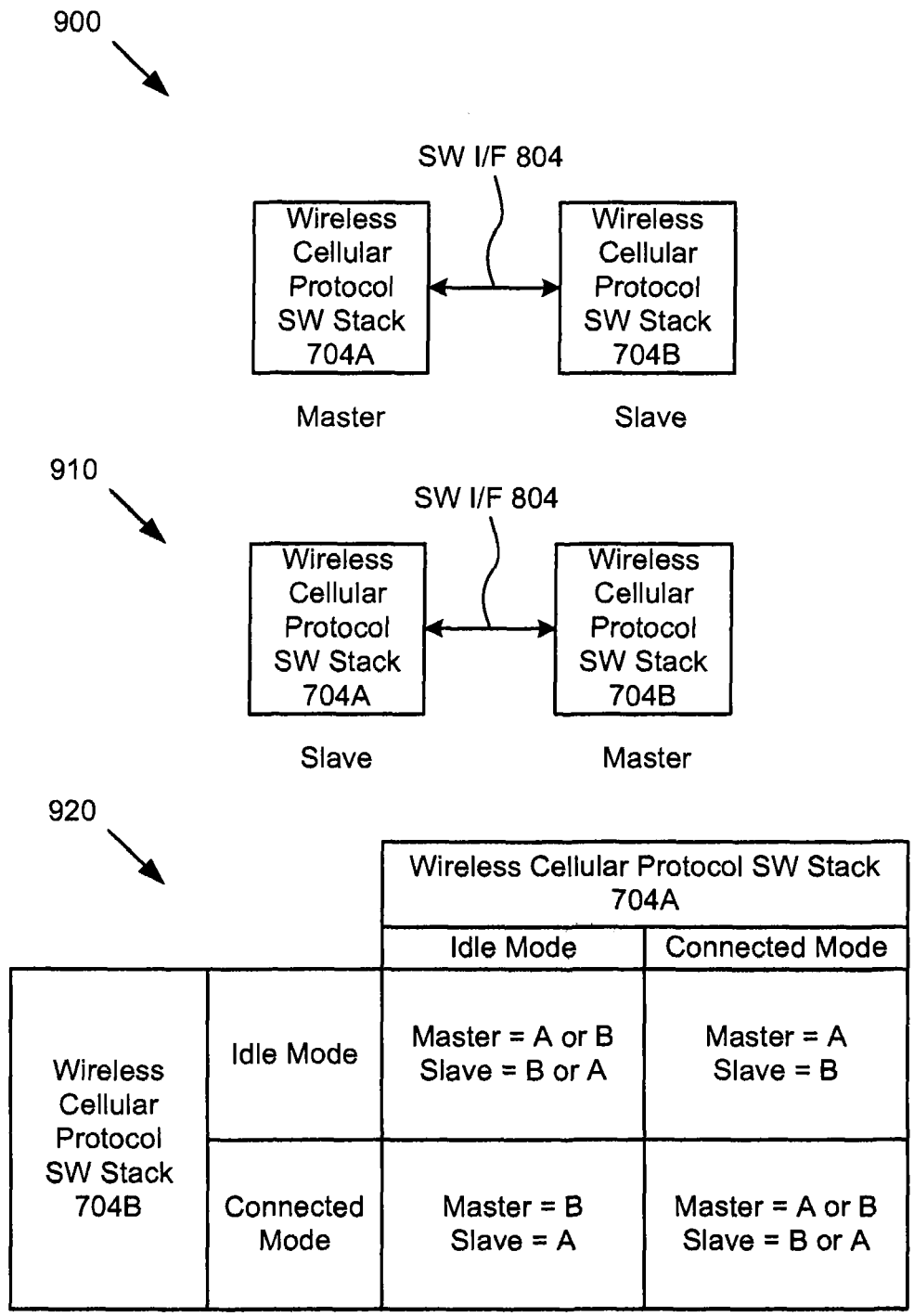
FIG. 9 illustrates master/slave relationships for wireless cellular protocol software stacks of a wireless communication device, in accordance with some embodiments.

FIG. 9 illustrates master/slave relationships for two parallel wireless cellular protocol software stacks 704A/B, which can operate in a wireless communication device 102, e.g., in a multiple SIM/eSIM DSDx wireless communication device as illustrated in any of FIGS. 5A, 5B, 6, 7A, 7B, 7C, and 8. The two parallel wireless cellular protocol software stacks 704A/B can provide for communication with two wireless networks based on two subscriber identities embodied in SIM(s) and/or in eSIM(s). When two SIM(s) and/or eSIM(s) are associated with the same wireless service provider or with two different wireless service providers that offer access via the same physical wireless network, e.g., through a roaming arrangement, the two wireless cellular protocol software stacks 704A/B can operate cooperatively to connect to the same wireless network, via the same wireless access network, using the same radio access technology, and via the same cell of the same wireless access network. The wireless communication device 102 can be registered for service in parallel with two wireless networks that share (at least in part) the same physical infrastructure. In some embodiments, processing hardware/software in the wireless communication device 102 can force each of the dual, parallel wireless cellular protocol software stacks 704A/B to operate using the same physical wireless network, e.g., via a particular cell (or cells) of an access portion of the physical wireless network. The single wireless communication device 102 can appear as two different subscribers, two distinct phone numbers, and/or two uniquely identifiable wireless devices to the wireless network in parallel. As the wireless communication device 102 is associated with and/or connected via the same cell of the same physical wireless network, parameters for operation with the wireless network, such as signaling channel frequencies, operative radio frequency bands, neighbor cell lists, intra-RAT and inter-RAT cells/networks, downlink (from wireless network cell to the wireless communication device 102) cell measurements, cell reselection/handover sets, etc. can be shared between the parallel wireless cellular protocol software stacks 704A/B. Cooperation between and synergistic operation of the parallel wireless cellular protocol software stacks 704A/B can reduce radio frequency interference and/or conflict between the two wireless cellular protocol software stacks 704A/B, can reduce power consumption by the wireless communication device 102 (e.g., by eliminating duplicate wireless mobility management operations), and can reduce radio frequency "tune-away" time periods when the dual, parallel wireless cellular software stacks 704A/B share common radio frequency wireless circuitry.

In a first configuration 900, a first wireless cellular protocol software stack 704A can operate as a "master" stack, while a second wireless cellular protocol software stack 704B can operate as a "slave" stack. In a second configuration 910, the first wireless cellular protocol software stack 704A can operate as the "slave" stack, while the second wireless cellular protocol software stack 704B can operate as the "master" stack. In some embodiments, when both wireless protocol software stacks 704A/B operate in an idle mode, either one or the other of the wireless cellular protocol software stacks 704A/B can be selected as the "master" stack while the other can be selected as the "slave" stack. The "slave" stack can follow radio frequency operations as dictated by the "master" stack, e.g., as communicated through the software interface 804 between the "slave" stack and the "master" stack. When one of the wireless cellular protocol software stacks 704A or 704B operates in a connected mode, while the other wireless cellular protocol software stack 704B or 704A operates in an idle mode, the "connected" wireless cellular protocol software stack 704A or 704B can act as the "master" stack, and the "idle" cellular protocol software stack 704B or 704A can act as the "slave" stack. In some embodiments, when both wireless cellular protocol software stacks 704A/B operate in a connected mode, the wireless cellular protocol software stack 704 A or 704B that first entered the connected mode can act as the "master" stack, while the other cellular protocol software stack 704B or 704A that entered the connected mode later can act as the "slave" stack. Thus, as illustrated by the configuration diagrams 900 and 910, either of the wireless cellular protocol software stacks 704A/B can operate as the "master" stack or the "slave" stack depending on a mode of operation, e.g., an idle mode or a connected mode, of the respective wireless cellular protocol software stacks 704

A/B. Table 920 summarizes master/slave relationships for the wireless cellular protocol software stacks 704A/B when operating in either the idle mode or the connected mode. In some embodiments, operation in a paging channel (PCH) state (or mode) can mimic operation as described herein for an idle mode.

Each wireless cellular software protocol stack 704A/B, when in an idle mode or in a PCH state, can monitor for paging messages on a paging channel using their own unique identifier, i.e., each subscriber identity, when registered with a wireless network, can be assigned an identifier, which can be included in paging messages transmitted by the wireless network to indicate that the particular paging message is intended for the wireless communication device 102 associated with the subscriber identity. As the same wireless communication device 102 can be associated with two different subscriber identities simultaneously, each wireless cellular protocol software stack 704A/B can listen for its own paging messages. The "master" stack can monitor a paging channel for messages with a "master" stack identifier (ID), while the "slave" stack can monitor the paging channel for messages with a "slave" stack ID. With shared Rx wireless circuitry, the "master" and "slave" stacks can each monitor during their own time periods. Alternatively, with parallel Rx wireless circuitry, the "master" and "slave" stacks can monitor for paging messages in parallel. As both the "master" and "slave" stacks can be associated with the same cell, only one of the wireless cellular protocol stacks, i.e., the "master" stack, performs mobility management tasks, e.g., serving cell measurements, neighbor cell measurements, including both intra-RAT and inter-RAT measurements, and cell reselection processes, while the "slave" stack obtains information and direction for mobility management from the "master" stack. The "slave" stack can leverage information provided by the "master" stack including cell measurements, cell reselection, and/or physical layer wireless circuitry settings, such as used for frequency control, phase control, gain control, etc., as the "slave" stack and the "master" stack connect to the same cell of the same wireless network via wireless circuitry of the same wireless communication device 102. The "master" stack can initiate cell reselection, and the "slave" stack can follow the "master" stack to reselect to the same new cell as directed by the "master" stack. In some embodiments, the "master" stack can read the broadcast channel (BCH) of a new cell during a cell reselection procedure, and the "slave" stack can obtain information for the BCH from the "master" stack, rather than read the same BCH in parallel. Whenever possible to reduce power consumption and duplication of tasks, the "slave" stack can leverage information obtained and/or determined by the "master" stack.

When one wireless cellular protocol software stack is in a connected mode, while the other wireless cellular protocol software stack is in an idle mode, the connected mode wireless cellular protocol software stack can act as a "master" stack, while the idle mode wireless cellular protocol software stack can act as a "slave" stack. While in the connected mode, the "master" stack can communicate with the wireless network to transfer data and to send and receive signaling messages. The "master" stack can also perform measurements of the serving cell and of neighbor cells, which can be used by either the "master" stack or the "slave" stack. The "master" stack can perform evaluation of the serving cell and the neighbor cells in order to determine whether a reselection procedure (for the idle mode stack) and a handover procedure (for the connected mode stack) is warranted. The "master" stack can communicate with the wireless network to provide information and exchange signaling messages in accordance with a particular radio access technology and/or wireless communication protocol in use to perform the cell reselection and handover process (under the direction of the wireless network). The "slave" stack in the idle mode can monitor for paging messages intended for the subscriber identity associated with the "slave" stack. The "slave" stack can leverage information provided by the "master" stack, e.g., physical layer cell measurement information and/or wireless circuitry settings, and can thus reduce duplication of effort between the "master" and "slave" stacks when associated with the same wireless network and when communicating and listening to messages from the same cell of the same access network portion of the wireless network. The "slave" stack can follow the reselection/handover process under the direction of the "master" stack to reselect to the same cell as the "master" stack uses for handover. In general, the "idle" stack can be assigned a minimal set of tasks to perform, e.g., monitoring for paging messages having its own identifier, while leveraging information gathered and/or generated by the "master" stack. The "slave" stack can also relinquish decisions for cell reselection to the "master" stack, which can determine for both wireless cellular protocol stacks when and to which cell to reselect/handover. The "slave" stack can operate effectively in a "reduced" power consumption mode by executing the minimal set of tasks. In select circumstances, the "slave" stack can be required to perform additional tasks normally executed by the "master" stack, e.g., when the "master" stack is not able to perform certain tasks during a cell reselection/handover process. In a particular example, the "master" stack can designate to the "slave" stack to perform reception on a broadcast channel (BCH) of a target cell and/or new cell to which the "master" and "slave" stacks will reselect/handover to (or to which they have already reselected/handed over). During a handover process, when the "master" stack enters a UMTS CELL PCH state, the "slave" stack, which can have reselected to the target cell, can read the BCH of the new cell when the "master" stack is unable to read the BCH of the new cell.

When both wireless cellular protocol software stacks 704A/B are in a connected mode, one of the wireless cellular protocol stacks 704A/B can be designated the "master" stack, while the other can be designated the "slave" stack. As each wireless cellular protocol software stack 704A or 704B can enter the "connected" mode at different times, the first cellular protocol software stack 704A or 704B to enter the "connected" mode can be designated the "master" stack, while the second cellular protocol software stack 704A or 704B to transition from the "idle" mode to the "connected" mode can remain as a "slave" stack (which property it can be assigned when in the "idle" mode and the other stack enters the "connected" mode). As indicated by the table 920 in FIG. 9, when both wireless cellular software protocol stacks 704A/B are in an "idle" mode, one of the wireless cellular software protocol stacks 704A or 704B can be designated the "master" stack, while the other wireless cellular software protocol stack 704B or 704A can be designated the "idle" stack. When the designated "idle" mode stack transitions to become a "connected" mode stack and the other "idle" mode stack remains in the "idle" mode, whichever stack enters the "connected" mode becomes the new "master" stack, while the remaining "idle" mode stack remains or becomes the new "slave" stack. Thus, a "slave" stack in an "idle" mode that transitions to a "connected" mode becomes a "master" stack in the "connected" mode, while the previous "master" stack that remains in the "idle"

mode becomes a "slave" stack. Similarly, when both wireless cellular protocol software stacks 704A/B are in a "connected" mode, and the "master" stack transitions to an "idle" mode, the remaining "connected" mode stack becomes the new "master" stack, while the previous "master" stack becomes the new "slave" stack in the "idle" mode. When both wireless cellular protocol software stacks 704A/B are in the "connected" mode, the "master" stack can communicate with the wireless network to exchange data packets and signaling messages and perform serving cell and neighbor cell measurements. The "slave" stack can also communicate with the wireless network to exchange data packets and signaling messages and can leverage cell measurement information provided by the "master" stack. Thus, the "slave" stack can report signal strength measurement reports to the wireless network having the same information as the "master" stack. By providing the same signal strength measurements to the wireless network, the "master" stack and "slave" stack can both trigger handover by the wireless network for the respective stacks. The "master" stack can perform a cell handover evaluation for both the "master" stack and the "slave" stack and can initiate handover with the wireless network (under commands from the wireless network). The "slave" stack can follow the "master" stack during a cell handover process, e.g., under the direction of the "master" stack and the wireless network. The "slave" stack can also leverage physical layer information for its own connection with the wireless network based on information determined and/or gathered by the "master" stack and provided to the "slave" stack. Representative physical layer information can include settings for wireless circuitry in the wireless communication device 102, e.g., as used for frequency control, gain control, phase control, etc.

Figure 10:
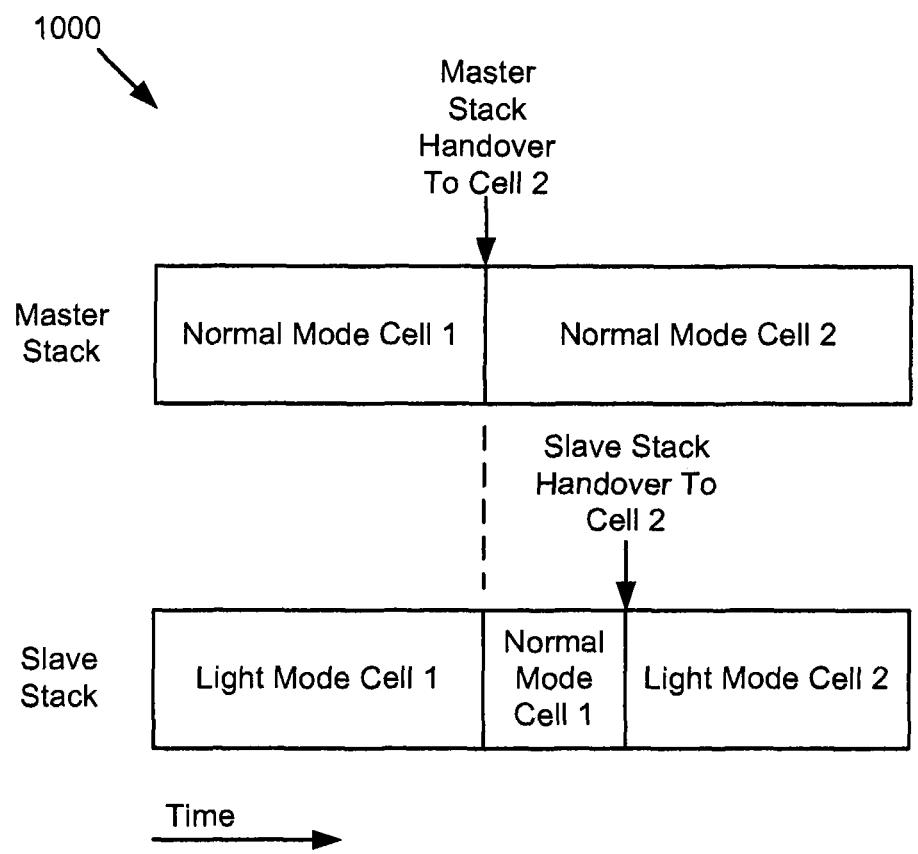
FIG. 10 illustrates a diagram of a transition of two wireless cellular protocol software stacks of a wireless communication device from a first cell to a second cell, in accordance with some embodiments.

During a cell reselection/handover process, the wireless network can send signaling messages that command the "master" stack and the "slave" stack to transition from the current cell to the target cell at different times (as each wireless cellular protocol software stack can be associated with a distinct subscriber identity, and from the point of view of the wireless network, the wireless communication device 102 can be two distinct "devices", i.e., the wireless network can be unable to distinguish between two SIMs operating on the same wireless communication device 102 from two SIMs operating on two different wireless communication devices 102.) The wireless network can receive measurement reports (or other signaling messages, such as channel state information reports) from the "master" stack and the "slave" stack nearly at the same time. The wireless network can determine when to transition each distinct subscriber identity to a new cell (via handover or reselection) at different times. Because the cell reselection or handover signaling messages from the wireless network can be sent at different times, the "slave" stack can receive the reselection/handover command at a different time than the "master" stack. FIG. 10 illustrates a diagram 1000 of a "master" stack and a "slave" stack transitioning (via handover) from a first cell to a second cell. The "master" stack can operate in a "normal" mode while connected to the first cell (cell 1), while the "slave" stack can operate in a "light" mode (e.g., performing a reduced set of tasks) while connected to the first cell (cell 1). When the "master" stack completes handover to a second cell (cell 2) before the "slave" stack, e.g., as indicated in FIG. 10, the "slave" stack can transition from the "light" mode back to a "normal" mode of operation with the first cell (cell 1) until the "slave" stack completes its own handover to the second cell (cell 2), after which the "slave" stack can return to the "light" mode. Transitioning the "slave" stack to a "normal" mode of operation after the "master" stack completes handover to the second cell (cell 2) and before the "slave" stack completes handover to the second cell (cell 2) can provide for continued communication between the first cell (cell 1) and the "slave" stack (as the "master" stack is no longer communicating with the first cell, once handover completes). If handover of the "slave" stack to the second cell (cell 2) does not complete, or if handover of the "slave" stack to a third cell (not shown) occurs, then the "slave" stack can become decoupled from the "master" stack and can continue to operate in a "normal" mode on its own rather than in a "subservient" mode to the "master" stack.

Two wireless cellular protocol software stacks 704A/B can cooperate together and provide synergistic performance not only when connected to the same wireless network, e.g., via the same cell and same access network, as described hereinabove, but also when connected to two different cells, access networks, and/or wireless networks. The two cellular protocol software stacks 704A/B can work together using wireless circuitry to which they are connected (e.g., when configured to have their own transmit/receive wireless circuitry 508A/B as illustrated in FIG. 7A, or when sharing all or portions of transmit/receive wireless circuitry 706/708/710A/B as illustrated in FIG. 7B. Mobility management tasks, e.g., searching for wireless networks, measuring cells of wireless networks, gathering wireless network broadcast information, etc., can be divided between the two wireless cellular protocol software stacks 704A/B, e.g., to reduce duplication of tasks and/or to accelerate search/measurement processes.

The two wireless cellular protocol software stacks 704A/B can operate in tandem using respective radio frequency wireless circuitry to search for public land mobile networks (PLMNs) for one or more subscriber identities. In some embodiments, search tasks can be split between the two wireless cellular protocol software stacks 704A/B based on radio access technologies available and/or in use. In some embodiments, search tasks can be split between the wireless cellular protocol software stacks 704A/B based on radio frequency bands available and/or in use. Each wireless cellular protocol software stack 704A/B can search a subset of radio access technologies and radio frequency bands for both subscriber identities (rather than have the search duplicated by both wireless cellular protocol software stacks 704A/B). A first wireless cellular software stack 704A or 704B can determine an allocation of radio access technologies and/or radio frequency bands over which to search and can provide information to a second cellular software stack 704B or 704A in order to realize an efficient (both in time to complete and in power consumption required) PLMN search.

Figure 11:
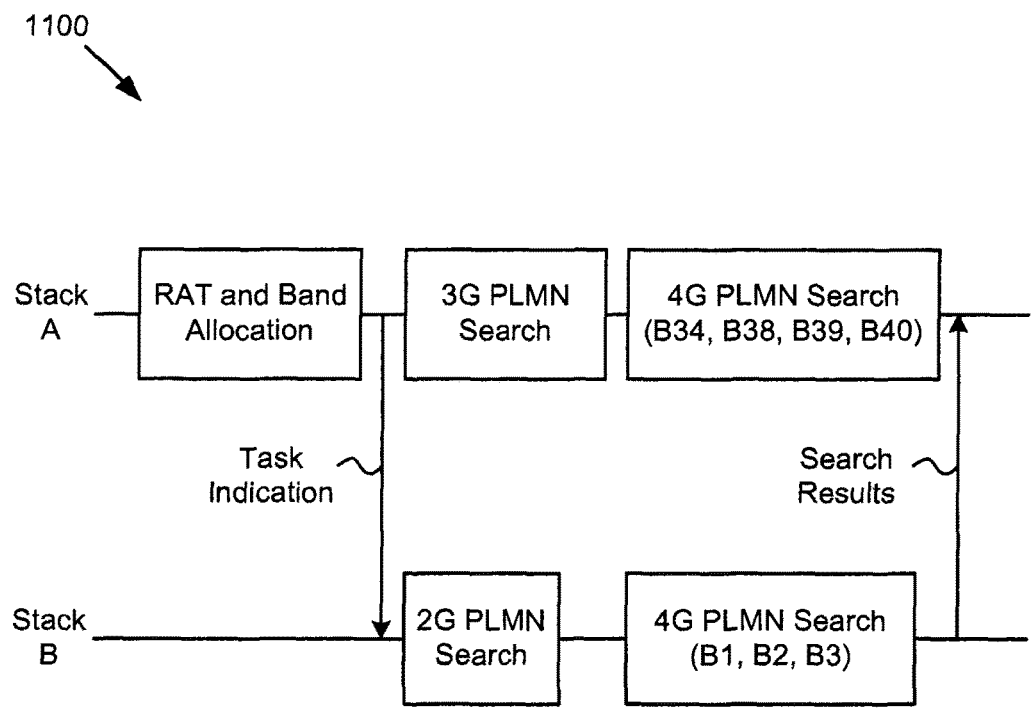
FIGS. 11 and 12 illustrate diagrams of task sharing between two cellular protocol software stacks of a wireless communication device, in accordance with some embodiments.

FIG. 11 illustrates a diagram 1100 in which two parallel wireless cellular protocol software stacks 704A/B share a process of searching for PLMNs. Stack A determines a division of tasks by allocating radio access technologies and radio frequency bands between Stack A and Stack B. An indication of tasks can be provided by Stack A to Stack B. Each stack can subsequently perform a PLMN search in parallel for both subscriber identities for its allocated radio access technologies and radio frequency bands. The two parallel wireless cellular protocol software stacks 704A/B can share the complete PLMN search cooperatively to balance the effort required to perform the PLMN search between them. The representative example illustrated in FIG. 11 shows Stack A performing PLMN searches for 3G radio access technologies and for a set of radio frequency bands (B34, B38, B39, B40) for 4G radio access technologies. Simultaneously, Stack B performs PLMN searches for 2G radio access technologies and for a different set of radio frequency bands (B1, B2, B3) for the same (or for overlapping) 4G radio access technologies. Stack B can provide the search results, once obtained, to Stack A for subsequent decisions required for concluding the PLMN search. The synergistic use of dual resources on the two parallel wireless cellular protocol software stacks 704A/B can occur when both stacks are available, e.g., in an idle mode, and can be precluded when one stack is in a connected mode, in some embodiments. A second stack in a connected mode can remain in a connected mode and not share in a PLMN search while in the connected mode, in some embodiments, e.g., in order to not interrupt the active connection of the second stack. In some embodiments, each stack and/or subscriber identity can be associated with its own primary radio access technology and/or with a list or preferred radio access technologies, and Stack A can account for this assignment and/or preference when allocating tasks for the PLMN search. In some embodiments, a stack can perform intra-RAT measurements for its own primary RAT and/or for one or more preferred RATs and share the information gathered from the measurements with another stack. (Duplication of measurements, however, when both stacks have the same primary RAT or preference list should be avoided.) Preferentially, a stack can perform intra-RAT searches over inter-RAT searches, which can be more disruptive and require (more) retuning of wireless circuitry in the wireless communication device.

Figure 12:
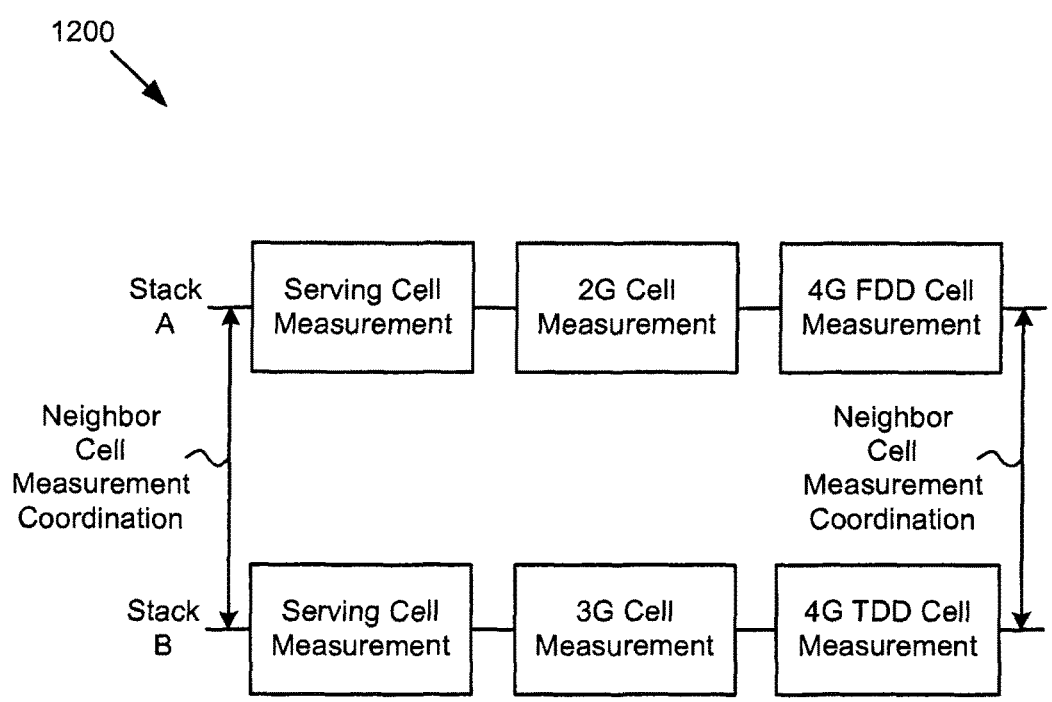

FIG. 12 illustrates a diagram 1200 of two wireless cellular protocol software stacks 704A/B sharing a set of cell measurement tasks between them. One or both of the wireless cellular protocol software stacks 704A/B can operate cooperatively (coordinate with one another) to determine and divide up neighbor cell measurement tasks, to assess cells with different radio access technologies, and/or to measure different radio frequency bands. The measurement tasks can be divided between the two parallel cellular software stacks 704A/B. The following information can be used to determine an efficient division of tasks, in some embodiments, namely, a power consumption estimate for each task, a radio resource control (RRC) state for a wireless cellular protocol software stack (e.g., whether operating in an idle mode or a connected mode, and/or when operating in a particular connected state of a connected mode), a coverage strength of a serving cell for the stack, particular sets of radio access technologies associated with, preferred by, recently used, and/or having a history of use for a particular stack, and particular radio frequency bands associated with, preferred by, recently used, and/or having a history of use for a particular stack. In a representative embodiment, one wireless cellular protocol software stack can be associated with a serving cell for a particular radio access technology, e.g., a 4G LTE/LTE-A cell, and the other wireless cellular protocol software stack can be associated with a legacy radio access technology, e.g., a 2G GSM or 3G UMTS cell. Each wireless cellular protocol software stack can perform cell measurements for its own serving cell and for neighbor cells having the same radio access technology of the serving cell with which it is associated and can provide the neighbor cell information to the other wireless cellular protocol software stack. A wireless cellular protocol software stack associated with a particular radio access technology can perform intra-RAT measurements for that particular radio access technology. When both wireless cellular protocol software stacks are associated with the same radio access technology (not necessarily the same cell or wireless network), the neighbor cell measurements can be divided between them or performed by only one of the wireless cellular protocol software stacks.

FIG. 12 illustrates measurement of serving cells first, by each wireless cellular protocol software stack, followed by measurement of cells for different non-overlapping radio access technologies. Thus, stack A measures 2G neighbor cells and 4G frequency division duplex (FDD) neighbor cells, while stack B measures 3G neighbor cells and 4G time division duplex (TDD) neighbor cells. Upon completion of measurements of neighbor cells by the two wireless cellular protocol software stacks, information gathered can be shared between the wireless cellular protocol software stacks. In some embodiments, information can be shared for each radio access technology as obtained (not shown). The coordination of neighbor cell measurement tasks can repeat, and the division of tasks can change over time. It can be preferred to assign wireless cellular protocol software stacks to neighbor cells for which the search can be most efficient, to minimize switching between radio access technologies and to minimize power consumption to complete the neighbor cell measurements across a set of radio access technologies. A wireless cellular protocol software stack can preferentially measure cells with which coverage appears to be good rather than poor, e.g., when two wireless cellular protocol stacks are associated with different cells but having the same radio access technology, the wireless cellular protocol software stack with the better coverage, which can provide more accurate results, can perform the measurements preferentially over the wireless cellular protocol software stack that has the poorer coverage.

In addition to sharing neighbor cell measurements between the wireless cellular protocol software stacks, additional information gathered by the wireless cellular protocol software stacks can be shared, e.g., when each wireless cellular protocol software stack is connected to the same PLMN or to "equal" PLMNs. For example, the two wireless cellular protocol software stacks can be associated with subscriber identities for SIMs/eSIMs from the same wireless service provider or from different wireless service providers, such as when one wireless cellular protocol software stack is "roaming" onto another wireless service provider's wireless network. When the same PLMN or "equal" PLMNs is/are used by the wireless cellular protocol software stacks, information provided by broadcast messages for mobility management can be shared between the wireless cellular protocol software stacks. For example, lists of forbidden PLMNs, broadcast control channel (BCCH) frequency allocation lists, lists of available PLMNs, routing area codes, location area codes, tracking areas, lists of neighbor cell frequencies, neighbor cell lists, forbidden cell lists, and other system broadcast information (e.g., as contained in system information block (SIB) messages) can be shared between the wireless cellular protocol software stacks. Cell specific information that can provide for faster and/or more accurate connections and/or associations for stacks with cells, such as physical layer information, synchronization information, radio frequency wireless circuitry settings, adaptive frequency control (AFC) settings, adaptive gain control (AGC) settings, adaptive phase control (APC) settings, etc. can also be shared to assist with mobility management for the wireless cellular protocol software stacks.

During a handover or reselection process, when one of the wireless cellular protocol software stacks has exact target cell information, the information can be shared with the other wireless cellular protocol software stack to accelerate the handover or reselection process. Information that can prove useful includes cell synchronization data, frequency offset values, automatic gain control values, broadcast system information, and cell measurements. Rather than have each wireless cellular protocol software stack measure cells, determine settings, and gather information for cells of wireless networks, information from each wireless cellular protocol software stack can be shared with the other wireless cellular protocol software stack.

During a circuit-switched fallback (CSFB) procedure, a wireless cellular protocol software stack can suspend communication with an LTE wireless network in order to listen for pages and/or respond to a paging indication to receive a mobile terminated call or to initiate a mobile originated call via a legacy wireless network. When one wireless cellular protocol software stack has information for a "target" cell that can be used for performing the CSFB procedure, the wireless cellular protocol software stack can share the information with another wireless cellular protocol software stack, which need not then regenerate the information for the target cell of the legacy wireless network. In some embodiments, one wireless cellular protocol software stack can operate on a 2G or 3G legacy wireless network, while the other wireless cellular protocol software stack can operate on a 4G LTE/LTE-A wireless network. When the wireless cellular protocol software stack operating on the 4G LTE/LTE-A wireless network executes a CSFB procedure (e.g., to initiate or to receive a circuit-switched voice connection via a 2G or 3G legacy wireless network) or when the wireless cellular protocol software stack executes a single radio voice call continuity (SRVCC) procedure that transitions a voice connection from the 4G LTE/LTE-A voice over IP (VoIP) and Internet multimedia subsystem (IMS) packet-switched domain to a legacy circuit-switched domain, the wireless cellular protocol software stack can reuse 2G or 3G target cell information from the wireless cellular protocol software stack operating on the 2G or 3G wireless network, in some circumstances. For example, when the target 2G or 3G cell of the legacy 2G or 3G wireless network is already in use, recently used, or for which a history of use is available from the wireless cellular protocol software stack associated with the 2G or 3G wireless network, the wireless cellular protocol software stack that is executing the CSFB or SRVCC procedure can reuse information provided by the other wireless cellular protocol software stack. Reuse of target cell information can reduce an interrupt time duration for the wireless cellular protocol software stack that is executing the CSFB or SRVCC procedure. Representative information that can be shared between wireless cellular protocol software stacks to improve CSFB or SRVCC procedures (rather than operating blindly) can include cell synchronization information, frequency offset values, automatic gain control values, etc., as well as broadcast system information for the target cell and the target cell's legacy 2G or 3G wireless network. In addition, measurement information for the target cell and/or for other cells of the 2G or 3G legacy wireless network can also prove useful.

Figure 13:
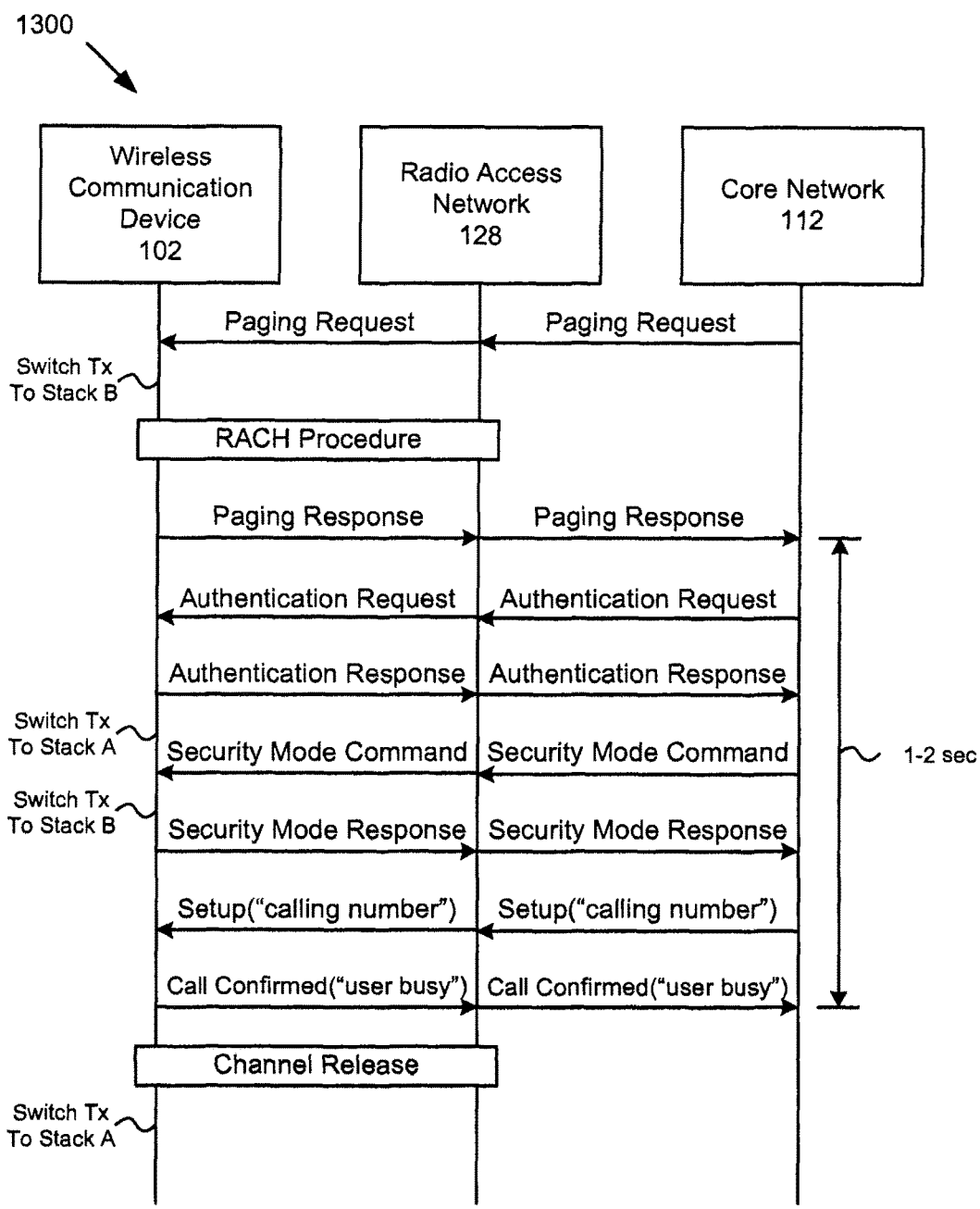
FIG. 13 illustrates a message exchange sequence between a wireless communication device and network elements of a wireless network to receive a second connection while connected via a first connection, in accordance with some embodiments.
Figure 14:
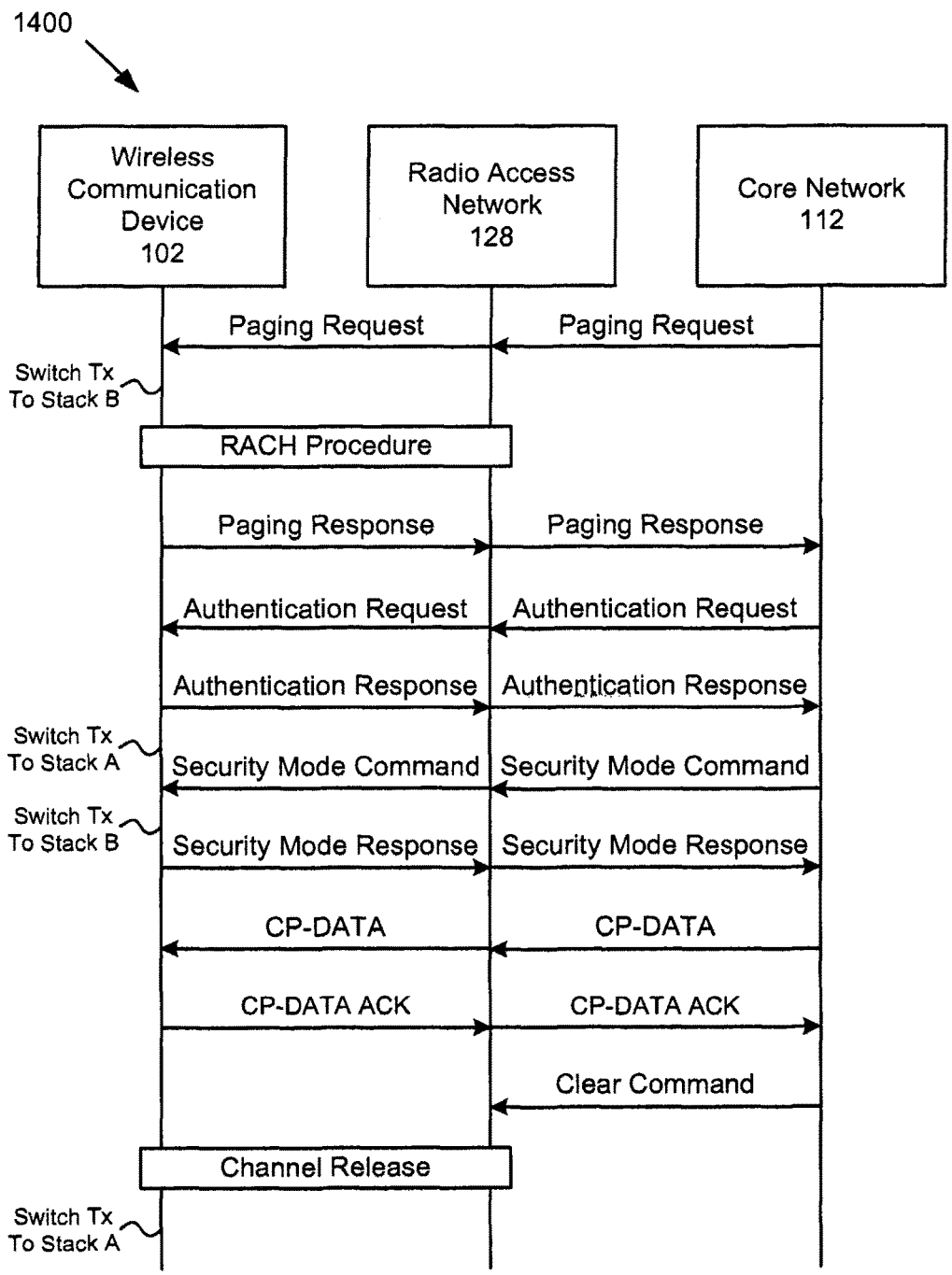
FIG. 14 illustrates a message exchange sequence between a wireless communication device and network elements of a wireless network to receive a short message service (SMS) message over a second connection while connected via a first connection, in accordance with some embodiments.

As described for FIGS. 7A to 7C, a dual SIM, dual active (DSDA) wireless communication device 702 can support two active connections to one or more wireless networks by using parallel wireless circuitry 508A/B coupled to parallel wireless cellular protocol SW stacks 704A/B. With independent and parallel wireless circuitry 508A/B, the DSDA wireless communication device 702 can receive an incoming connection notification for a wireless network via wireless circuitry 508B and via wireless cellular protocol SW stack 704B, while the DSDA wireless communication device 702 is also connected to another wireless network (or the same wireless network) via wireless circuitry 508A and via wireless cellular protocol SW stack 704A. Each wireless circuitry 508A and 508B can operate simultaneously, and a user of the wireless communication device 702 can initiate a second connection or receive a second connection while a first connection is active. For a dual SIM, dual standby (DSDS) wireless communication device 712/714, with at least a portion of wireless circuitry (e.g., Tx/Rx wireless circuitry 706 or Tx wireless circuitry 708) shared by both wireless cellular protocol software stacks 704A/B, two simultaneous connections can be not supported. For DSDS wireless communication devices 712/714, a user can seek to at least receive notification of an incoming connection (which can come from a separate wireless network or from the same wireless network) for a second subscriber identity while connected using a first subscriber identity. FIGS. 13 and 14 illustrate diagrams 1300/1400 of message exchanges between a wireless communication device 102 (e.g., a DSDS wireless communication device 712 or 714), in which an incoming connection notification or a short message service (SMS) can be received by the wireless communication device 102.

FIG. 13 illustrates a diagram 1300 of a message exchange sequence between a wireless communication device 102 and network elements of a wireless network, e.g., a radio access network 128 network element and a core network 112 network element. The wireless communication device 102 can be a DSDS wireless communication device 714 that includes separate Rx wireless circuitry 710A/B for two wireless cellular protocol software stacks 704A/B respectively and a single Tx wireless circuitry 708 shared by both wireless cellular protocol software stacks 704A/B. When one wireless cellular protocol software stack 704A or 704B operates in a connected mode, e.g., in a voice connection and/or data connection, using a first subscriber identity, the second wireless cellular protocol software stack 704B or 704A can receive a paging message and/or a paging indication addressed to the second subscriber identity via its own associated Rx wireless circuitry 710B or 710A. In order to respond to a paging message, the DSDS wireless communication device 714 can temporarily divert the Tx wireless circuitry from the existing connection in order to provide limited communication in response to the paging message. In some embodiments, the DSDS wireless communication device 714 can receive information associated with the paging message, e.g., an indication of a "purpose" of the paging message and/or an identification of the originator that seeks to establish a connection with the DSDS wireless communication device 714, such as a phone number for the "calling" party that caused the paging message to reach the DSDS wireless communication device 714. While the DSDS wireless communication device 714 can be unable to engage in two simultaneous connections, at least a limited amount of information for the user of the DSDS wireless communication device 714 can be obtained to provide to the user for further actions. Thus, a DSDS wireless communication device 714, while actively engaged in a call/connection using a first subscriber identity, can receive information for a call/connection for a second subscriber identity without dropping the first connection, without missing an indication of the incoming connection request, and obtaining at least some (albeit limited) information associated with the incoming connection request.

As illustrated by the diagram 1300 of FIG. 13, a core network 112 of a wireless network can send a paging request to the wireless communication device 102 (e.g., DSDS wireless communication device 714) via a radio access network 128. The wireless communication device 102 can receive the paging message via a set of Rx wireless circuitry (e.g., Rx wireless circuitry 710B coupled to wireless cellular protocol SW stack 704B) that listens for paging messages addressed to a subscriber identity (e.g., of a SIM on UICC 504B), while another set of Rx wireless circuitry (e.g., Rx wireless circuitry 710A) and a set of Tx wireless circuitry (e.g., Tx wireless circuitry 708) are simultaneously engaged in a separate connection associated with another subscriber identity (e.g., of another SIM on UICC 504A). To simplify the explanation, and without loss of generality, the remaining discussion will use the representative DSDS wireless communication device 714 for the wireless communication device 102. The DSDS wireless communication device 714 can switch the Tx wireless circuitry 708 from the "connected" wireless cellular protocol SW stack 704A to the "idle" wireless cellular protocol SW stack 704B and then execute a random access channel (RACH) procedure with the radio access network 128 from which the paging message was received. Both the Tx wireless circuitry 708 and the Rx wireless circuitry 710B can be used by the "idle" wireless cellular protocol SW stack 704B during the RACH procedure. Upon completion of the RACH procedure, the DSDS wireless communication device 714 can send a paging response message to the core network 112 via the radio access network 128 responding to the paging message. The core network 112 and DSDS wireless communication device 714 can perform an authentication procedure (indicated by the authentication request received from the wireless network and the authentication response sent to the wireless network). Following the authentication procedure, the DSDS wireless communication device 714 can switch the Tx wireless circuitry 708 from the "idle" wireless cellular protocol SW stack 704B back to the "connected" wireless cellular protocol SW stack 704A. The DSDS wireless communication device 714 can receive a security mode command from the core network 112 via the radio access network 128 via the Rx wireless circuitry 710B and in response switch the Tx wireless circuitry 708 back to the "idle" wireless cellular protocol SW stack 704B in order to provide a response to the wireless network, e.g., sending a security mode "complete" response message. The core network 112 can then send a message to establish a connection with the DSDS wireless communication device 714 that includes information, e.g., the "Setup" message can include a "calling number" identification. The DSDS wireless communication device 714 can respond by sending a "call confirmed" message back to the core network 112 via the radio access network 128 using the Tx wireless circuitry 708. The "call confirmed" message can include an indication that a user of the DSDS wireless communication device 704 is "busy" and can thus not receive the requested mobile terminated connection. The DSDS wireless communication device 714 can then execute a channel release procedure with the radio access network 128 to drop the connection used for the exchange of signaling information. While the DSDS wireless communication device 714 does not "accept" the incoming connection request, at least some information about the incoming connection request is gathered for the user of the DSDS wireless communication device 714. The sequence illustrated in FIG. 13 can require a minimal amount of time and can divert the Tx wireless circuitry 708 away from the "connected" wireless cellular protocol SW stack 704A to support receipt of information for the "idle" wireless cellular protocol SW stack 704B for as short a time period as feasible. During the procedure as indicated in FIG. 13, the DSDS wireless communication device 714 can switch the Tx wireless circuitry 708 back and forth between the "idle" wireless cellular protocol SW stack 704B and the "connected" wireless cellular protocol SW stack 704A to respond to the "incoming call" wireless network and also to continue to support transfer of voice packets (or data packets) for the already established connection. The message exchange sequence outlined in FIG. 13 provides for capturing "missed call" information by the DSDS wireless communication device 714 for one SIM/eSIM, while minimally interrupting an active connection for a second SIM/eSIM. As indicated in FIG. 13, a time between a paging response message sent from the DSDS wireless communication device 714 to receipt of a call confirmed (with user busy indication) message by the wireless network that sent the original paging request can be approximately 1-2 seconds. In addition, the Tx wireless circuitry 708 can be diverted back to the "connected" wireless cellular protocol SW stack 704A during the process in order to support continuation of the existing connection. The sequence shown can be minimally disruptive to the existing connection, while gleaning important incoming call information for the requested connection from the requesting wireless network. The information can be stored and/or displayed by the DSDS wireless communication device 714 to provide the "missed call" information to the user of the DSDS wireless communication device 714.

FIG. 14 illustrates a diagram 1400 of a message exchange sequence between a wireless communication device 102, e.g., DSDS wireless communication device 714, and network elements, e.g., radio access network 128 and core network 112, of a wireless network in order to receive an SMS message for an "idle" wireless cellular protocol SW stack 704B while actively connected to a wireless network via a "connected" wireless cellular protocol SW stack 704A. As with FIG. 13, the following discussion, without loss of generality, will use the DSDS wireless communication device 714 as a representative wireless communication device 102 to execute the message exchange sequence. The DSDS wireless communication device 714 can be actively connected via the "connected" wireless cellular protocol SW stack 704A and can receive a connection request (for an SMS message) for an "idle" wireless cellular protocol SW stack 704B. The DSDS wireless communication device 714 can perform a RACH procedure in order to respond to the paging request and to send a paging response. The wireless network that sent the paging request can authenticate with the DSDS wireless communication device 714 via an authentication request and response exchange. The DSDS wireless communication device 714 can use Tx wireless circuitry 708 during the RACH procedure, for the paging response, and for the authentication response, temporarily diverting the Tx wireless circuitry 708 from the "connected" wireless cellular protocol SW stack 704A to the "idle" wireless cellular protocol SW stack 704B. The DSDS wireless communication device 714 can switch the Tx wireless circuitry 708 from the "idle" wireless cellular protocol SW stack 704B back to the "connected" wireless cellular protocol SW stack 704A during the message exchange sequence, when possible, in order to continue the active connection and minimize interruption. Following a security mode exchange sequence, the DSDS wireless communication device 714 can receive a control protocol data (CP-DATA) message that includes the SMS message addressed to the subscriber identity associated with the "idle" wireless cellular protocol SW stack 704B. The "idle" wireless cellular protocol SW stack 704B can respond with a CP-DATA acknowledgement (ACK) message. The core network 112 can close the SMS exchange by sending a clear command to the radio access network 128, and the DSDS wireless communication device 714 can release the channel used for the brief exchange with the radio access network 128. The Tx wireless circuitry 708 can be diverted from the "connected" wireless cellular protocol SW stack 704A to the "idle" wireless cellular protocol SW stack 704B for a minimum period of time during the message exchange sequence in order to establish signaling connections with the radio access network 128 and core network 112 in order to receive the SMS message. As an SMS message can be limited in length, the message exchange sequence illustrated in FIG. 14 can require a minimal amount of time and can provide for successful reception of an SMS message for a second subscriber identity while engaged in an active connection with a first subscriber identity in a DSDS wireless communication device 714 that uses shared Tx wireless circuitry 708.

DSDx wireless communication devices (or more generally multi-SIM/eSIM wireless communication devices) as described herein can provide to a user thereof flexibility to communicate using multiple subscriber identities that can be associated with different wireless services and/or different wireless networks. A DSDx wireless communication device can register using two subscriber identities with the same wireless network or with two different cellular wireless networks simultaneously. Each registration can be associated with a separate subscription (e.g., a phone number) so that the DSDx wireless communication device can appear to the wireless network(s) as two different users. A user can initiate and/or receive voice connections and SMS messages using both subscriptions. In some embodiments, a user can associate one subscription with packet-switched data connections, e.g., for Internet access or other packet data services. The user's preference for use by one subscription for packet-switched data services can be based on a combination of services available, wireless network capability, subscription costs, etc. Rather than have a fixed association between a particular subscription (and its associated wireless cellular protocol software stack), it can be preferred to assign flexibly packet-switched data connections with different subscriptions, i.e., to adaptively associate packet-switched data connections with two different wireless cellular protocol SW stacks rather than remain fixed by a user designated setting. In some embodiments, the user can specify a default subscription for packet-switched data connections but can also allow the DSDx wireless communication device to select the "best" subscription (and an associated stack/SIM/eSIM/subscriber identity), e.g., based on a combination of a set of user preferences, radio conditions, available services, supported data rates, etc. As described further herein, a packet-switch data connection can switch between two different subscriptions automatically without requiring manual intervention by a user of the DSDx wireless communication device. In some embodiments, the user can set preferences for radio access technologies, wireless networks, and/or an order of which SIM/eSIM/subscription to use.

In some embodiments, the DSDx wireless communication device can automatically switch which subscription/wireless cellular protocol SW stack is associated with (or preferred by or first attempted for use by) based on which wireless network/service can provide a higher data throughput connection. For example, when one wireless cellular protocol software stack is in an "idle" mode with a 4G LTE wireless network, while the other wireless cellular protocol software stack is in an "idle" mode with a legacy 2G or 3G wireless network, the DSDx wireless communication device can automatically associate packet-switched data connections with the wireless cellular protocol software stack that is "camped on" the 4G LTE wireless network. Alternatively, or in addition, the DSDx wireless communication device can account for existing radio conditions, e.g., as provided by cell measurements, to associate packet-switched data connections with a "higher quality" or "higher data rate" wireless cellular protocol SW stack. When a wireless cellular protocol SW stack that carries a packet-switched data connection enters an "out of service" condition or when signal quality degrades, the DSDx wireless communication device can be configured to switch an existing packet-switched data connection (or a packet-switched data association) to a "less preferred" radio access technology that offers a higher performance connection, e.g., due to existing radio conditions. For example, the DSDx wireless communication device can be at a geographic location closer to a "less preferred" RAT cell that can still provide a higher data rate or a higher quality connection that a "more preferred" RAT cell that can only offer a lower data rate or a lower quality connection (e.g., due to distance, noise, interference, congestion, or other access network radio conditions). When both wireless cellular protocol software stacks are associated with the same radio access technology, the DSDx wireless communication device can switch between wireless cellular protocol SW stacks for packet-switched data connections based on a signal strength or signal quality, e.g., a received signal strength indication (RSSI), received signal code power (RSCP), signal-to-noise ratio (SNR), signal-to-interference-plus-noise ratio (SINR), or other appropriate performance metric. In some embodiments, a wireless local area network (WLAN) connection can be preferred to a cellular connection, and a WLAN connection can be used, when available and accessible, by the DSDx wireless communication device rather than a cellular connection. In some embodiments, a set of service subscriptions can influence whether a connection to a particular cellular wireless network or an alternative WLAN is used. The DSDx wireless communication device can be configured to enforce a minimum time duration for keeping an association between packet-switched data connections and a stack/subscription in order to avoid frequent switching of packet-switch data connection associations (and/or connections) between wireless cellular protocol SW stacks. Thus, the DSDx wireless communication device can "filter" measurements and/or apply a "hysteresis" effect to bias associations and/or connections toward a present association/connection before switching, e.g., using thresholds (fixed or adaptive) for switching the association/connection to a different wireless cellular protocol SW stack.

In some embodiments, a "local" subscription or a subscription to a "home" wireless network can be preferred to a "remote" subscription or a subscription via a "roaming" wireless network for packet-switched data connections of the DSDx wireless communication device. The association and/or preference for particular subscriptions can thus also be based on a geographic location of the DSDx wireless communication device, and a user can prefer to not manually reset associations while traveling. In some embodiments, packet-switched data connections can be associated with a subscription with which a circuit-switched voice connection is established (or is in the process of being established) in order to support a simultaneous circuit-switched (CS) and packet-switched (PS) service via a wireless cellular protocol SW stack that supports such a combined CS/PS service. In some embodiments, costs associated with subscription service plans can be used to determine (or at least influence) a choice of wireless cellular protocol SW stack with which to associate packet-switched data connections. In some embodiments, an unlimited data service subscription can be preferred to a metered data service subscription. In some embodiments, a user can set preferences for radio access technologies and/or subscriptions (i.e., which SIM/eSIM to use under which circumstances). In some embodiments, the user can set an order of radio access technologies to associated with packet-switched data connections. In some embodiments, a user can set permissions (e.g., allowing or disallowing) associations of packet-switched data connections with particular subscriptions. In some embodiments, permissions can be "globally" set, e.g., to apply to any application or to any user application or to any foreground application or to any background application. In some embodiments, permissions can be "locally" set, e.g., to apply to one or more particular applications. Thus, a user can set which applications have permission to use which subscriptions, in some embodiments. For dual SIM wireless communication devices that support multiple, simultaneous wireless connections, e.g., two cellular connections to two different wireless networks, or two cellular connections to the same wireless network, or a cellular connection to a cellular wireless network concurrent with a WLAN connection to a WLAN network, the user can set preferences for automatic switching of packet-switched data connections among multiple subscriptions and/or among different possible wireless connections based on a number of factors as listed above.

Figure 15:
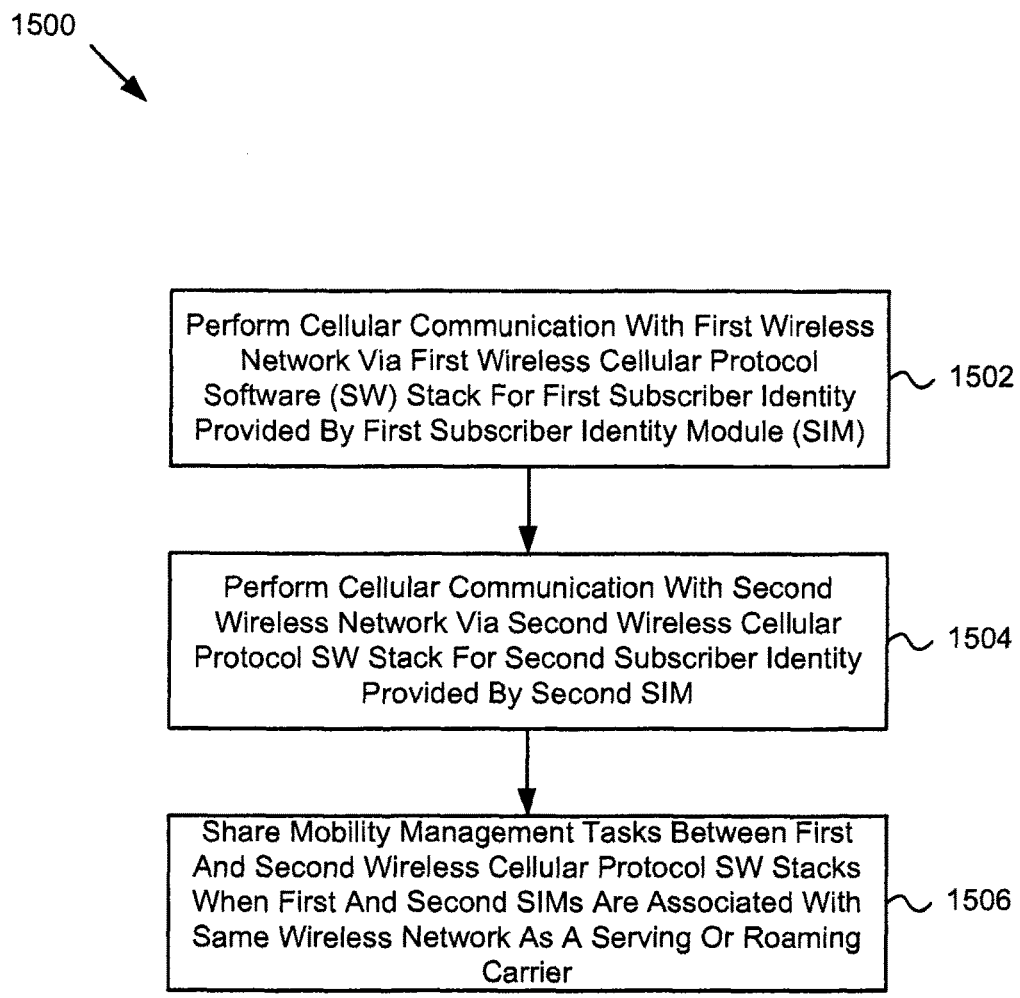
FIGS. 15 and 16 illustrate methods executed by a wireless communication device associated with and/or connected via two subscriber identities to one or more wireless networks, in accordance with some embodiments.

FIG. 15 illustrates a flowchart 1500 for a method performed by a wireless communication device 102, e.g., a DSDx wireless communication device as described hereinabove, while the wireless communication device 102 is associated with and/or connected to one or more wireless networks using two subscriber identities. In step 1502, the wireless communication device 102 performs cellular communication with a first wireless network via a first wireless cellular protocol SW stack for a first subscriber identity provided by a first SIM. (While the method is described in terms of a "SIM", the method can equally be applied to an "eSIM" and/or combinations of one or more SIMs and one or more eSIMs.) In step 1504, the wireless communication device 102 performs cellular communication with a second wireless network via a second wireless cellular protocol SW stack for a second subscriber identity provided by a second SIM. In step 1605, the wireless communication device 102 shares mobility management tasks between the first and second wireless cellular protocol SW stacks when the first and second SIMs are associated with the same wireless network as a serving carrier or as a roaming carrier. In some embodiments, the first and second wireless networks are identically the same wireless network, and the first and second wireless cellular protocol SW stacks are each associated with the same cell of the same wireless network. In some embodiments, when the first and second wireless cellular protocol SW stacks are each in an idle state or in a paging channel (PCH) state, the wireless communication device 102 shares mobility management tasks by: (i) monitoring a paging channel via the first wireless cellular protocol SW stack for paging messages associated with the first subscriber identity, (ii) monitoring the paging channel via the second wireless cellular protocol SW stack for paging messages associated with the second subscriber identity, (iii) measuring communication channel characteristics for a serving cell and for one or more neighbor cells via the first wireless cellular protocol SW stack, and (iv) transferring information based on the communication channel characteristics from the first wireless cellular protocol SW stack to the second wireless cellular protocol SW stack. In some embodiments, the information transferred between the wireless cellular protocol SW stacks includes settings for radio frequency (RF) wireless circuitry of the wireless communication device 102.

In some embodiments, when the first wireless cellular protocol SW stack is in a connected state with a serving cell and the second wireless cellular protocol SW stack is in an idle state or in a paging channel (PCH) state associated with the serving cell, the wireless communication device 102 shares mobility management tasks by: (i) performing measurements of the serving cell and of one or more neighbor cells for cell reselection or handover via the first wireless cellular protocol SW stack; (ii) determining a target cell for reselection or handover via the first wireless cellular protocol SW stack; and (iii) performing reselection or handover from the serving cell to the target cell for both the first and second wireless cellular protocol SW stacks. In some embodiments, the wireless communication device 102 reads messages on a broadcast channel (BCH) of a target cell via the second wireless cellular protocol SW stack during at least a portion of time during a reselection or handover process initiated by the first wireless cellular protocol SW stack.

In some embodiments, when the first and second wireless cellular protocol SW stacks are each in a connected state with a serving cell, the wireless communication device 102 shares mobility management tasks by: (i) communicating signaling and data with the serving cell via the first wireless cellular protocol SW stack; (ii) communicating signaling and data with the serving cell via the second wireless cellular protocol SW stack; (iii) performing measurement of the serving cell and of one or more neighbor cells for cell handover via the first wireless cellular protocol SW stack; (iv) determining a target cell for handover via the first wireless cellular protocol SW stack; and (v) performing handover from the serving cell to the target cell for both the first and second wireless cellular protocol SW stacks. In some embodiments, the wireless communication device 102 measures communication channel characteristics for a serving cell and for one or more neighbor cells via the first wireless cellular protocol SW stack and transfers information based on the communication channel characteristics from the first wireless cellular protocol SW stack to the second wireless cellular protocol SW stack. In some embodiments, the wireless communication device 102 measures communication channel characteristics for the serving cell and for the one or more neighbor cells via the second wireless cellular protocol SW stack and provides measurements to the serving cell via the second wireless cellular protocol SW stack during a time period between when handover of the first wireless cellular protocol SW stack from the serving cell to the target cell completes and handover of the second wireless cellular SW stack from the serving cell to the target cell completes.

The method illustrated in FIG. 15 and variations thereof can be performed on a single baseband processor of the wireless communication device 102 on which both the first and second cellular protocol SW stacks run. Alternatively, the method illustrated in FIG. 15 and variations thereof can be performed on multiple (e.g., two) baseband processors of the wireless communication device 102 on which the first and second cellular protocol SW stacks can respectively run. In some embodiments, the first cellular protocol SW stack supports communication using multiple RATs, while the second cellular protocol SW stack supports communication using a single RAT.

Figure 16:
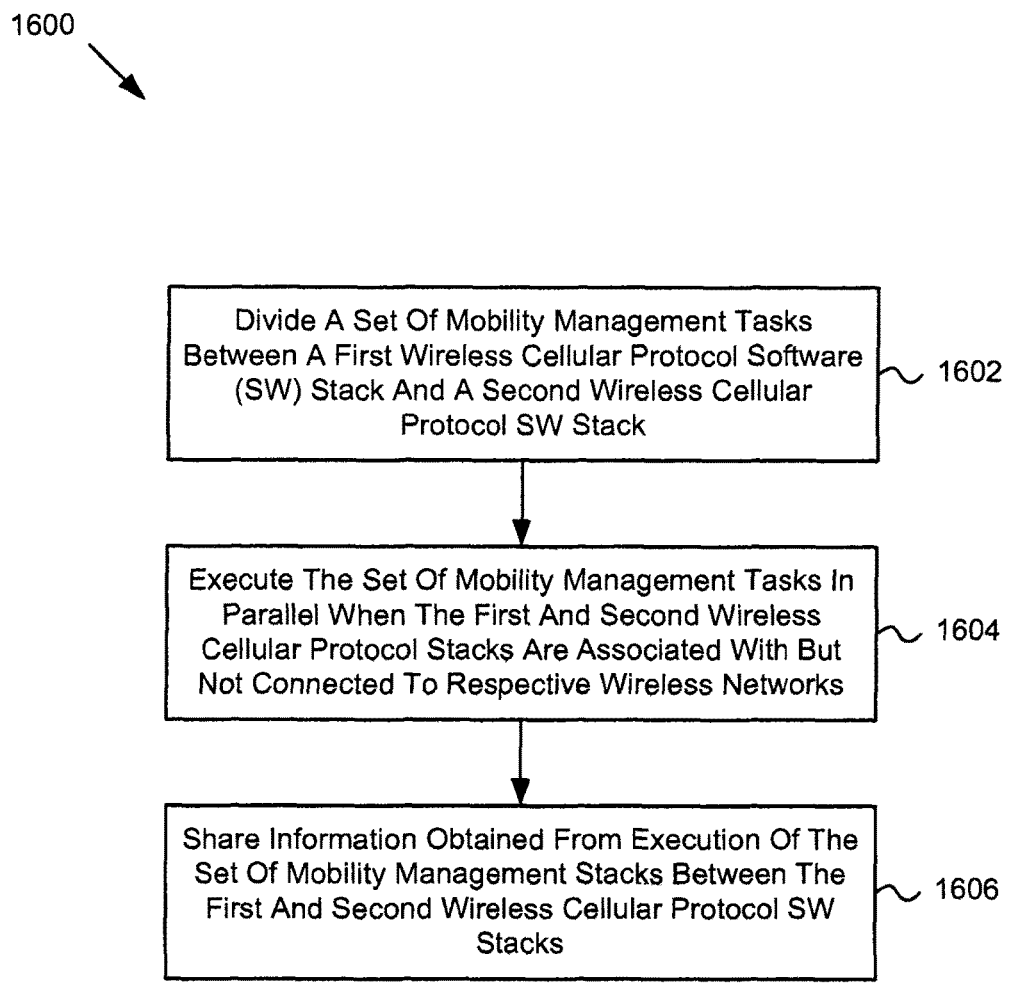

FIG. 16 illustrates a flowchart 1600 for another method performed by a wireless communication device 102, e.g., a DSDx wireless communication device as described hereinabove, while the wireless communication device 102 is associated with one or more wireless networks using multiple subscriber identities. In step 1602, the wireless communication device 102 divides a set of mobility management tasks between a first wireless cellular protocol SW stack for a first subscriber identity provided by a first SIM and a second wireless cellular protocol SW stack for a second subscriber identity provided by a second SIM. In some embodiments, the first and second wireless cellular protocol SW stacks operate on a common processor, e.g., a single baseband processor of the wireless communication device 102, with a software interface interconnecting the wireless cellular protocol SW stacks. In some embodiments, the first and second wireless cellular protocol SW stacks operate on multiple (e.g., two) processors of the wireless communication device 102 interconnected by a hardware interface over which a software interface between the stacks is realized. In some embodiments, each wireless cellular protocol SW stack supports communication in accordance with multiple RATs. In some embodiments, each wireless cellular protocol SW stack is configured to support communication using a set of RATs, which are at least partially non-overlapping (e.g., at least one RAT in each set of RATs is uniquely associated with a corresponding wireless cellular protocol SW stack). In step 1604, the wireless communication device executes the set of mobility management tasks using the first and second wireless cellular protocol SW stacks operating in parallel when both wireless cellular protocol SW stacks are associated with but not connected to a respective wireless network. For example, the first wireless cellular protocol SW stack is associated with (or registered with, or in a non-connected RRC state) with a first wireless network, while the second wireless cellular protocol SW stack is associated with (or registered with, or in a non-connected RRC state) with a second wireless network. Each wireless cellular protocol SW stack executes its own subset of mobility management tasks from the set of mobility management tasks. In step 1606, the wireless cellular protocol SW stacks share information obtained by execution of the mobility management tasks between them.

In some embodiments, the set of mobility management tasks executed in parallel by the wireless cellular protocol SW stacks include searching for a PLMN. In some embodiments, the first wireless cellular protocol SW stack searches for PLMNs that use a RAT in a first set of RATs, while the second wireless cellular protocol SW stack searches for PLMNs that use a RAT in a second set of RATs, where the sets of RATs are at least in part non-overlapping. In some embodiments, one wireless cellular protocol SW stack searches for 2G PLMNs, while the other wireless cellular protocol SW stack searches for 3G PLMNs. In some embodiments, one wireless cellular protocol SW stack searches for legacy 2G or 3G PLMNs, while the other wireless cellular protocol SW stack searches for 4G LTE/ LTE-A PLMNs. In some embodiments, one wireless cellular protocol SW stack searches for 4G FDD PLMNs, while the other wireless cellular protocol SW stack searches for 4G TDD PLMNs. In some embodiments, each wireless cellular protocol SW stack searches for PLMNs based on a preferred RAT list associated with the wireless cellular protocol SW stack's associated subscriber identity or SIM/eSIM.

In some embodiments, the set of mobility management tasks executed in parallel by the wireless cellular protocol SW stacks include measuring neighbor cells and/or serving cells. In some embodiments, the wireless cellular protocol SW stacks measure cells based on one or more criteria including but not limited to radio access technologies, radio frequency bands, RRC states, RAT preference lists, and cell preference lists. In some embodiments, each wireless cellular protocol SW stack measures its own serving cell and one or more neighbor cells for a radio access technology shared by its own serving cell. In some embodiments, both wireless cellular protocol SW stacks are associated with subscriber identities for SIMs/eSIMs associated with the same wireless network provider, which serves as either a serving carrier or a roaming carrier. When both the first and second wireless cellular protocol SW stacks are associated with the same wireless network provider, the information shared between the wireless cellular protocol SW stacks includes a combination of one or more of neighbor cell lists, forbidden cell lists, and broadcast system information. In some embodiments, the first and second wireless cellular protocol SW stacks are associated with the same cell of the same wireless network, and the information shared between the wireless cellular protocol SW stacks includes physical layer information or wireless circuitry settings for communication with the cell. In some embodiments, the information shared between the wireless cellular protocol SW stacks includes target cell information for a cell reselection process or for a cell handover process, such as synchronization parameters, radio frequency values, or wireless circuitry settings for communication with a target cell. In some embodiments, the information shared between the wireless cellular protocol SW stacks includes cell measurements and/or wireless circuitry settings for a CSFB procedure or for a SRVCC procedure.

Figure 17:
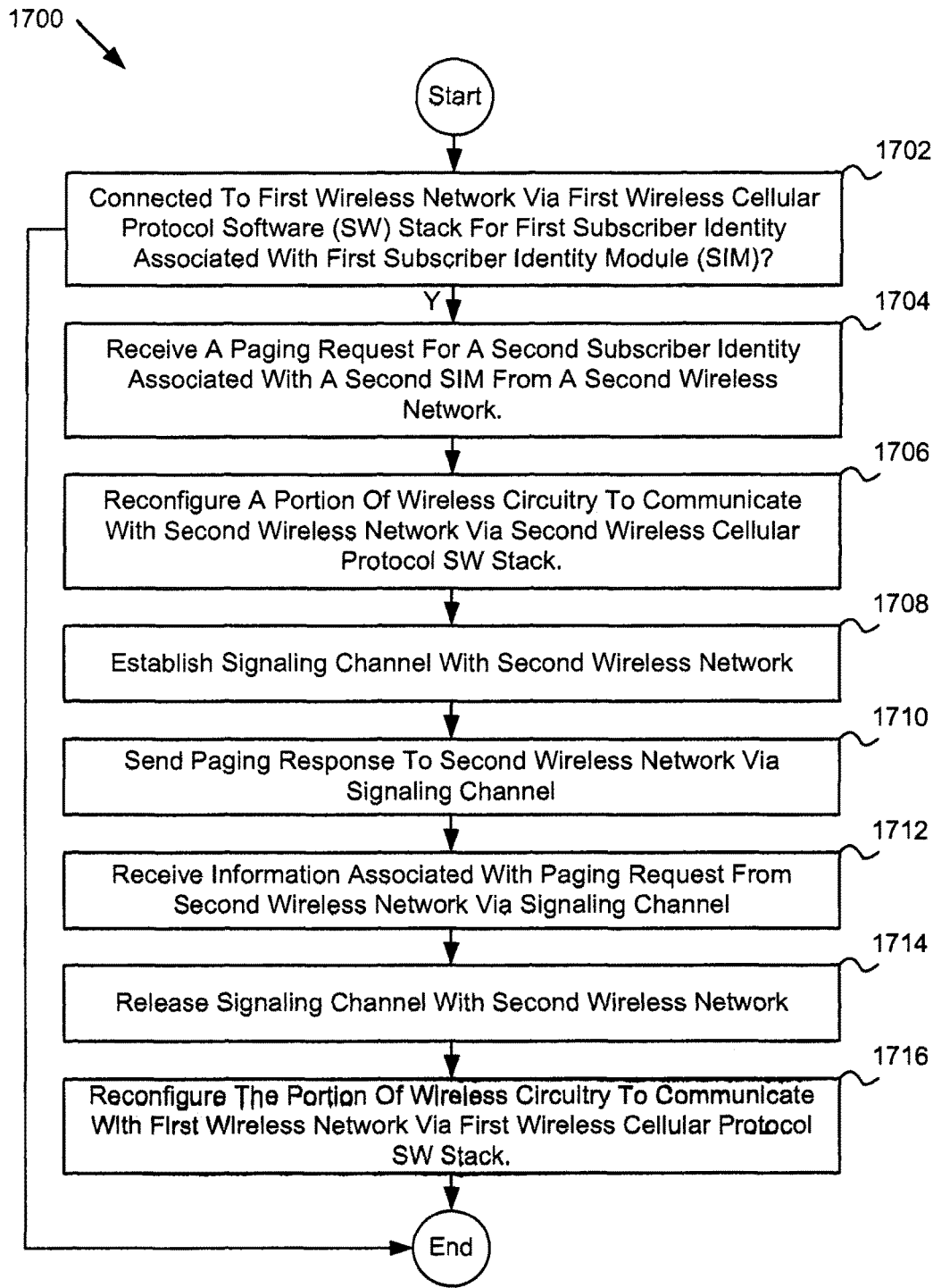
FIG. 17 illustrates a method to share radio frequency wireless circuitry by two cellular protocol software stacks in a wireless communication device to communicate with two wireless networks, in accordance with some embodiments.

FIG. 17 illustrates a flowchart 1700 for a method to share radio frequency wireless circuitry by two wireless cellular protocol software stacks in a wireless communication device to communicate with two wireless networks. The method is performed by the wireless communication device while connected to a first wireless network through a first wireless cellular protocol SW stack for a first subscriber identity associated with a first SIM, as determined in step 1702. In step 1704, the wireless communication device receives a paging request for a second subscriber identity associated with a second SIM from a second wireless network. In step 1706, the wireless communication device reconfigures a portion of radio frequency wireless circuitry from the first wireless network to communicate with the second wireless network through a second wireless cellular protocol SW stack. In step 1708, the wireless communication device establishes a signaling channel with the second wireless network via the second wireless cellular protocol SW stack using the reconfigured portion of radio frequency wireless circuitry. In step 1710, the wireless communication device sends a paging response to the second wireless network through the signaling channel in response to the paging request received from the second wireless network. In step 1712, the wireless communication device receives information from the second wireless network associated with the paging request through the signaling channel. In step 1714, the wireless communication device releases the signaling channel with the second wireless network after receiving the information associated with the paging request. In step 1716, the wireless communication device reconfigures the portion of the wireless circuitry from the second wireless network back to the first wireless network to continue communication with the first wireless network via the first wireless cellular protocol SW stack after releasing the signaling channel.

In some embodiments, the portion of the wireless circuitry that is reconfigured in the wireless communication device to switch communication between the first wireless network and the second wireless network includes a radio frequency transmitter that is shared between the first and second wireless cellular protocol SW stacks. The first and wireless cellular protocol SW stacks can run simultaneously on a single baseband processor or on multiple baseband processors with communication interfaces between the wireless cellular protocol SW stacks as described and illustrated herein. The paging request received from the second wireless network can include a mobile terminated connection establishment request for the second subscriber identity module, and after establishing the signaling channel, the wireless communication device can receive a connection setup message for the mobile terminated connection request from the second wireless network. The mobile wireless communication device can receive information associated with the paging request as part of the connection setup message, e.g., an indication of an originator of the mobile terminated connection establishment request. The mobile wireless communication device can send a connection rejection message to the second wireless network denying the request to establish a mobile terminated connection with the second wireless network. The connection rejection message can include an indication of the status of the wireless communication device, subscriber identity, or user thereof, e.g., a "busy" indication. The mobile wireless communication device can provide a user of the mobile wireless device with a notification that includes an indication of the originator of the mobile terminated connection establishment request. Thus, the user of the mobile wireless communication device can be informed of a connection attempt from a second wireless network, and in some embodiments an indication of the originator of the connection attempt, while still engaged in a connection with the first wireless network.

In some embodiments, the paging request includes a short message service (SMS) request, and the wireless communication device subsequently receives an SMS control protocol data (CP-DATA) message from the second wireless network after establishing the signaling channel with the second wireless network. In response to the SMS CP-DATA message, the wireless communication device can send an acknowledgement, e.g., a CP-DATA ACK message. The wireless communication device can provide an indication of the received SMS CP-DATA message to a user thereof. In this manner, the user can receive SMS messages from a second wireless network, while remaining in a connection with the first wireless network. In some embodiments, the wireless communication device performs an authentication procedure via the signaling channel with the second wireless network, e.g., receiving an authentication request from and sending an authentication response back to the second wireless network. In some embodiments, the wireless communication device also performs a security mode process that includes receiving a security mode command from the second wireless network and responding with a security mode complete message sent back to the second wireless network. The wireless communication device can reconfigure a portion of the wireless circuitry, e.g., a radio frequency transmitter, back and forth between the first wireless network and the second wireless network, thereby maintaining the connection with the first wireless network, while also providing a "limited" connection with the second wireless network. The wireless communication device can support continuation of the connection to the first wireless network, while also supporting communication via a signaling channel with the second wireless network. The wireless communication device can thus receive information about "missed" incoming connection attempts and/or receive SMS messages from a second wireless network without losing the connection to the first wireless network. By sharing a single radio frequency transmitter among multiple wireless cellular protocol SW stacks that each have their own radio frequency receivers, a more compact and power efficient wireless communication device can be realized that permits at least limited parallel communication with two different wireless networks (or with the same wireless network) for two different subscriber identities associated with two distinct SIMs/eSIMs. The SIMs can be installed on one or more removable UICCs and/or the eSIMs can be installed on an eUICC, as disclosed herein for various embodiments of the wireless communication device.

Figure 18:
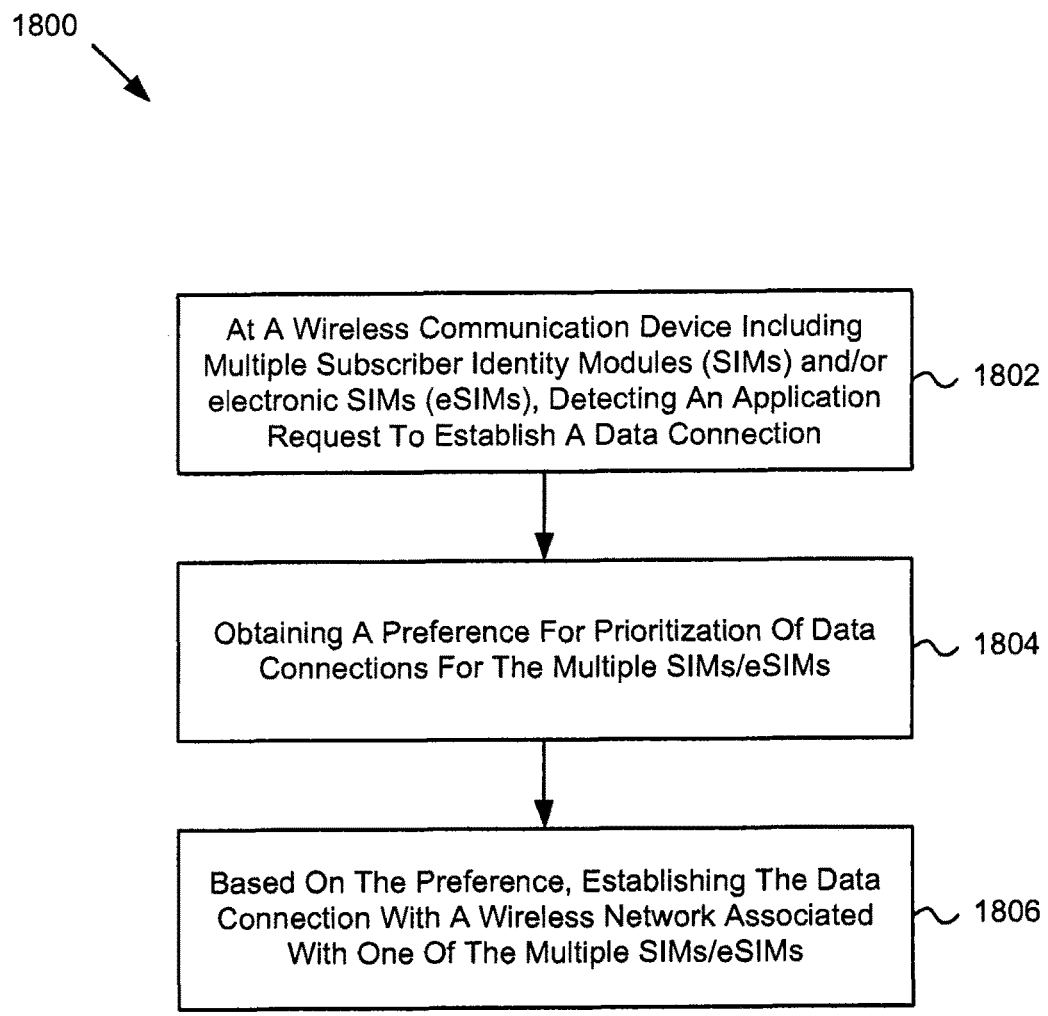
FIG. 18 illustrates a method to manage data connections in a wireless communication device that includes multiple subscriber identities, in accordance with some embodiments.

FIG. 18 illustrates a flowchart 1800 for a representative method to manage data connections in a wireless communication device that includes multiple subscriber identity modules (SIMs). In some embodiments, one or more of the SIMs are located on one or more removable UICCs installed in the wireless communication device. In some embodiments, one or more of the SIMs are installed as electronic SIMs (eSIMs) on an embedded UICC (eUICC) included in the wireless communication device. The wireless communication device can be configured to access one or more different wireless networks associated with the multiple SIMs/eSIMs included in the wireless communication device. At least one of the SIMs can provide for a data connection, and in some embodiments, multiple SIMs/eSIMs can each provide for data connections to one or more wireless networks. The one or more wireless networks can be distinct, e.g., different wireless networks that provide different services and/or use different radio access technologies, or the same wireless network, e.g., when two (or more) SIMs/eSIMs are associated with the same wireless service provider or when one SIM/eSIM provides a "home" service through a wireless network and a second SIM/eSIM provides a "roaming" service through the same wireless network. With multiple SIMs/eSIMs that can each provide a data connection for the wireless communication device, a prioritized order of which SIMs/eSIMs to use can be established, e.g., as a default setting in a software configuration of the wireless communication device and/or as a user configurable preference setting. In a first step 1802, when an application (or other resource) in the wireless communication device seeks to establish a data connection, the wireless communication device can detect the application's (or other resource's) request to establish the data connection. In a second step 1804, the wireless communication device obtains a preference for prioritization of data connections for the multiple SIMs in the wireless communication device. In a third step, 1806, based on the preference for prioritization, the wireless communication device can establish the data connection with a wireless network associated with one of the multiple SIMs/eSIMs in the wireless communication device.

In some embodiments, the preference for prioritization of the data connections includes a prioritized order (e.g., an ordered list) in which the multiple SIMs/eSIMs can be selected by the wireless communication device to attempt to establish the data connection. The wireless communication device can attempt to connect with one or more wireless networks associated with each SIM/eSIM in the prioritized order until the data connection is established. In some embodiments, all of the SIMs/eSIMs can support a data connection; while in some embodiments, only some (i.e., not all) of the SIMs/eSIMs can support a data connection. When only some of the SIMs/eSIMs support a data connection, the prioritized order/list can include only those SIMs/eSIMs that support data connections and can exclude SIMs/eSIMs that do not support a data connection. In some embodiments, the user can select an order in which SIMs/eSIMs can be selected for a data connection. In some embodiments, the user can include and/or exclude particular SIMs/eSIMs from the prioritized order, and for those SIMs/eSIMs included, the user can specify an order by which the SIMs/eSIMs can be used for establishing a data connection. In some embodiments, the preference for prioritization of the data connections includes a prioritized order of radio access technologies (RATs) to use for data connections. When RATs are prioritized, the wireless communication device can establish the data connection with the wireless network by attempting to connect with one or more wireless networks associated with the multiple SIMs/eSIMs in the prioritized order of RATs until the data connection is established. In some embodiments, one or more of the multiple SIMs/eSIMs each provide for multiple RATs, and a first set of SIMs/eSIMs can be used to attempt to establish the data connection with an associated wireless network by selecting a first preferred RAT. When the wireless communication device cannot establish the data connection using any of the SIMs/eSIMs (or associated wireless networks) that use the first preferred RAT, then a second set of SIMs/eSIMs that use a second preferred RAT in the prioritized order of RATs can be used. The process can repeat until all RATs are attempted in order to establish the data connection. In a representative embodiment, the wireless communication device includes a first SIM/eSIM configured for a 4G LTE wireless network and a second SIM/eSIM configured for a legacy 2G/3G wireless network, and the prioritized order of RATs indicates a preference for a 4G LTE RAT before a legacy 2G/3G RAT. In a representative embodiment, the wireless communication device prioritizes establishing the data connection with a 4G LTE wireless network before establishing the data connection with a legacy 2G/3G wireless network.

In some embodiments, when the multiple SIMs/eSIMs in the wireless communication device support connections to at least two wireless networks that each use a particular RAT, the wireless communication device can prioritize each of the at least two wireless networks based on another criteria, such as a characteristic of connections for the at least two wireless networks. In some embodiments, the wireless communication device compares one or more quality metrics for the at least two wireless networks and prioritizes an order in which to attempt a connection for the particular RAT based on the one or more quality metrics. The wireless communication device can prioritize connections to wireless networks based on a signal quality and/or strength metric, such as a received signal code power (RSCP), a reference signal received power (RSRP), a reference signal received quality (RSRQ), a received signal strength indicator (RSSI), and/or another comparable quality metric. The wireless communication device can be configured to establish a data connection with a first wireless network having a higher signal strength/quality when available over establishing a data connection with a second wireless network having a lower signal strength/quality, when both the first and second wireless networks use the same RAT.

In some embodiments, the wireless communication device includes a preference for higher data rates over lower data rates when establishing a data connection, and the wireless communication device attempts to connect with one or more wireless networks associated with the multiple SIMs/eSIMs in a prioritized order based on a highest data rate provided by a radio access technology of each wireless network. Wireless networks that use RATs that offer higher maximum data rates can be preferred over wireless networks that use RATs that offer lower maximum data rates. In some embodiments, a range of data rates available for each RAT and/or each wireless network can be used to determine an order in which wireless networks are attempted for a data connection.

In some embodiments, a wireless network that uses a wireless local area network (WLAN) technology, e.g., Wi-Fi, can be preferred over wireless networks that use a cellular wireless technology, e.g., an LTE, UMTS, GPRS, or CDMA EV-DO wireless network, for establishing a data connection. The wireless communication device can include wireless circuitry that supports data connections using a WLAN technology and wireless circuitry that supports data connections using a cellular wireless technology. The wireless communication device can detect availability of a WLAN and can attempt to establish a data connection with the WLAN before attempting to establish a data connection with a cellular wireless network. In some embodiments, the wireless communication device can detect availability of a WLAN after establishing a data connection with a cellular wireless network and can switch the data connection from the cellular wireless network to the WLAN.

In some embodiments, the wireless communication device detects an attempt to establish a circuit-switched voice connection to a cellular wireless network. The wireless communication device can prioritize establishing a data connection (or switching an existing data connection) to the cellular wireless network when the cellular wireless network supports simultaneous circuit-switched voice connections and packet-switched data connections. In some embodiments, after establishing a data connection with a wireless network, the wireless communication device can detect a degradation of a signal quality for the established data connection and can switch the data connection to another wireless network in response. In some embodiments, detecting the degradation of the signal quality can include detecting an out-of-service (OOS) condition for the data connection with the wireless network. In some embodiments, detecting the degradation of the signal quality can include comparing the signal quality of the data connection with a signal quality threshold.

Figure 19:
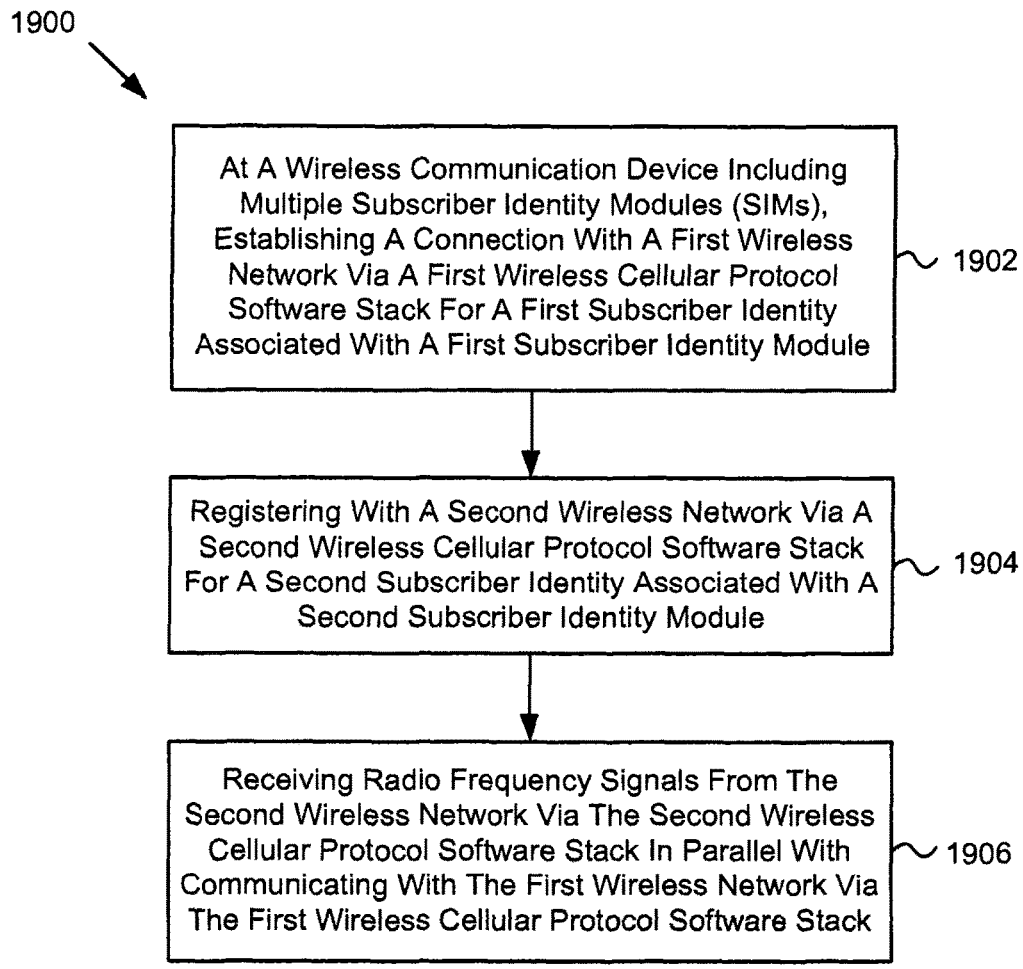
FIG. 19 illustrates a method to support parallel communication by a wireless communication device that includes multiple subscriber identities, in accordance with some embodiments.

FIG. 19 illustrates a representative method 1900 to support parallel communication using multiple subscriber identities at a wireless communication device that includes multiple SIMs/eSIMs. The method includes the wireless communication device establishing a connection with a first wireless network by means of a first wireless cellular protocol software stack for a first subscriber identity associated with a first SIM/eSIM. The connection can be one or more of: a signaling connection, a circuit-switched connection, and a packet-switched connection. The method further includes the wireless communication device registering with a second wireless network by means of a second wireless cellular protocol software stack for a second subscriber identity associated with a second SIM/eSIM. In some embodiments, the first and second wireless networks are distinct, different wireless networks associated with different mobile network operators (MNOs). In some embodiments, the first and second wireless networks are the same wireless network. The method further includes the wireless communication device receiving radio frequency signals from the second wireless network by means of the second wireless cellular protocol software stack while also communicating in parallel with the first wireless network by means of the first wireless cellular protocol software stack. In some embodiments, the wireless communication device includes radio frequency circuitry, at least a portion of which is shared by the first and second wireless cellular protocol software stacks for communicating with the first and second wireless networks respectively. In some embodiments, the wireless communication device includes a first radio frequency transmitter that can be configured for use by the first or second wireless cellular protocol software stacks to communicate with the first or second wireless networks. In some embodiments, the wireless communication device includes a first radio frequency receiver configured for use by the first wireless cellular protocol software stack to communicate with the first wireless network and a second radio frequency receiver configured for use by the second wireless cellular protocol software stack to communicate with the second wireless network respectively.

The method illustrated in FIG. 19 can be performed by one or more different wireless communication devices, such as one or more variants of the dual SIM wireless communication device 502 illustrated in FIG. 5A, the multi-SIM wireless communication device 522 illustrated in FIG. 5B, the multi-eSIM wireless communication device 532 illustrated in FIG. 5B, the multi-SIM/e-SIM wireless communication devices 542/552 illustrated in FIG. 5B, the multi-eSIM wireless communication device 602 illustrated in FIG. 6, the dual SIM, dual Active (DSDA) wireless communication device 700 illustrated in FIG. 7A, the dual SIM, dual Standby (DSDS) wireless communication devices 712/714 illustrated in FIG. 7B, the multi-SIM, dual Access/Standby (DSDx) wireless communication device 722 illustrated in FIG. 7C, the multi-SIM/eSIM, dual Access/Standby (DSDx) wireless communication device 732 illustrated in FIG. 7C, and/or the dual SIM, dual Standby/Access (DSDx) wireless communication devices 802/810 illustrated in FIG. 8. In some embodiments, a wireless communication device to perform a method illustrated in FIG. 19 includes radio frequency wireless circuitry including at least one antenna and at least one radio frequency component block coupled thereto, and at least one baseband processor configured to transmit and receive radio frequency signals via the radio frequency wireless circuitry and configured to perform one or more of the steps of the method. In some embodiments, the wireless communication device includes at least two wireless cellular protocol software stacks that share at least a portion of the radio frequency wireless circuitry for communicating with one or more networks in parallel. In some embodiments, the shared portion of radio frequency wireless circuitry includes a transmitter that can be configured to communicate with one or more wireless networks. In some embodiments, each wireless cellular protocol software stack in the wireless communication device is coupled to its own radio frequency wireless receiver to allow for parallel reception of radio frequency signals for at least two distinct subscriber identities in parallel.

In some embodiments, a wireless communication device can receive signals for a second subscriber identity while also transmitting and/or receiving signals for a first subscriber identity. Thus, the wireless communication device can receive signaling messages, such as paging messages, paging indications, or broadcast channel messages for one subscriber identity, while also maintaining a connection for another subscriber identity. The wireless communication device can be configured to perform a measurement procedure (e.g., based on received reference signals) or to perform a downlink synchronization procedure for one wireless network while also communicating with another wireless network. In some embodiments, the wireless communication device is configurable to communicate simultaneously with two wireless networks that operate in accordance with different radio access technologies (RATs), use one or more different radio frequency bands, and/or use one or more different radio frequency channels. In some embodiments, the first and second wireless cellular protocol software stacks reside in the same processor, e.g., a single baseband processor, and are interconnected by a software interface over which information can be exchanged between the wireless cellular protocol software stacks, e.g., to coordinate operation of the wireless cellular protocol software stacks and/or to provide information used to promote synergistic operation of the wireless cellular protocol software stacks in parallel. In some embodiments, the wireless cellular protocol software stacks reside on separate processors, e.g., two or more different baseband processors, that are interconnected by a hardware interface (over which a software interface can interconnect the wireless cellular protocol software stacks). The subscriber identities are associated with respective subscriber identity modules (SIMs), which can be installed on removable universal integrated circuit cards (UICCs), can be embodied as electronic SIMs (eSIMs) on an embedded UICC (eUICC), or can be realized as a combination of SIMs on UICCs and eSIMs on eUICCs.

In some embodiments, SIMs for a wireless communication device can reside internally in the wireless communication device, e.g., on one or more UICCs and/or as eSIMs on an eUICC in the wireless communication device, and/or reside externally in a wireless accessory device, e.g., as shown by the UICC accessory unit 724 in FIG. 7C or in a comparable UICC/eUICC wireless accessory device. The wireless accessory device can be coupled to the wireless communication device, e.g., through a wired or wireless interface, such as the interface 726 illustrated in FIG. 7C between the wireless communication devices 722/732 and the wireless accessory unit 724. A second SIM/eSIM in the wireless accessory device can provide for extending the capability of the wireless communication device to connect to a wireless network for which a first SIM/eSIM in the wireless communication device is not authorized to provide a connection. As shown in FIG. 7C, a wireless cellular protocol software stack in the wireless communication device can communicate with the wireless accessory device, e.g., to access the second SIM/eSIM over the wired/wireless interface to exchange information and/or obtain credentials by which the wireless communication device can register with and/or connect to a wireless network using the information/credentials from the second SIM/SIM via the wireless cellular protocol software stack. In a representative embodiment, the interface between the wireless communication device and the wireless accessory device uses a low power wireless protocol, e.g., a Bluetooth® Low Energy wireless communication protocol. The wireless accessory device can provide for accessing the second SIM/eSIM when the wireless communication device is not designed to include multiple SIMs on multiple UICCs, e.g., includes a bay for only a single removable UICC or uses internal eSIMs on an eUICC without support for another SIM on another removable UICC. The wireless accessory device, in general, permits access to SIMs/eSIMs for connections to wireless networks through the wireless communication device, where the activated SIM/eSIM is not resident in the wireless communication device. The second SIM/eSIM resident in the wireless accessory device can support all the same functions as a first SIM/eSIM resident in the wireless communication device, in some embodiments. Multiple external SIMs/eSIMs can be resident in the wireless accessory device. The first "internal" SIM/eSIM resident in the wireless communication device can operate independently of the second "external" SIM/eSIM resident in the wireless accessory device. In some embodiments, the wireless communication device can use the second "external" SIM/eSIM in a "single SIM/eSIM" legacy mode of operation, e.g., when the second "external" SIM/eSIM is enabled and/or activated and the first "internal" SIM/eSIM is not enabled and/or not activated.

A wireless accessory device can be configured to support one or more SIMs/eSIMs resident within the wireless accessory device for use by a separate wireless communication device. The wireless accessory device and wireless communication device can be interconnected through an interface, such as a wireless or wired interface, over which information can be provided from the wireless accessory device to the wireless communication device. Representative information can include credentials used to authenticate the wireless communication device with a wireless network using a subscriber identity associated with a SIM/eSIM in the wireless accessory device. In some embodiments, the wireless communication device includes a wireless cellular protocol software stack that communicates with the SIM/eSIM in the wireless accessory device, where the SIM/eSIM is activated for communication with the wireless network. In some embodiments, the wireless communication device includes another SIM/eSIM that is not activated for communication with the wireless network and/or is activated for communication with the wireless network using a different subscriber identity than the subscriber identity associated with the SIM/eSIM in the wireless accessory device. In some embodiments, the SIM/eSIM in the wireless accessory device is a SIM installed on a removable UICC. In some embodiments, the SIM/eSIM is an eSIM installed on an eUICC permanently affixed to a circuit board in the wireless accessory device. In some embodiments, the interface between the wireless communication device and the wireless accessory device is a wireless interface configurable to operate in accordance with a wireless communication protocol for a wireless local area network (WLAN), a wireless personal area network (WPAN), a radio frequency identification (RFID) connection, or using a near field communication (NFC). In some embodiments, the wireless interface is configured to operate using a Bluetooth® Low Energy (BTLE) wireless communication protocol. In some embodiments, the interface is a wired interface configurable to operate in accordance with a protocol for a universal serial bus, a Lightning™ port, or an Ethernet port.

The wireless communication device can be configured to support multiple subscriber identities when coupled to the wireless accessory device, in some embodiments. The wireless communication device can include radio frequency wireless circuitry, e.g., one or more antennas, and one or more radio frequency component blocks, for communication with one or more wireless networks, including cellular wireless networks. The wireless communication device can include one or more baseband processors configured to transmit and receive radio frequency signals via the radio frequency wireless circuitry. The one or more baseband processors can be configured to establish a connection with a first wireless network via a first wireless cellular protocol software stack for a first subscriber identity associated with a first SIM/eSIM in the wireless accessory device. The one or more baseband processors can establish the connection with the first wireless network by obtaining credentials for the first subscriber identity from the first SIM/eSIM in the wireless accessory device by means of the interface and authenticating the wireless communication device with the first wireless network using the credentials. The wireless communication device, in some embodiments, can also register with a second wireless network by means of a second wireless cellular protocol software stack for a second subscriber identity associated with a second SIM/eSIM. The wireless communication device, so configured, can receive radio frequency signals from the second wireless network, by means of the second wireless cellular protocol software stack, and can in parallel communicate with the first wireless network by means of the first wireless cellular protocol software stack. Thus, the wireless communication device can establish a connection to one wireless network using a first SIM/eSIM (in the wireless communication device or in the wireless accessory device) while also registering with and receiving signals from another wireless network using a second SIM/eSIM (in the wireless communication device or in the wireless accessory device) in parallel. The first and second SIMs/eSIMs can be SIMs installed on removable UICCs and/or can be eSIMs installed on eUICCs. In some embodiments, the combination of the wireless communication device and the wireless accessory device can form a wireless system capable of functioning as a dual SIM, dual standby or dual SIM, dual active wireless communication device. In some embodiments, the wireless communication device can connect to two different wireless networks using two different SIMs/eSIMs that are not collocated in the wireless communication device, e.g., at least one SIM/eSIM resides in the wireless accessory device. In some embodiments, the wireless communication device can connect to a wireless network using a SIM/eSIM in the wireless accessory device when no activated SIM/eSIM resides in the wireless communication device. In some embodiments, the wireless communication device includes a single baseband processor on which the first and second wireless cellular protocol software stacks run in parallel with a software interface between them. In some embodiments, cooperation and/or synergy between the first and second wireless cellular protocol software stacks is enabled by means of the software interface between them, e.g., through an exchange of information over the software interface and/or by control through additional software in the baseband processor. In some embodiments, the wireless communication device includes a first baseband processor to manage the first wireless cellular protocol software stack and a second baseband processor to manage the second wireless cellular protocol software stack, with the first and second baseband processors interconnected by a hardware interface. In some embodiments, a software interface can be realized between the first and second wireless cellular protocol software stacks through the hardware interface, and information can be exchanged to provide for cooperation and/or synergistic operation between the first and second wireless cellular protocol software stacks.

The various aspects, embodiments, implementations or features of the described embodiments can be used separately or in any combination. Further, some aspects of the described embodiments may be implemented by software, hardware, or by a combination of hardware and software. The described embodiments can also be embodied as computer program code stored on a non-transitory computer-readable medium. The computer readable-medium may be associated with any data storage device that can store data, which can thereafter be read by a computer or a computer system. Examples of the computer-readable medium include read-only memory, random-access memory, CD-ROMs, Solid-State Disks (SSD or Flash), HDDs, DVDs, magnetic tape, and optical data storage devices. The computer-readable medium can also be distributed over network-coupled computer systems so that the computer program code may be executed in a distributed fashion.

The foregoing description, for purposes of explanation, used specific nomenclature to provide a thorough understanding of the described embodiments. However, it will be apparent to one skilled in the art that some of the specific details are not required in order to practice the described embodiments. Thus, the foregoing descriptions of specific embodiments are presented herein for purposes of illustration and description. These descriptions are not intended to be exhaustive, all-inclusive, or to limit the described embodiments to the precise forms or details disclosed. It will be apparent to one of ordinary skill in the art that many modifications and variations are possible in view of the above teachings, without departing from the spirit and the scope of the disclosure.

What is claimed is:

1. A method to manage data connections, the method comprising:
   by a wireless communication device including multiple subscriber identity modules (SIMs):
   detecting an application request from a first application to establish a data connection for the first application;
   obtaining a preference for prioritization of data connections among the multiple SIMs for the first application;
   based on the preference for prioritization, establishing the data connection for the first application with a wireless network associated with one of the multiple SIMs;
   monitoring radio frequency conditions of the data connection to the wireless network and of alternative wireless networks to determine whether to switch the data connection for the first application to one of the alternative wireless networks; and
   switching the data connection for the first application to the one of the alternative wireless networks based on the monitored radio frequency conditions,
   wherein:
      the preference for prioritization comprises a user set permission for the first application indicating which of the multiple SIMs the first application is permitted to use, and
      the monitoring includes filtering measurements of the radio frequency conditions to cause the data connection for the first application to remain with a present connection for at least a threshold time duration before switching.

2. The method as recited in claim 1, wherein the preference for prioritization further comprises a prioritized order of the multiple SIMs for data connections, and wherein the wireless communication device establishes the data connection with the wireless network by:
   attempting to connect with one or more wireless networks associated with each SIM of the multiple SIMs with which the first application is permitted to use in the prioritized order until the data connection for the first application is established.

3. The method as recited in claim 1, wherein the preference for prioritization further comprises a prioritized order of radio access technologies (RATs) for data connections, and wherein the wireless communication device establishes the data connection with the wireless network by:
   attempting to connect with one or more wireless networks associated with each SIM of the multiple SIMs with which the first application is permitted to use in the prioritized order of RATs until the data connection for the first application is established.

4. The method as recited in claim 3, further comprising:
   by the wireless communication device:
   when at least two wireless networks use a particular RAT, comparing a quality metric for each of the at least two wireless networks that use the particular RAT; and
   prioritizing establishing connections to the at least two wireless networks that use the particular RAT based on the comparing of the quality metric for each of the at least two wireless networks that use the particular RAT,
   wherein the quality metric comprises one or more of: a received signal code power (RSCP), a reference signal received power (RSRP), a reference signal received quality (RSRQ), or a received signal strength indicator (RSSI).

5. The method as recited in claim 1, wherein the preference for prioritization further comprises a preference for higher data rate connections, and wherein the wireless communication device establishes the data connection with the wireless network by:
   attempting to connect with one or more wireless networks associated with each SIM of the multiple SIMs with which the first application is permitted to use in a prioritized order based on a highest data rate provided by a radio access technology of each wireless network until the data connection for the first application is established.

6. The method as recited in claim 1, further comprising:
   by the wireless communication device:
   detecting availability of a wireless local area network (WLAN) before establishing the data connection for the first application with the wireless network associated with one of the multiple SIMs; and
   attempting to establish the data connection for the first application with the WLAN before attempting to establish the data connection for the first application with the wireless network associated with one of the multiple SIMs.

7. The method as recited in claim 1, further comprising:
   by the wireless communication device:
   detecting availability of a wireless local area network (WLAN) after establishing the data connection for the first application with the wireless network, wherein the wireless network is a cellular wireless network and the one of the alternative wireless networks is the WLAN; and
   the switching the data connection for the first application to the one of the alternative wireless networks comprises switching the data connection for the first application from the cellular wireless network to the WLAN.

8. The method as recited in claim 1, further comprising:
   by the wireless communication device:
   detecting an attempt to establish a circuit-switched voice connection to a cellular wireless network that supports simultaneous circuit-switched voice connections and packet switched data connections, wherein the one of the alternative wireless networks is the cellular wireless network; and the switching the data connection for the first application to the one of the alternative wireless networks comprises switching the data connection for the first application from the wireless network to the cellular wireless network.

9. A wireless communication device configured to support multiple subscriber identities, the wireless communication device comprising:
   radio frequency wireless circuitry including at least one antenna and at least one radio frequency component block coupled thereto; and
   at least one baseband processor configured to transmit and receive radio frequency signals via the radio frequency wireless circuitry;
   wherein the at least one baseband processor is further configured to cause the wireless communication device to, while associated with a first wireless network via a first wireless cellular protocol software stack for a first subscriber identity associated with a first subscriber identity module (SIM) and associated with a second wireless network via a second wireless cellular protocol software stack for a second subscriber identity associated with a second SIM:
      detect an application request from a first application to establish a data connection for the first application;
      based on a prioritization of data connections for the wireless communication device, establish the data connection for the first application with the first wireless network or with the second wireless network;
      monitor radio frequency conditions of the data connection for the first application with the first or second wireless network and radio frequency conditions of alternative wireless networks to determine whether to switch the data connection for the first application to one of the alternative wireless networks; and
      switch the data connection for the first application to the one of the alternative wireless networks based on the monitored radio frequency conditions,
      wherein:
         the prioritization comprises a user set permission for the first application indicating which of the first SIM and the second SIM the first application is permitted to use, and
         the wireless communication device monitors by at least filtering measurements of the radio frequency conditions to cause the data connection for the first application to remain with a present connection for at least a threshold time duration before switching.

10. The wireless communication device as recited in claim 9, wherein the prioritization further comprises a user preference for use of radio access technologies (RATs) for data connections, and wherein the wireless communication device establishes the data connection for the first application based on RATs used by the first and second wireless networks.

11. The wireless communication device as recited in claim 9, wherein the prioritization of data connections for the wireless communication device further comprises a default preference for wireless networks that use a later generation radio access technology (RAT) over wireless networks that use an earlier generation RAT.

12. The wireless communication device as recited in claim 9, wherein the at least one baseband processor is further configured to cause the wireless communication device to:
   detect availability of a wireless local area network (WLAN) before establishing the data connection for the first application with the first or second wireless network; and
   attempt to establish the data connection with the WLAN before attempting to establish the data connection for the first application with the first or second wireless network.

13. The wireless communication device as recited in claim 9, wherein the at least one baseband processor is further configured to cause the wireless communication device to:
   detect availability of a wireless local area network (WLAN) after establishing the data connection for the first application with the first or second wireless network, wherein the one of the alternative wireless networks is the WLAN.

14. The wireless communication device as recited in claim 9, wherein the at least one baseband processor is further configured to cause the wireless communication device to:
   detect an attempt to establish a circuit-switched voice connection to a cellular wireless network that supports simultaneous circuit-switched voice connections and packet-switched data connections, wherein the one of the alternative wireless networks is the cellular wireless network.

15. A non-transitory computer readable storage medium having computer program code stored thereon, the computer program code, when executed by one or more processors implemented on a wireless communication device, causes the wireless communication device to:
   associate the wireless communication device with a first wireless network via a first wireless cellular protocol software stack for a first subscriber identity associated with a first subscriber identity module (SIM);
   associate the wireless communication device with a second wireless network via a second wireless cellular protocol software stack for a second subscriber identity associated with a second SIM;
   detect a request to establish a data connection for a first application;
   establish the data connection for the first application with the first wireless network or the second wireless network based on one or more characteristics of the first and second wireless networks and a prioritization of data connections for the wireless communication device;
   monitor radio frequency conditions of the data connection for the first application with the first or second wireless network and radio frequency conditions of alternative wireless networks to determine whether to switch the data connection for the first application to one of the alternative wireless networks; and
   switch the data connection for the first application to the one of the alternative wireless networks based on the monitored radio frequency conditions,
   wherein:
      the prioritization comprises a user set permission for the first application indicating which of the first SIM and the second SIM the first application is permitted to use, and the wireless communication device monitors by at least filtering measurements of the radio frequency conditions to cause the data connection for the first application to remain with a present connection for at least a threshold time duration before switching.

* * * * *